United States Patent
Brown et al.

(10) Patent No.: US 12,451,239 B2
(45) Date of Patent: Oct. 21, 2025

(54) SYSTEMS AND METHODS FOR ASSESSING SURGICAL ABILITY

(71) Applicant: Intuitive Surgical Operations, Inc., Sunnyvale, CA (US)

(72) Inventors: Kristen Brown, Roswell, GA (US); Kiran Bhattacharyya, Atlanta, GA (US); Anthony Michael Jarc, Johns Creek, GA (US); Sue Kulason, Baltimore, MD (US); Linlin Zhou, Alpharetta, GA (US); Aneeq Zia, Atlanta, GA (US)

(73) Assignee: Intuitive Surgical Operations, Inc., Sunnyvale, CA (US)

(*) Notice: Subject to any disclaimer, the term of this patent is extended or adjusted under 35 U.S.C. 154(b) by 135 days.

(21) Appl. No.: 18/037,976

(22) PCT Filed: Nov. 26, 2021

(86) PCT No.: PCT/US2021/060900
§ 371 (c)(1),
(2) Date: May 19, 2023

(87) PCT Pub. No.: WO2022/119754
PCT Pub. Date: Jun. 9, 2022

(65) Prior Publication Data
US 2023/0317258 A1    Oct. 5, 2023

Related U.S. Application Data

(60) Provisional application No. 63/121,220, filed on Dec. 3, 2020.

(51) Int. Cl.
*G16H 40/20*    (2018.01)

(52) U.S. Cl.
CPC ............................ *G16H 40/20* (2018.01)

(58) Field of Classification Search
CPC ........................................... G16H 40/20
See application file for complete search history.

(56) References Cited

U.S. PATENT DOCUMENTS 9,283,675 B2    3/2016 Hager et al.
9,472,121 B2 *  10/2016 Pravong .................. G09B 5/02
(Continued)

FOREIGN PATENT DOCUMENTS

KR       101247513 B1    3/2013
WO    WO-2012060901 A1    5/2012
(Continued)

OTHER PUBLICATIONS 1603.06995v4, Cui, Arxiv, 2016, pp. 1-10.*
(Continued)

*Primary Examiner* — Michael I Ezewoko
(74) *Attorney, Agent, or Firm* — Foley & Lardner LLP

(57) ABSTRACT

Various of the disclosed embodiments relate to computer systems and computer-implemented methods for measuring and monitoring surgical performance, For example, the system may receive raw data acquired from the surgical theater, generate and select features from the data amenable to analysis, and then train a machine learning classifier using the selected features to facilitate subsequent assessment of other surgeons' performances. Generation and selection of the features may itself involve application of a machine learning classifier in some embodiments. While some embodiments contemplate raw data acquired from surgical robotic systems, some embodiments facilitate assessments upon data acquired from non-robotic surgical theaters.

20 Claims, 21 Drawing Sheets

(56) References Cited

U.S. PATENT DOCUMENTS

| | | | | |
|---|---|---|---|---|
| 9,548,002 B2* | 1/2017 | Black | | B29C 39/026 |
| 9,788,907 B1* | 10/2017 | Alvi | | G11B 27/34 |
| 9,836,654 B1* | 12/2017 | Alvi | | A61B 34/25 |
| 9,847,044 B1* | 12/2017 | Foster | | G09B 5/065 |
| 9,852,053 B2* | 12/2017 | Verkoeyen | | G06F 11/3696 |
| 9,898,937 B2* | 2/2018 | Poulsen | | G09B 23/285 |
| 9,922,172 B1* | 3/2018 | Alvi | | G11B 27/34 |
| 9,922,579 B2* | 3/2018 | Black | | G09B 23/34 |
| 9,940,849 B2* | 4/2018 | Hart | | G09B 23/28 |
| 9,959,786 B2* | 5/2018 | Breslin | | G09B 23/30 |
| 10,026,337 B2* | 7/2018 | Black | | B29C 39/026 |
| 10,081,727 B2* | 9/2018 | Felsinger | | B29C 39/003 |
| 10,121,391 B2* | 11/2018 | Breslin | | G09B 23/285 |
| 10,140,889 B2* | 11/2018 | Black | | G09B 23/34 |
| 10,198,966 B2* | 2/2019 | Wachli | | G09B 23/285 |
| 10,223,936 B2* | 3/2019 | Black | | G09B 23/285 |
| 10,332,425 B2* | 6/2019 | Hofstetter | | G09B 23/34 |
| 10,354,556 B2* | 7/2019 | Hofstetter | | G09B 23/281 |
| 10,395,559 B2* | 8/2019 | Poulsen | | G09B 23/285 |
| D866,661 S* | 11/2019 | Munro | | D19/62 |
| 10,467,923 B2* | 11/2019 | Livneh | | G09B 9/24 |
| 10,490,105 B2* | 11/2019 | Saleh | | G09B 23/28 |
| 10,535,281 B2* | 1/2020 | Breslin | | G09B 23/30 |
| 10,559,227 B2* | 2/2020 | Gmeiner | | B29C 35/02 |
| 10,572,734 B2* | 2/2020 | Alvi | | G06V 20/49 |
| 10,657,845 B2* | 5/2020 | Black | | G09B 23/285 |
| 10,679,520 B2* | 6/2020 | Hofstetter | | G09B 23/30 |
| 10,692,395 B2* | 6/2020 | Mackenzie | | G09B 5/04 |
| 10,706,743 B2* | 7/2020 | Black | | G09B 23/285 |
| 10,720,084 B2* | 7/2020 | Black | | G09B 23/32 |
| 10,729,502 B1* | 8/2020 | Wolf | | A61B 5/1032 |
| 10,733,908 B2* | 8/2020 | Black | | G09B 23/281 |
| 10,755,602 B2* | 8/2020 | Hofstetter | | G09B 23/34 |
| 10,779,772 B2* | 9/2020 | Pan | | A61B 5/11 |
| 10,785,540 B2* | 9/2020 | Stanis | | G09B 5/06 |
| 10,791,301 B1* | 9/2020 | Garcia Kilroy | | G11B 27/10 |
| 10,796,606 B2* | 10/2020 | Felsinger | | B29B 7/002 |
| 10,847,057 B2* | 11/2020 | Felsinger | | G09B 23/30 |
| 10,854,112 B2* | 12/2020 | Pravong | | G09B 23/34 |
| 10,886,015 B2* | 1/2021 | Wolf | | G16H 10/40 |
| 10,902,745 B2* | 1/2021 | Singh | | A61B 1/04 |
| 10,943,682 B2* | 3/2021 | Wolf | | G16H 40/63 |
| 11,030,922 B2* | 6/2021 | Velasco | | G09B 23/285 |
| 11,034,831 B2* | 6/2021 | Felsinger | | G09B 23/30 |
| 11,049,418 B2* | 6/2021 | Black | | G09B 23/32 |
| 11,065,079 B2* | 7/2021 | Wolf | | G06V 20/20 |
| 11,081,229 B2* | 8/2021 | Alvi | | A61B 90/361 |
| 11,100,815 B2* | 8/2021 | Hofstetter | | G09B 23/34 |
| 11,116,587 B2* | 9/2021 | Wolf | | G06F 3/048 |
| 11,120,708 B2* | 9/2021 | Hofstetter | | G09B 23/285 |
| 11,189,195 B2* | 11/2021 | Munro | | G09B 9/00 |
| 11,190,847 B2* | 11/2021 | Stanis | | H04N 21/47217 |
| 11,205,103 B2* | 12/2021 | Zhang | | G06V 10/774 |
| 11,224,485 B2* | 1/2022 | Wolf | | G06V 20/46 |
| 11,227,686 B2* | 1/2022 | Makrinich | | G16H 50/30 |
| 11,343,464 B2* | 5/2022 | Sugano | | H04N 5/92 |
| 11,348,235 B2* | 5/2022 | Barral | | G06N 20/00 |
| 11,348,682 B2* | 5/2022 | Wolf | | G06V 20/46 |
| 11,361,679 B2* | 6/2022 | Hofstetter | | G09B 23/30 |
| 11,380,431 B2* | 7/2022 | Wolf | | A61B 5/746 |
| 11,403,968 B2* | 8/2022 | Hart | | G09B 23/285 |
| 11,426,255 B2* | 8/2022 | Wolf | | A61B 1/015 |
| 11,450,236 B2* | 9/2022 | Wachli | | G09B 23/30 |
| 11,452,576 B2* | 9/2022 | Wolf | | G06F 16/71 |
| 11,484,384 B2* | 11/2022 | Wolf | | A61B 5/7275 |
| 11,514,819 B2* | 11/2022 | Breslin | | G09B 23/285 |
| 11,568,762 B2* | 1/2023 | Munro | | G09B 19/24 |
| 11,587,466 B2* | 2/2023 | Hofstetter | | G09B 23/34 |
| 11,605,161 B2* | 3/2023 | Jin | | G06V 20/46 |
| 11,636,945 B1* | 4/2023 | Gallegos | | G06F 16/9035 |
| | | | | 705/2 |
| 11,763,923 B2* | 9/2023 | Wolf | | G06F 16/735 |
| | | | | 606/130 |
| 11,769,207 B2* | 9/2023 | Wolf | | A61B 34/25 |
| 11,798,092 B2* | 10/2023 | Wolf | | A61B 1/000094 |
| 11,836,917 B2* | 12/2023 | Barral | | G06V 20/20 |
| 11,847,936 B2* | 12/2023 | Jarc | | G16H 40/63 |
| 11,854,425 B2* | 12/2023 | Black | | B29C 39/026 |
| 11,869,378 B2* | 1/2024 | Hofstetter | | A61B 17/04 |
| 11,887,504 B2* | 1/2024 | Hofstetter | | G09B 23/34 |
| 11,941,050 B2* | 3/2024 | Barral | | G06F 16/739 |
| 11,971,951 B2* | 4/2024 | Wang | | G06V 40/23 |
| 11,990,055 B2* | 5/2024 | Breslin | | G09B 23/285 |
| 12,033,104 B2* | 7/2024 | Wolf | | G11B 27/28 |
| 12,048,414 B2* | 7/2024 | Sasada | | G06T 11/00 |
| 12,087,179 B2* | 9/2024 | Hofstetter | | G09B 23/34 |
| 12,131,664 B2* | 10/2024 | Hofstetter | | G09B 23/281 |
| 12,137,992 B2* | 11/2024 | Jin | | G06T 7/0012 |
| 12,154,454 B2* | 11/2024 | Pravong | | G09B 23/34 |
| 2014/0220527 A1* | 8/2014 | Li | | G06V 20/10 |
| | | | | 434/262 |
| 2014/0282199 A1* | 9/2014 | Basu | | G06F 3/0484 |
| | | | | 715/772 |
| 2015/0044654 A1 | 2/2015 | Lendvay et al. | | |
| 2015/0304560 A1* | 10/2015 | Joshi | | H04N 5/222 |
| | | | | 348/372 |
| 2015/0334075 A1* | 11/2015 | Wang | | H04L 51/04 |
| | | | | 715/752 |
| 2017/0053543 A1* | 2/2017 | Agrawal | | A61B 90/37 |
| 2017/0300752 A1* | 10/2017 | Biswas | | G09B 5/02 |
| 2020/0082299 A1* | 3/2020 | Vasconcelos | | G06N 20/00 |
| 2021/0315650 A1 | 10/2021 | Tokarchuk et al. | | |
| 2021/0407309 A1* | 12/2021 | Jarc | | H04N 5/76 |
| 2022/0172119 A1* | 6/2022 | Welsh | | G06F 18/217 |
| 2022/0270750 A1 | 8/2022 | Grantcharov et al. | | |
| 2024/0071243 A1* | 2/2024 | Jarc | | G16H 40/63 |
| 2024/0354588 A1* | 10/2024 | Silva Tavares | | G06N 3/0985 |

FOREIGN PATENT DOCUMENTS

| | | |
|---|---|---|
| WO | WO-2020102773 A1 | 5/2020 |
| WO | WO-2022119754 A1 | 6/2022 |
| WO | WO-2022231993 A1 | 11/2022 |

OTHER PUBLICATIONS

Ambient Intelligence, Chatzigiannakis, Springer, 2019, pp. 330-336.*
Bouget, Elsevier, 2016, pp. 633-654.*
Forestier, Elsevier, 2018, pp. 3-11.*
Hajj, Elsevier, 2018, pp. 203-218.*
Wang, Springer, 2018, pp. 1959-1970.*
Abolmaesumi, 2012, Springer, pp. 167-177.*
Frangi, Springer, 2018, pp. 214-221.*
Medical Image Computing and Computer Assisted Intervention, Shen, Springer, 2019, pp. 476-484.*
Pattern Recognition Letters, Danelljan, Elsevier, 2019, pp. 74-81.*
Towards near real-time assessment of surgical skills, Anh, Springer, 2019, pp. 1-9.*
Wang, Springer, 2022, pp. 541-550, 2022.*
Zhu, Nov. 10, 2024, Arxiv, pp. 1-18.*
Abdi, H., "Bonferroni and Sidak Corrections for Multiple Comparisons,", indicated as corresponding to "Bonferroni and Sidak corrections for multiple comparisons. In N.J. Salkind (Ed.): Encyclopedia of Measurement and Statistics. Thousand Oaks (CA): Sage. pp. 103-107" at [URL: https://personal.utdallas.edu/~Herve/] acquired Aug. 14, 2023. Retrieved from [URL: https://personal.utdallas.edu/~Herve/Abdi-Bonferroni2007-pretty.pdf] on Aug. 14, 2023, 09 pages.
Azari, D., et al., "In Search of Characterizing Surgical Skill," Journal of Surgical Education, 2019, vol. 76 (5), pp. 1348-1363. Retrieved from an account with "Reprints Desk" [URL: https://www.researchsolutions.com/], 16 pages.
Batista, G.E., et al., "A Study of the Behavior of Several Methods for Balancing Machine Learning Training Data," ACM SIGKDD Explorations Newsletter, Jun. 2004, vol. 6(1), pp. 20-29. Retrieved from an account with "Reprints Desk" [URL: https://www.researchsolutions.com/] in Oct. 2023, 10 pages.
Berniker, M., et al. "A Probabilistic Approach to Surgical Tasks and Skill Metrics," Preprint (having a 2017 drafting placeholder date)

(56) References Cited

OTHER PUBLICATIONS corresponding to IEEE Transactions on Biomedical Engineering 69.7 (2021): 2212-2219. Retrieved from an account with "Reprints Desk" [URL: https://www.researchsolutions.com/] in Jan. 3, 2022, 09 pages.

Birkmeyer, J.D., et al., "Surgical Skill and Complication Rates After Bariatric Surgery," The New England Journal of Medicine, Oct. 2013, vol. 369(15), pp. 1434-1442. Retrieved from [URL: https://www.nejm.org/doi/pdf/10.1056/NEJMsa1300625?articleTools=true] on Aug. 18, 2023, 09 pages.

Brodersen, K.H., et al., online PDF indicated as corresponding to "The Balanced Accuracy and its Posterior Distribution," IEEE International Conference on Pattern Recognition, Aug. 2010, pp. 3121-3124. Retrieved from [URL: https://ong-home.my/papers/brodersen10post-balacc.pdf] on Aug. 18, 2023, 04 pages.

Brown, K., et al., "How to Bring Surgery to the Next Level: Interpretable Skills Assessment in Robotic-Assisted Surgery" as received in connection with the International Search Report and Written Opinion for Application No. PCT/US2022/026080, mailed on Aug. 3, 2022, as reference XP55945787, identified by the International Search Examiner as corresponding to Visceral Medicine, Jan. 1, 2020, vol. 36(6), pp. 463-470 and identified as retrieved from the internet [URL: https://www.karger.com/Article/Pdf/512437], however, note that the reference itself identifies the online publication date as instead being Oct. 28, 2020, 08 pages.

Caetano-Anolles, D., "Rank Sum Test," GATK team, webpage [URL: https://gatk.broadinstitute.org/hc/en-us/articles/360035531952-Rank-Sum-Test], as of Nov. 29, 2020. Retrieved from Internet Archive Wayback Machine [URL: https://web.archive.org/web/20201129230011/https://gatk.broadinstitute.org/hc/en-us/articles/360035531952-Rank-Sum-Test] on Aug. 14, 2023, 02 pages.

Chen, A., et al., "Comparison of Clinical Outcomes and Automated Performance Metrics in Robot-Assisted Radical Prostatectomy With and Without Trainee Involvement," World Journal of Urology, 2019, vol. 38 (7), pp. 1615-1621. Indicated as available as ePub Nov. 14, 2019 at [URL: https://pubmed.ncbi.nlm.nih.gov/31728671/] as retrieved Aug. 18, 2023. Retrieved from [URL: https://www.ncbi.nlm.nih.gov/pmc/articles/PMC7220822/pdf/nihms-1543180.pdf] on Aug. 18, 2023, 13 pages.

Chen, J., et al., "Effect of Surgeon Experience and Bony Pelvic Dimensions on Surgical Performance and Patient Outcomes in Robot-Assisted Radical Prostatectomy," BJU International, Nov. 2019, vol. 124(5), pp. 828-835. Retrieved from an account with "Reprints Desk" [URL: https://www.researchsolutions.com/] on Aug. 16, 2023, 17 pages.

Chen, J., et al., "Objective Assessment of Robotic Surgical Technical Skill: A Systematic Review," The Journal of Urology, Mar. 2019, vol. 201(3), pp. 461-469. Retrieved from [URL: https://www.auajournals.org/dol/pdf/10.1016/j.juro.2018.06.078] on Aug. 8, 2023, 09 pages.

Chicco, D. and Jurman, G., "The Advantages of the Matthews Correlation Coefficient (MCC) over F1 Score and Accuracy in Binary Classification Evaluation," BMC Genomics, Jan. 2020, vol. 21(1), pp. 1-13. Retrieved from [URL: https://www.ncbi.nlm.nih.gov/pmc/articles/PMC6941312/pdf/12864_2019_Article_6413.pdf] on Aug. 18, 2023, 13 pages.

Curry, M., et al., "Objective Assessment in Residency-based Training for Transoral Robotic Surgery," The Laryngoscope, Oct. 2012, vol. 122 (10), pp. 2184-2192. Retrieved from [URL: https://www.ncbi.nlm.nih.gov/pmc/articles/PMC4572744/pdf/nihms403954.pdf] on Aug. 18, 2023, 18 pages.

Dev, H., et al., "Detailed Analysis of Operating Time Learning Curves in Robotic Prostatectomy by a Novice Surgeon," BJU International, Apr. 2012, vol. 109 (7), pp. 1074-1080. Retrieved from an account with "Reprints Desk" [URL: https://www.researchsolutions.com/] in Oct. 2023, 07 pages.

Dipietro, R., et al., "Recognizing Surgical Activities with Recurrent Neural Networks" arXiv preprint arXiv: 1606.06329 (2016). Retrieved from [URL: https://arxiv.org/pdf/1606.06329.pdf] on Aug. 8, 2023, 08 pages.

El-Saig, D., et al., "A Graphical Tool for Parsing and Inspecting Surgical Robotic Datasets" as received in connection with the International Search Report and Written Opinion for Application No. PCT/US2022/026080, mailed on Aug. 3, 2022, as reference XP033671980, identified as appearing in 2018 IEEE 18th International Symposium on Computational Intelligence and Informatics (CINTI), IEEE, Nov. 21, 2018, pp. 131-136, 06 pages.

Estrada, S., et al., "Smoothness of Surgical Tool Tip Motion Correlates to Skill in Endovascular Tasks," IEEE Transactions on Human-Machine Systems, Oct. 2016, vol. 46(5), pp. 647-659. Retrieved from [URL: https://mahilab.rice.edu/sites/default/files/publications/J23Estrada_press.pdf] on Aug. 8, 2023, 13 pages.

Fard, M.J., et al., online PDF indicated as corresponding to "Automated Robot-Assisted Surgical Skill Evaluation: Predictive Analytics Approach," The International Journal of Medical Robotics + Computer Assisted Surgery, Feb. 2018, vol. 14 (1), pp. 1-10. Retrieved from [URL: https://deepblue.lib.umich.edu/bitstream/handle/2027.42/141457/rcs1850.pdf?sequence=1] on Aug. 18, 2023, 10 pages.

Fecso, A.B., et al., "Relationship Between Intraoperative Nontechnical Performance and Technical Events in Bariatric Surgery," The British Journal of Surgery, Jul. 2018, vol. 105(8), pp. 1044-1050. Retrieved from [URL: https://academic.oup.com/bjs/article/105/8/1044/6095423] on Aug. 16, 2023, 07 pages.

Gao, Y., et al., "JHU-ISI Gesture and Skill Assessment Working Set ( JIGSAWS ): A Surgical Activity Dataset for Human Motion Modeling," In MICCAI Workshop: M2CAI, 2014, pp. 1-10. Retrieved from [URL: https://cirl.lcsr.jhu.edu/wp-content/uploads/2015/11/JIGSAWS.pdf] on Aug. 8, 2023, 10 pages.

Ghani, K.R., et al., "Measuring to Improve: Peer and Crowd-sourced Assessments of Technical Skill with Robot-Assisted Radical Prostatectomy," European Urology, Apr. 2016, vol. 69(4), pp. 547-550. Retrieved from [URL: https://musicurology.com/wp-content/uploads/2022/02/Measuring-to-Improve-Peer-and-Crowd-sourced-Assessments-of-Technical-Skill-with-RRP.pdf] on Aug. 8, 2023, 04 pages.

Gibaud, B., et al., online PDF indicated as corresponding to "Toward a Standard Ontology of Surgical Process Models." International Journal of Computer Assisted Radiology and Surgery, Sep. 2018, vol. 13 (9), pp. 1-13. Retrieved from [URL: https://hal.science/hal-01862533v3/document] on Aug. 18, 2023, 14 pages.

Goh, A.C., et al., "Global Evaluative Assessment of Robotic Skills: Validation of a Clinical Assessment Tool to Measure Robotic Surgical Skills," The Journal of Urology, Jan. 2012, vol. 187(1), pp. 247-252. Retrieved from an account with "Reprints Desk" [URL: https://www.researchsolutions.com/] in Oct. 2023, 06 pages.

Goldenberg, M.G., et al., "Implementing Assessments of Robot-Assisted Technical Skill in Urological Education: A Systematic Review and Synthesis of the Validity Evidence," BJU International, Sep. 2018, vol. 122(3), pp. 501-519. Retrieved from an account with "Reprints Desk" [URL: https://www.researchsolutions.com/] on Aug. 16, 2023, 19 pages.

Goldenberg, M.G., "Evidence That Surgical Performance Predicts Clinical Outcomes," World Journal of Urology, Jun. 2019, vol. 38 (7), pp. 1-3. Retrieved from an account with "Reprints Desk" [URL: https://www.researchsolutions.com/] in Oct. 2023, 03 pages.

Grantcharov, T.P. and Reznick, R.K., "Teaching Procedural Skills," BMJ, May 2008, vol. 336(7653), pp. 1129-1131. Retrieved from [URL: https://www.ncbi.nlm.nih.gov/pmc/articles/PMC2386620/pdf/bmj-336-7653-prac-01129.pdf] on Aug. 8, 2023, 03 pages.

Guan, D., et al., "A Review of Ensemble Learning Based Feature Selection," IETE Technical Review, Jun. 2014, vol. 31(3), pp. 190-198. Retrieved from an account with "Reprints Desk" [URL: https://www.researchsolutions.com/] in Oct. 2023, 10 pages.

Hung, A.J., et al., "A Deep-learning Model Using Automated Performance Metrics and Clinical Features to Predict Urinary Continence Recovery After Robot-Assisted Radical Prostatectomy," BJU International, Sep. 2019, vol. 124 (3), pp. 487-495. Retrieved from an account with "Reprints Desk" [URL: https://www.researchsolutions.com/] on Aug. 16, 2023, 09 pages.

Hung, A.J., et al., "Development and Validation of Objective Performance Metrics for Robot-Assisted Radical Prostatectomy: a Pilot Study," The Journal of Urology, Jan. 2018, vol. 199 (1), pp.

(56) References Cited

OTHER PUBLICATIONS 296-304. Retrieved from [URL: https://www.ncbi.nlm.nih.gov/pmc/articles/PMC8266176/pdf/nihms-1627539.pdf] on Aug. 14, 2023, 17 pages.

Hung, A.J., et al., "Experts vs Super-experts: Differences in Automated Performance Metrics and Clinical Outcomes for Robot-Assisted Radical Prostatectomy," BJU International, May 2019, vol. 123 (5), pp. 861-868. Retrieved from an account with "Reprints Desk" [URL: https://www.researchsolutions.com/] on Aug. 16, 2023, 08 pages.

Hung, A.J., et al., "Structured Learning for Robotic Surgery Utilizing a Proficiency Score: a Pilot Study," understood to correspond to World Journal of Urology, Jan. 2017, vol. 35 (1), pp. 27-34 though indicated as published online Apr. 22, 2016. Retrieved from an account with "Reprints Desk" [URL: https://www.researchsolutions.com/] in Oct. 2023, 08 pages.

Hung, A.J., et al., "Surgeon Automated Performance Metrics as Predictors of Early Urinary Continence Recovery After Robotic Radical Prostatectomy—a Prospective Bi-institutional Study," European Urology Open Science, May 2021, pp. 65-72. Retrieved from [URL: https://www.ncbi.nlm.nih.gov/pmc/articles/PMC8095672/pdf/main.pdf] on Aug. 8, 2023, 08 pages.

"Imbalanced-learn API", API webpage [URL: https://imbalanced-learn.readthedocs.io/en/stable/api.html], as of Nov. 24, 2020. Retrieved from Internet Archive Wayback Machine [URL: https://web.archive.org/web/20201124100055/https://imbalanced-learn.readthedocs.io/en/stable/api.html] on Aug. 14, 2023, 03 pages.

International Preliminary Report on Patentability for Application No. PCT/US2021/060900 mailed Jun. 15, 2023, 11 pages.

International Search Report and Written Opinion for Application No. PCT/US2021/060900, mailed Apr. 20, 2022, 16 pages.

International Search Report and Written Opinion for Application No. PCT/US2022/026080, mailed on Aug. 3, 2022, 13 pages.

Invitation to Pay Additional Fees and Partial International Search Report for PCT/US2021/060900, mailed Feb. 25, 2022, 11 pages.

James, G., et al., "An Introduction to Statistical Learning with Applications in R," online PDF, indicated as corresponding to "An Introduction to Statistical Learning with Applications in R," Springer Science+Business Media New York 2013. Retrieved from [URL: https://www.stat.berkeley.edu/users/rabbee/s154/ISLR_First_Printing.pdf] on Aug. 16, 2023, and redacted to retain the following PDF pp. 1-15 (prefatory materials and contents), 142-217 (Chapters 4 and 5), and 434-441 (index), resulting in 99 pages.

Jarc. A., et al., "Viewpoint matters: objective performance metrics for surgeon endoscope control during robot-assisted surgery" as received in connection with the International Search Report and Written Opinion for Application No. PCT/US2022/026080, mailed on Aug. 3, 2022, as reference XP036161330, identified as appearing in Surgical Endoscopy, 2017, vol. 31 (3), pp. 1192-1202, 11 pages.

Kloek, C.E., et al., "A Broadly Applicable Surgical Teaching Method: Evaluation of a Stepwise Introduction to Cataract Surgery," Journal of Surgical Education, 2014, vol. 71 (2), pp. 169-175. Retrieved from an account with "Reprints Desk" [URL: https://www.researchsolutions.com/] in Oct. 2023, 07 pages.

Laurikkala, J., "Improving Identification of Difficult Small Classes by Balancing Class Distribution," Proceedings of the 8th Conference on AI in Medicine in Europe: Artificial Intelligence Medicine, Jul. 2001, pp. 63-66. Retrieved from an account with "Reprints Desk" [URL: https://www.researchsolutions.com/] in Oct. 2023, 04 pages.

Lazar, J., et al., "Objective Performance Indicators of Cardiothoracic Residents Are Associated with Vascular Injury During Robotic-Assisted Lobectomy on Porcine Models" as received in connection with the International Search Report and Written Opinion for Application No. PCT/US2022/026080, mailed on Aug. 3, 2022, as reference XP55945789, identified as appearing in Research Square, Jun. 8, 2022, and as retrieved from the Internet via [URL: https://doi.org/10.21203/rs.3.rs-1737899/v1], 17 pages.

Lecuyer, G., et al., "Assisted phase and step annotation for surgical videos," understood to correspond to International Journal of Computer Assisted Radiology and Surgery, Apr. 2020, vol. 15 (4), pp. 673-680 though indicated as published online Feb. 10, 2020. Retrieved from an account with "Reprints Desk" [URL: https://www.researchsolutions.com/] in Oct. 2023, 08 pages.

Lemaitre, G., et al., "Imbalanced-learn: A Python Toolbox to Tackle the Curse of Imbalanced Datasets in Machine Learning," Journal of Machine Learning Research, 2017, vol. 18, pp. 1-5. Retrieved from [URL: https://www.jmlr.org/papers/volume18/16-365/16-365.pdf] on Jul. 6, 2023, 05 pages.

Liu, M., et al., "Assessment of Robotic Console Skills (ARCS): construct validity of a novel global rating scale for technical skills in robotically assisted surgery," understood to correspond to Surgical Endoscopy, Jan. 2018, vol. 32(1), pp. 526-535 though indicated as published online Jul. 1, 2017. Retrieved from an account with "Reprints Desk" [URL: https://www.researchsolutions.com/] in Oct. 2023, 10 pages.

Loukas, C., "Video content analysis of surgical procedures," Surgical Endoscopy, Feb. 2018, vol. 32(2), pp. 553-568. Retrieved from an account with "Reprints Desk" [URL: https://www.researchsolutions.com/] in Oct. 2023, 16 pages.

Lyman, W.B., et al., "Novel Objective Approach to Evaluate Novice Robotic Surgeons Using a Combination of Kinematics and Stepwise Cumulative Sum Analyses," Journal of the American College of Surgeons, Oct. 2018, vol. 227(4), pp. S223-S224. Retrieved from an account with "Reprints Desk" [URL: https://www.researchsolutions.com/] in Oct. 2023, 02 pages.

Maier-Hein, L., et al., "Surgical Data Science—from Concepts toward Clinical Translation," Medical Image Analysis, Feb. 2022, 76:102306, pp. 1-95. Retrieved from [URL: https://www.ncbi.nlm.nih.gov/pmc/articles/PMC9135051/pdf/nihms-1802848.pdf] on Aug. 8, 2023, 95 pages.

Maier-Hein, L., et al., "Surgical data science: enabling next-generation surgery." arXiv preprint arXiv:1701.06482 (2017). Per [URL: https://spiral.imperial.ac.uk/handle/10044/1/62866] retrieved Oct. 25, 2023, understood to correspond to Maier-Hein, L., et al., Surgical data science for next-generation interventions. Nature Biomedical Engineering. 1(9):691-696, 2017. Retrieved from [URL: https://arxiv.org/pdf/1701.06482] on Oct. 26, 2023, 10 pages.

Matthews, B.W., "Comparison of the Predicted and Observed Secondary Structure of T4 Phage Lysozyme," Biochimica et Biophysica Acta, Oct. 1975, vol. 405(2), pp. 442-451. Retrieved from an account with "Reprints Desk" [URL: https://www.researchsolutions.com/] in Oct. 2023, 10 pages.

Ozdemir-Van Brunschot, D.M.D., et al., "Surgical Team Composition Has a Major Impact on Effectiveness and Costs in Laparoscopic Donor Nephrectomy," World Journal of Urology, May 2015, vol. 33(5), pp. 733-741. Retrieved from an account with "Reprints Desk" [URL: https://www.researchsolutions.com/] in Oct. 2023, 09 pages.

Padoy, N., "Machine and deep learning for workflow recognition during surgery," Minimally Invasive Therapy & Allied Technologies, Apr. 2019, vol. 28 (2), pp. 82-90. Retrieved from an account with "Reprints Desk" [URL: https://www.researchsolutions.com/] in Oct. 2023, 10 pages.

Peabody, J.O., et al., "Wisdom of the Crowds: Use of Crowdsourcing to Assess Surgical Skill of Robot-Assisted Radical Prostatectomy in a Statewide Surgical Collaborative" European Urology Supplements, Apr. 2015, vol. 14(2), pp. e192-e192a. Acquired from [URL: https://www.auajournals.org/doi/epdf/10.1016/j.juro.2015.02.1826] on Aug. 16, 2023, 02 pages.

Pearce, S.M., et al., "The Impact of Days off Between Cases on Perioperative Outcomes for Robotic-assisted Laparoscopic Prostatectomy," understood to correspond to World Journal of Urology, Feb. 2016, vol. 34(2), pp. 269-274 though indicated as published online Jun. 5, 2015. Retrieved from an account with "Reprints Desk" [URL: https://www.researchsolutions.com/] in Oct. 2023, 06 pages.

Pedregosa, F., et al., "Scikit-learn: Machine Learning in Python," Journal of Machine Learning Research, 2011, vol. 12, pp. 2825-2830. Retrieved from [URL: https://www.jmlr.org/papers/volume12/pedregosa11a/pedregosa11a.pdf] on Aug. 8, 2023, 06 pages.

Powers, M.K., et al., "Crowdsourcing Assessment of Surgeon Dissection of Renal Artery and Vein During Robotic Partial

(56) References Cited

OTHER PUBLICATIONS

Nephrectomy: A Novel Approach for Quantitative Assessment of Surgical Performance," Journal of Endourology, Apr. 2016, vol. 30(4), pp. 447-452. Retrieved from an account with "Reprints Desk" [URL: https://www.researchsolutions.com/] in Oct. 2023, 06 pages.

Raad, W.N., et al., "Robotic Thoracic Surgery Training for Residency Programs: a Position Paper for an Educational Curriculum," Innovations, Dec. 2018, vol. 13 (6), pp. 417-422. Retrieved from an account with "Reprints Desk" [URL: https://www.researchsolutions.com/] in Oct. 2023, 06 pages.

Reiley, C.E., et al., "Review of Methods for Objective Surgical Skill Evaluation," Surgical Endoscopy, Feb. 2011, vol. 25, pp. 356-366. Retrieved from an account with "Reprints Desk" [URL: https://www.researchsolutions.com/] in Oct. 2023, 11 pages.

Sarikaya, D. and Jannin, P., "Surgical Activity Recognition Using Learned Spatial Temporal Graph Representations of Surgical Tools," arXiv preprint arXiv:2001.03728 (2020). Indicated as corresponding to IEEE Transactions on Medical Imaging, Aug. 2020, pp. 1-8 (n.b., this is the fourth version of the paper appearing in arXiv [URL: https://arxiv.org/abs/2001.03728v4] as of Oct. 26, 2023; earlier versions appear to have been instead titled "Towards Generalizable Surgical Activity Recognition Using Spatial Temporal Graph Convolutional Networks"). Retrieved from [URL: https://arxiv.org/pdf/2001.03728.pdf] on Aug. 18, 2023, 08 pages.

Satava, R.M., et al., "Proving the Effectiveness of the Fundamentals of Robotic Surgery (FRS) Skills Curriculum: A Single-blinded, Multispecialty, Multi-institutional Randomized Control Trial," Understood to correspond to Annals of Surgery, Aug. 2020, vol. 272(2), though indicated as published 2019. Retrieved from an account with "Reprints Desk" [URL: https://www.researchsolutions.com/] in Oct. 2023, 10 pages.

Scott, D. "Multivariate Density Estimation and Visualization" online PDF, indicated as posted upon Jun. 16, 2007 at [URL: http://yaroslavvb.com/papers/] as acquired Aug. 16, 2023. Acquired from [URL: http://yaroslavvb.com/papers/scott-multivariate.pdf] on Aug. 16, 2023, 26 pages.

Silverman, B.W., "Density Estimation for Statistics and Data Analysis," understood to correspond to Monographs on Statistics and Applied Probability, 1986, pp. 1-22. Retrieved from [URL: https://ned.ipac.caltech.edu/level5/March02/Silverman/paper.pdf] on Aug. 8, 2023, 22 pages.

Van Amsterdam, B., et al., "Weakly Supervised Recognition of Surgical Gestures," IEEE International Conference on Robotics and Automation, Jul. 2019, pp. 9565-9571. Retrieved from an account with "Reprints Desk" [URL: https://www.researchsolutions.com/] in Oct. 2023, 07 pages.

Vedula, S.S., et al., "Objective Assessment of Surgical Technical Skill and Competency in the Operating Room," Annual Review of Biomedical Engineering, Jun. 2017, vol. 19, pp. 301-325. Retrieved from [URL: https://www.ncbi.nlm.nih.gov/pmc/articles/PMC5555216/pdf/nihms889835.pdf] on Oct. 26, 2023, 31 Pages.

Vertut, J., and Coiffet, P., "Robot Technology: Teleoperation and Robotics Evolution and Development," English translation, Prentice-Hall, Inc., Inglewood Cliffs, NJ, USA 1986, vol. 3A. 332 pages.

Virtanen, P., et al., "SciPy 1.0: Fundamental Algorithms for Scientific Computing in Python," Nature Methods, Mar. 2020, vol. 17, pp. 261-272. Retrieved from [URL: https://www.ncbi.nlm.nih.gov/pmc/articles/PMC7056644/pdf/41592_2019_Article_686.pdf] on Aug. 8, 2023, 12 pages.

Zia, A. and Essa, I. "Automated Surgical Skill Assessment in RMIS Training" arXiv preprint arXiv: 1712.08604 (2017). Retrieved from [URL: https://arxiv.org/pdf/1712.08604.pdf] on Aug. 18, 2023, 12 pages.

Zia, A., et al., "Novel Evaluation of Surgical Activity Recognition Models Using Task-Based Efficiency Metrics," arXiv preprint arXiv: 1712.08604 (2019). Retrieved from [URL: https://arxiv.org/pdf/1907.02060.pdf] on Oct. 11, 2023, 12 pages.

Zia, A., et al., "Temporal clustering of surgical activities in robot-assisted surgery," International Journal of Computer Assisted Radiology and Surgery, Jul. 2017, vol. 12 (7), pp. 1171-1178. Retrieved from [URL: https://www.ncbi.nim.nih.gov/pmc/articles/PMC5509863/pdf/11548_2017_Article_1600.pdf] on Aug. 8, 2023, 08 pages.

Zia, A., et al. "Surgical Activity Recognition in Robot-Assisted Radical Prostatectomy Using Deep Learning." Medical Image Computing and Computer Assisted Intervention—MICCAI 2018: 21st International Conference, Granada, Spain, Sep. 16-20, 2018, Proceedings, Part IV 11. Springer International Publishing, 2018. Retrieved from an account with "Reprints Desk" [URL: https://www.researchsolutions.com/] in Jul. 2023, 08 pages.

International Search Report and Written Opinion for Application No. PCT/US2024/028840, mailed on Sep. 16, 2024, 14 pages.

\* cited by examiner

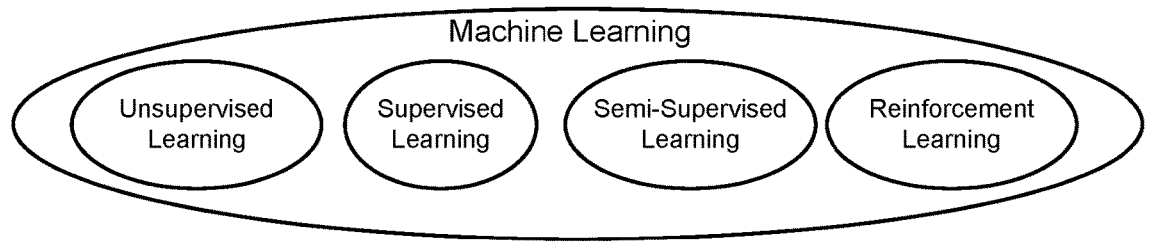
*FIG. 2A*
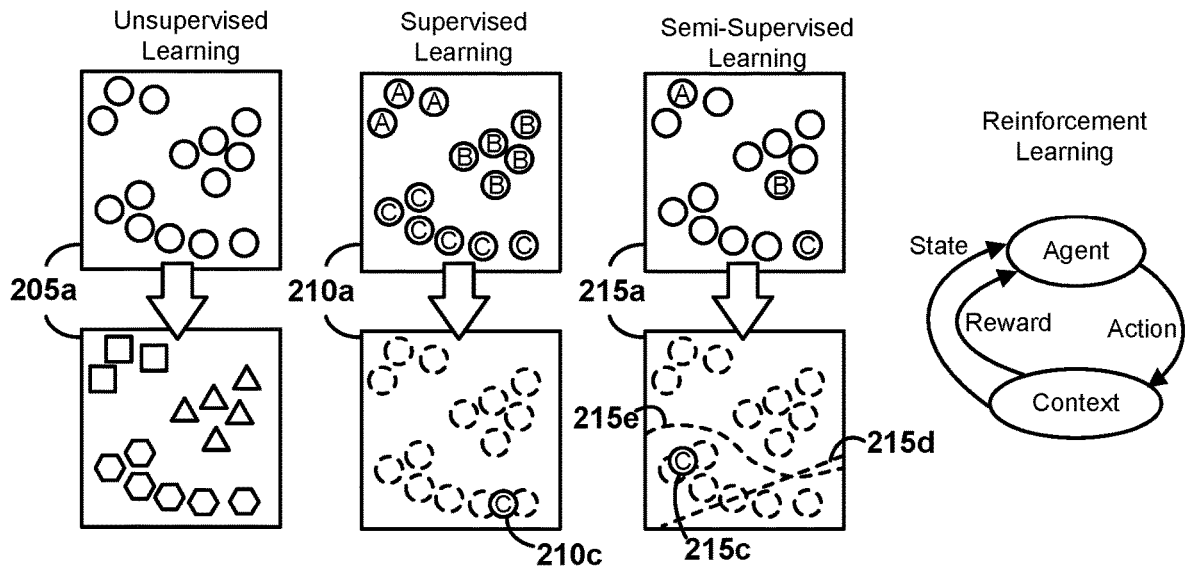
*FIG. 2B*  *FIG. 2C*  *FIG. 2D*  *FIG. 2E*
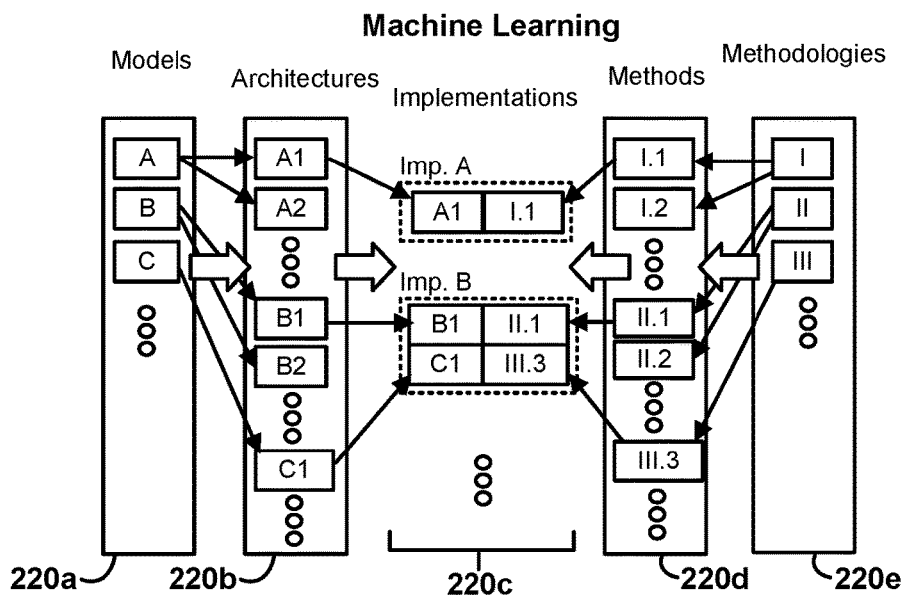
*FIG. 2F*

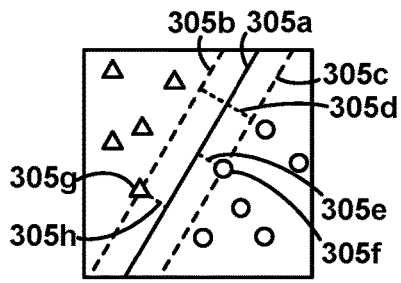
FIG. 3A
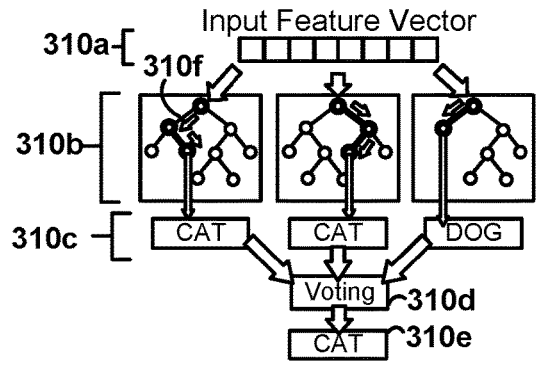
FIG. 3B
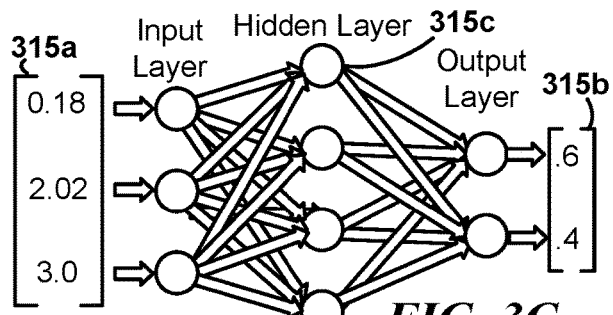
FIG. 3C
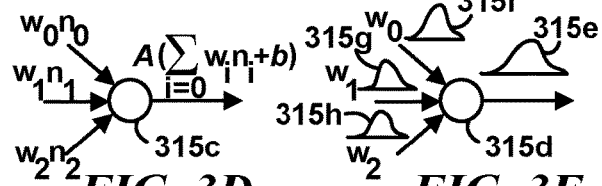
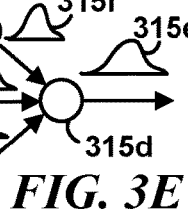
FIG. 3D  FIG. 3E
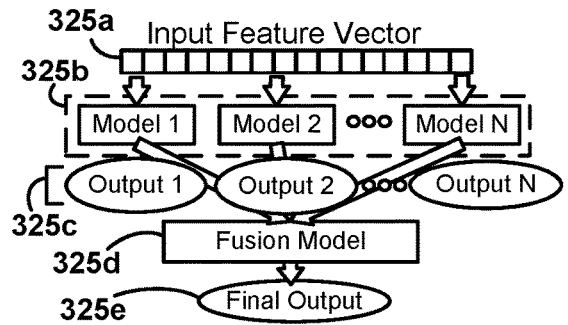
FIG. 3G
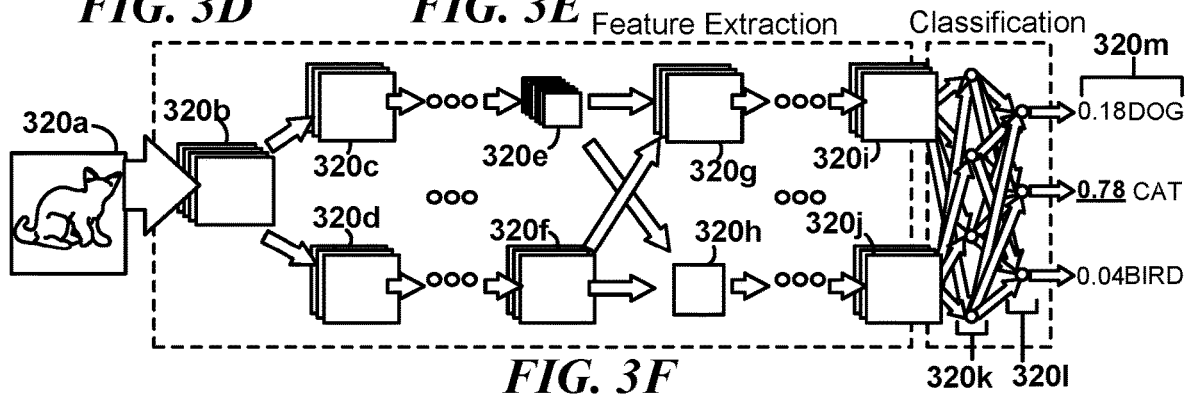
FIG. 3F
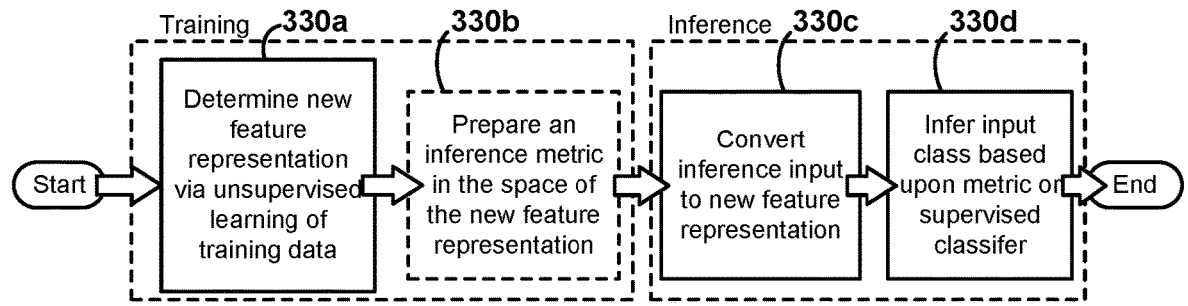
FIG. 3H

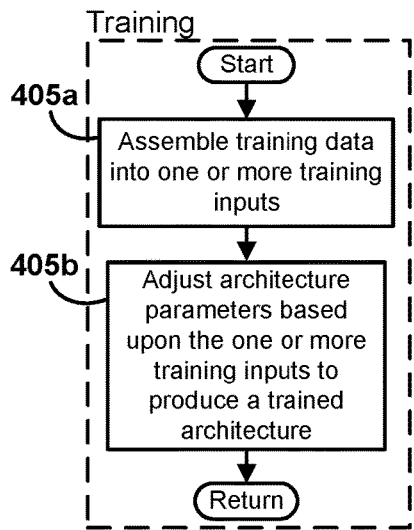
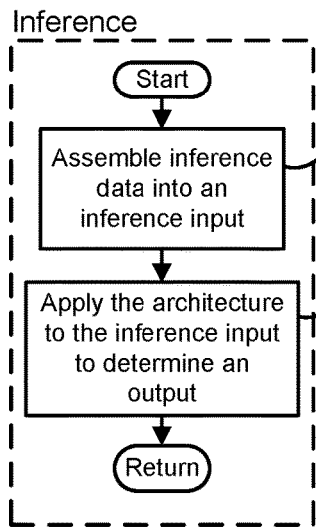
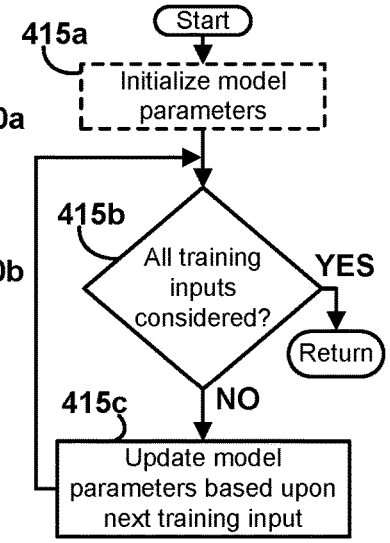
FIG. 4A          FIG. 4B          FIG. 4C
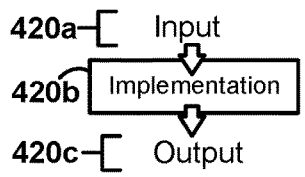
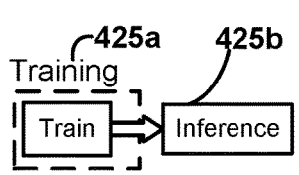
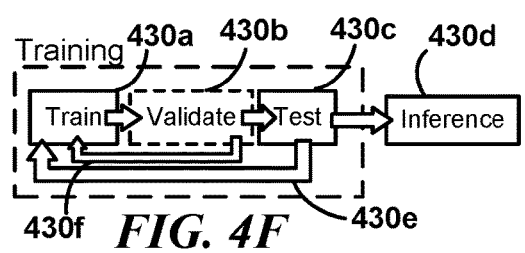
FIG. 4D          FIG. 4E          FIG. 4F
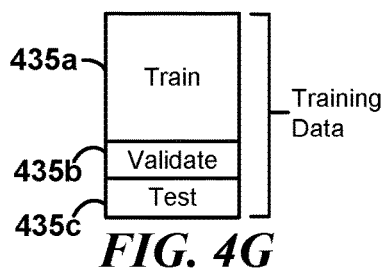
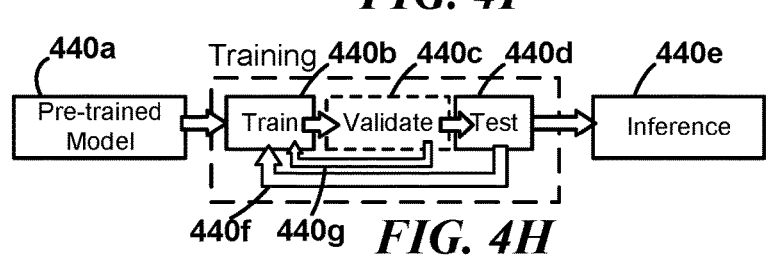
FIG. 4G          FIG. 4H
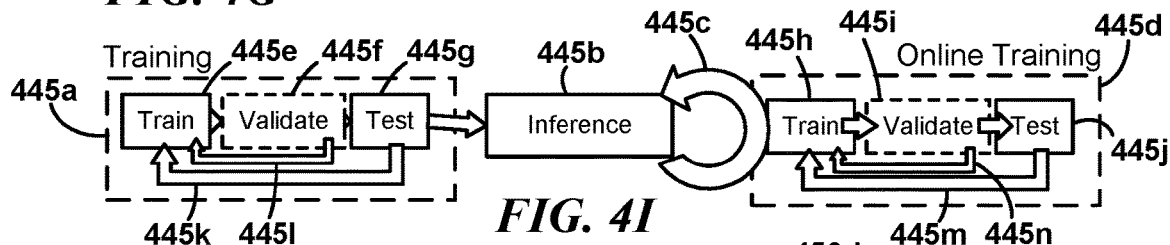
FIG. 4I
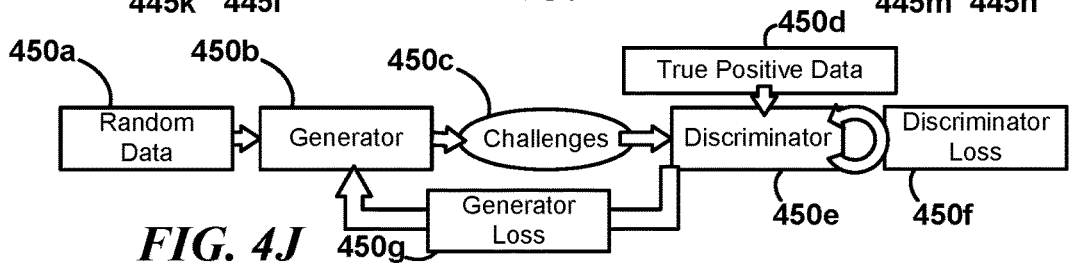
FIG. 4J

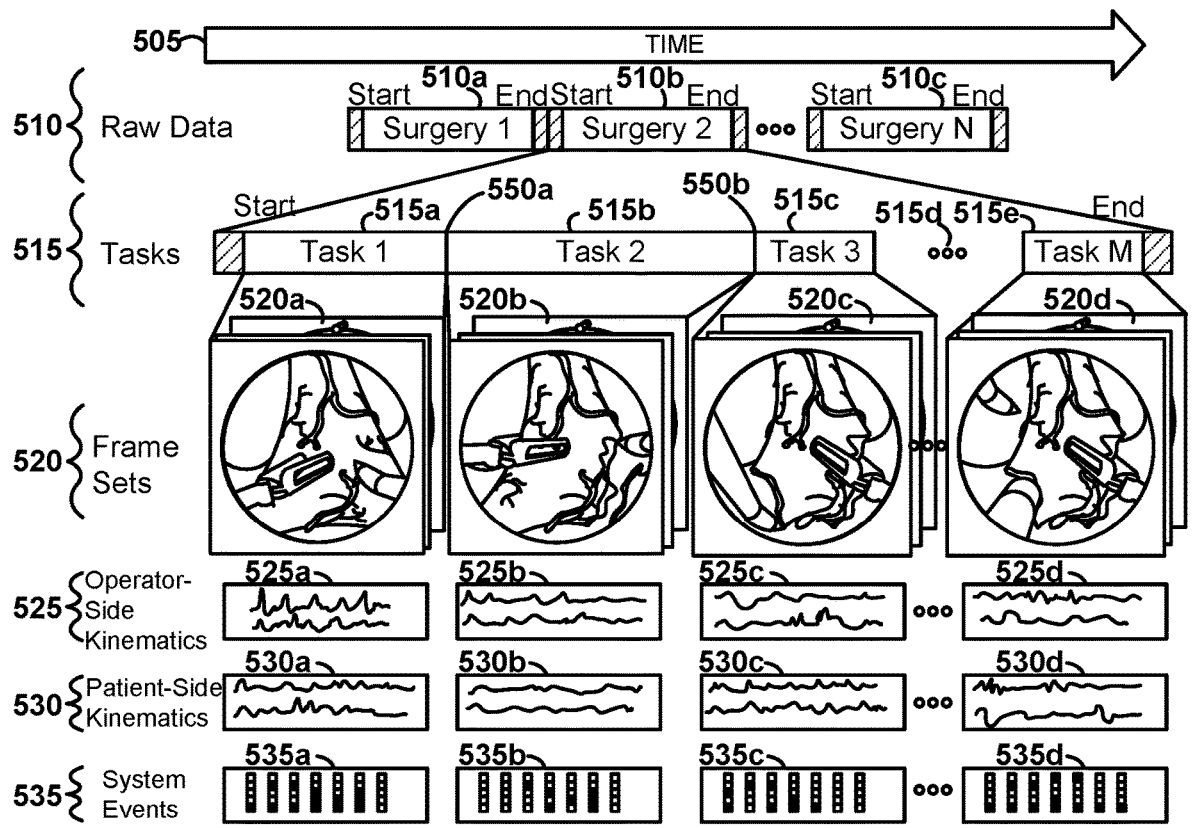

*FIG. 5A*

| Task name | Description | Start point | End point |
|---|---|---|---|
| Mobilize Colon | Exposing the prostate in the retropubic space by mobilizing the colon | First tool interaction with colon or surrounding tissue | Last tool interaction with colon or surrounding tissue |
| Endopelvic Fascia Dissection | Separation of the lateral edges of prostate from the endopelvic fascia (blunt sweeping motions) and exposing apex | First tool-tissue interaction that is directed at the endopelvic fascia (EPF) | Last tissue interaction with the EPF after the prostate is defatted and separated from EPF |
| Apical Dissection | Dissection of the apex of the prostate ultimately results in freed specimen | First tool-tissue interaction, often to orient the prostate for apical dissection | Prostate has been freed from all attachments |

*FIG. 5B*

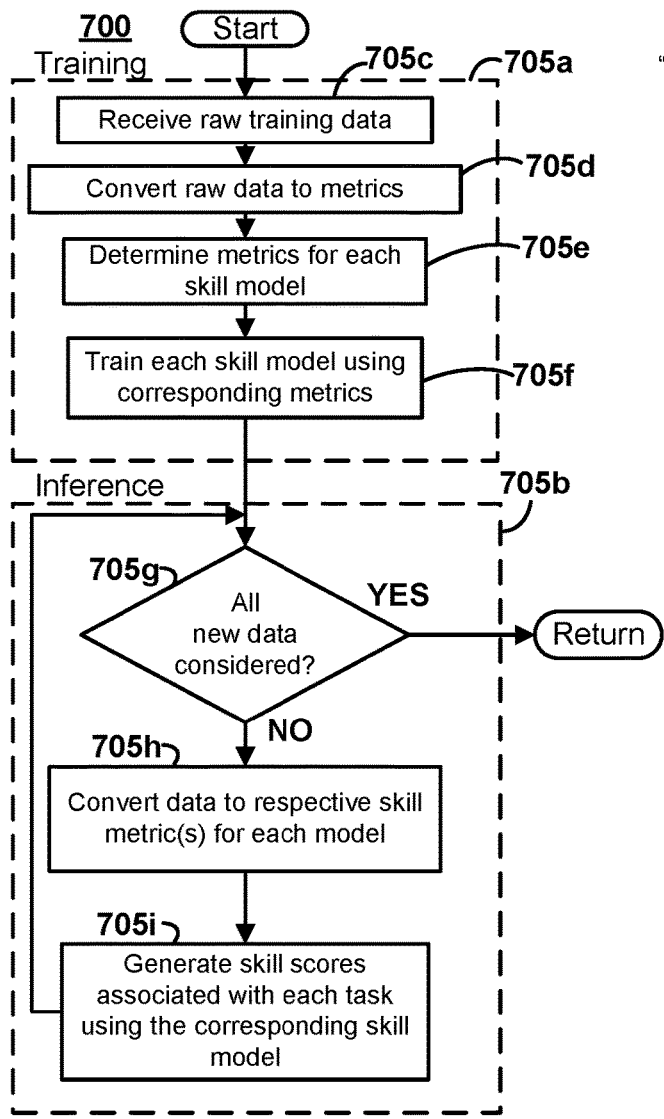
FIG. 7A
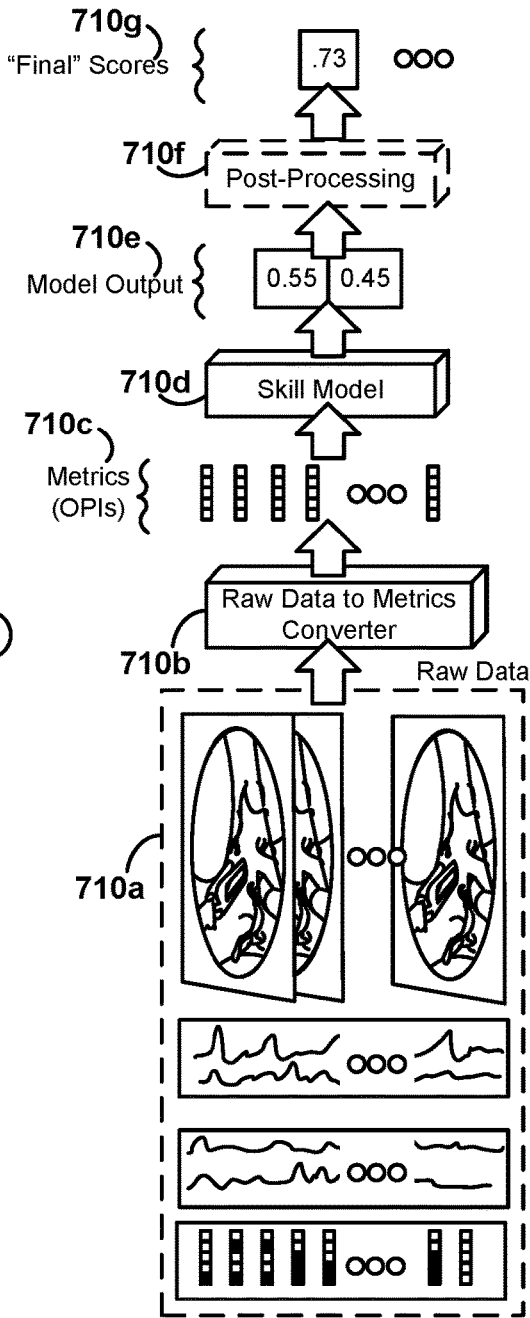
FIG. 7B
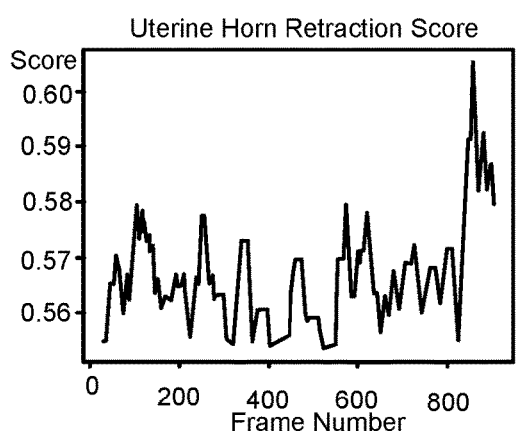
FIG. 7D
FIG. 7C

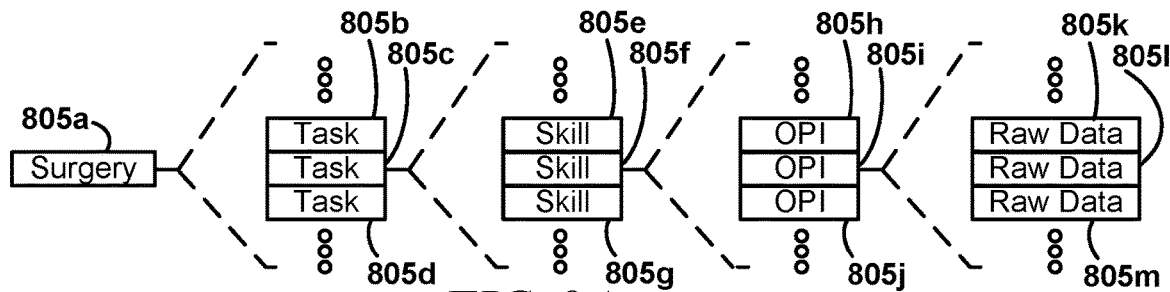
FIG. 8A
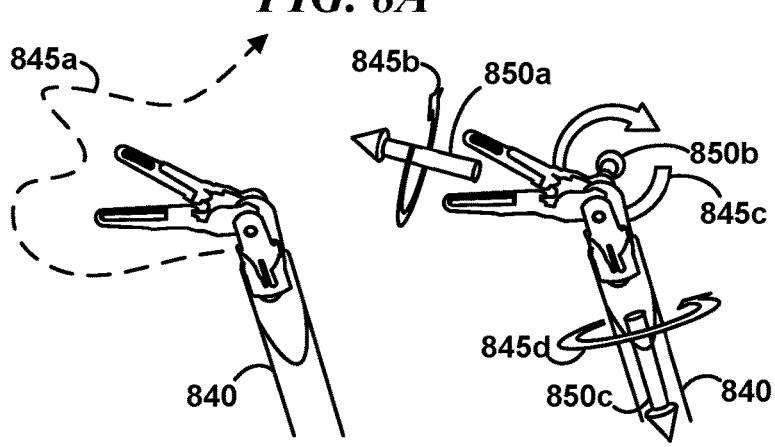
FIG. 8B  FIG. 8C
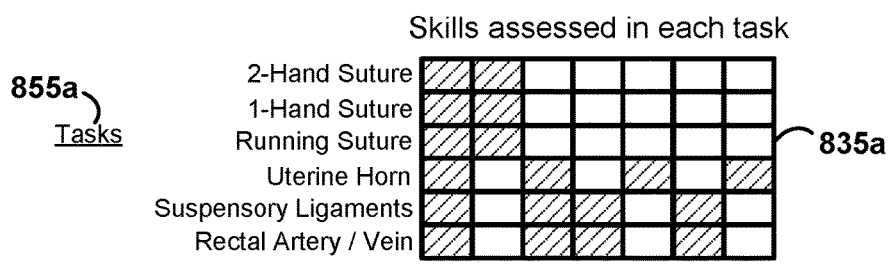
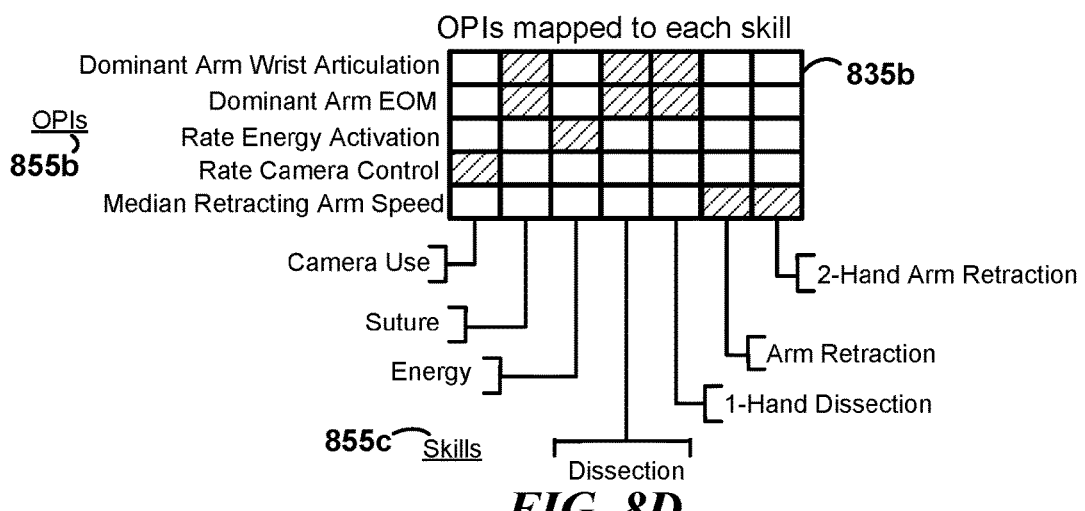
FIG. 8D

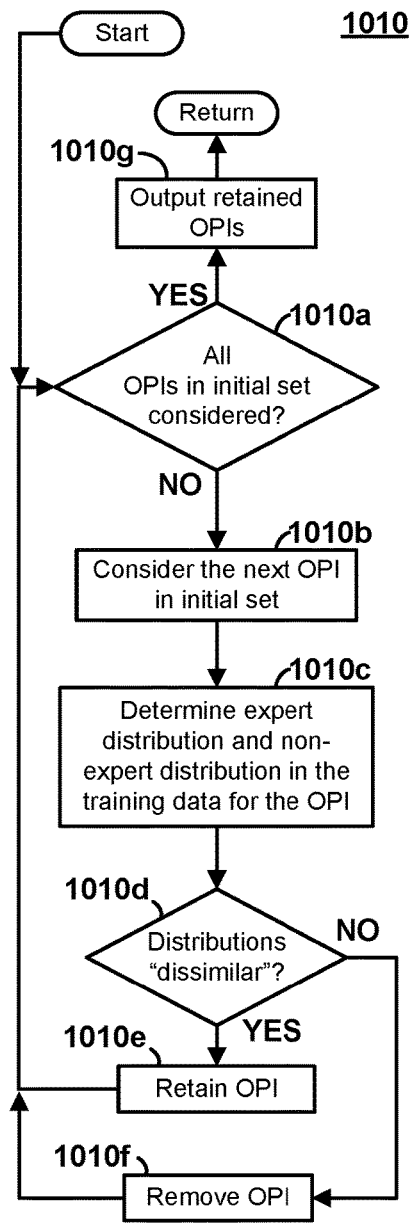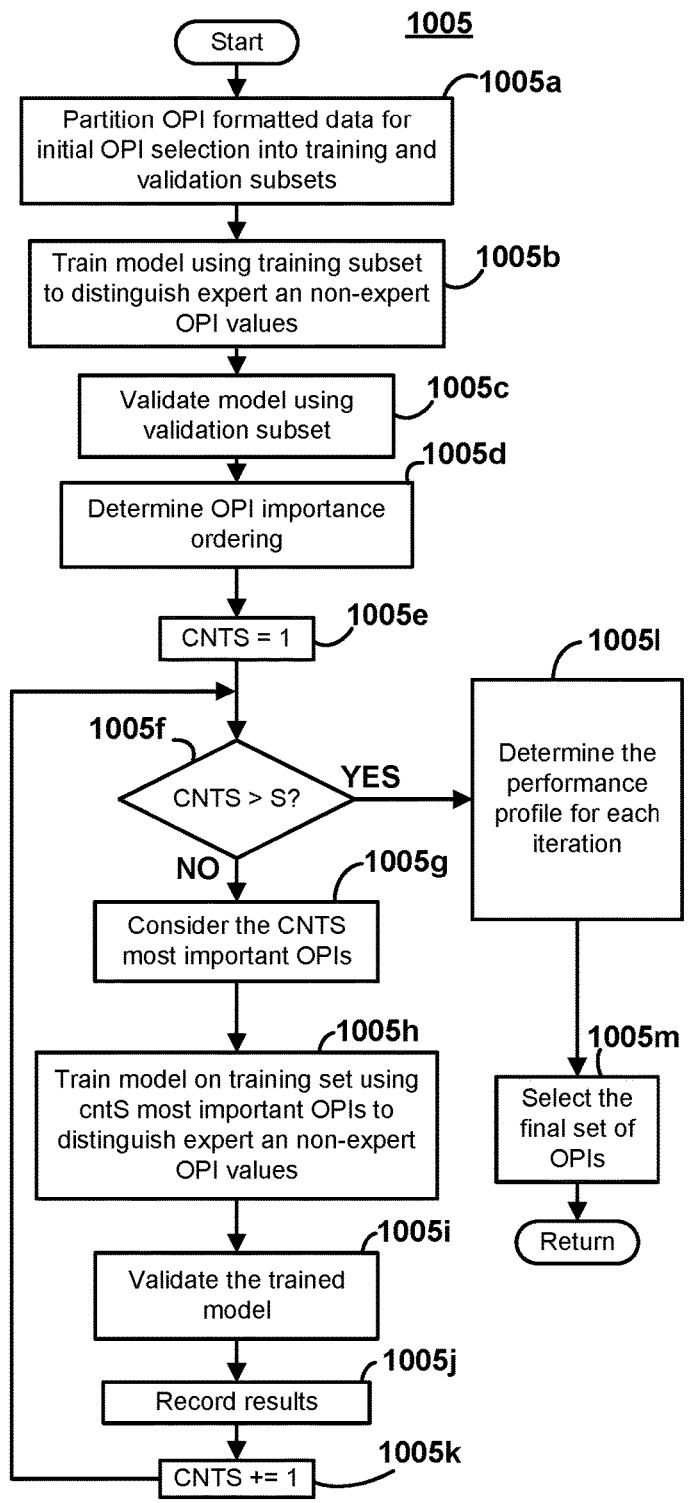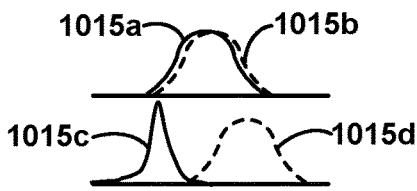
FIG. 10A
FIG. 10B
FIG. 10C

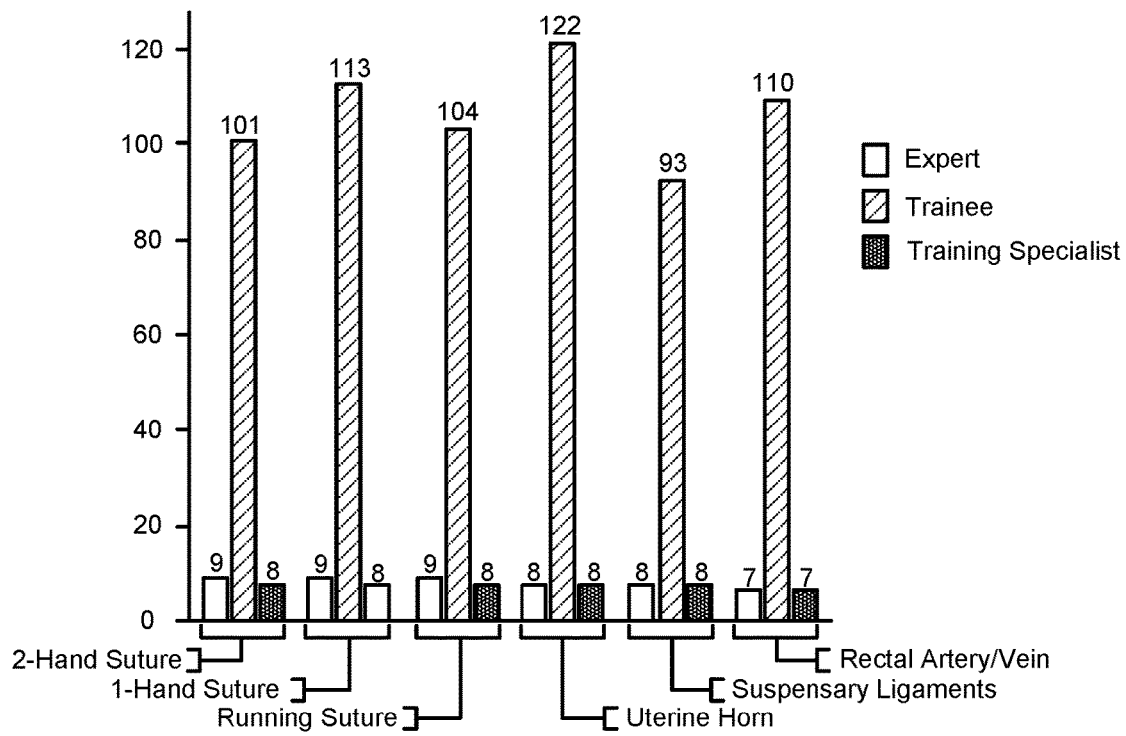

*FIG. 14A*

| Task | Task Model Accuracy | Task Model MCC | Skill | Skill Model Accuracy | Skill Model MCC |
|---|---|---|---|---|---|
| 2-Hand Suture | 89.28 | 0.78 | Suture | 90.54 | 0.74 |
| | | | Camera Use | 86.34 | 0.69 |
| Uterine Horn | 93.14 | 0.83 | 1-Hand Dissection | 84.58 | 0.63 |
| | | | 2-Hand Arm Retraction | 87.25 | 0.70 |
| | | | Energy | 84.91 | 0.59 |
| | | | Camera Use | 76.32 | 0.49 |
| 1-Hand Suture | 95.67 | 0.90 | Suture | 83.83 | 0.63 |
| | | | Camera Use | 95.44 | 0.87 |
| Suspensory Ligaments | 91.21 | 0.75 | Dissection | 77.43 | 0.51 |
| | | | Arm Retraction | 78.62 | 0.45 |
| | | | Energy | 85.72 | 0.64 |
| | | | Camera Use | 89.57 | 0.79 |
| Running Suture | 98.27 | 0.91 | Suture | 94.44 | 0.86 |
| | | | Camera Use | 77.40 | 0.53 |
| Rectal Artery/Vein | 80.24 | 0.52 | Dissection | 78.33 | 0.50 |
| | | | Arm Retraction | 80.48 | 0.46 |
| | | | Energy | 83.33 | 0.65 |
| | | | Camera Use | 79.29 | 0.52 |

*FIG. 14B*

| OPI | Arm | Skills | Tasks | Description |
|---|---|---|---|---|
| Rate arm swap (events/sec) | SCE | AR, 2-HAR | UH, SL, RA/V | The number of retracting arm swaps events per second |
| Arm Swap Event Count | SCE | AR, 2-HAR | UH, SL, RA/V | The total number of retracting arm swap events |
| Proportion Active Time | Cam | CU | 2-HS, 1-HS, RS, UH, SL, RA/V | The amount of time the endoscope arm was actively in use over the total duration of the task |
| Proportion Active Time | D | S, D, 1-HD | 2-HS, 1-HS, RS, UH, SL, RA/V | The amount of time the D instrument arm was actively in use over the total duration of the task |
| Proportion Active Time | N-D | S, D, 2-HAR | 2-HS, 1-HS, RS, UH, SL, RA/V | The amount of time the non-D arm was actively in use over the total duration of the task |
| Proportion Active Time | Ret | AR, 2-HAR | UH, SL, RA/V | The amount of time the endoscope arm was actively in use over the total duration of the task |
| Total linear distance | Cam | CU | 2-HS, 1-HS, RS, UH, SL, RA/V | The total linear distance traveled by the endoscope arm as measured from the change in position of the clevis during a task |
| Total linear distance | D | S, D, 1-HD | 2-HS, 1-HS, RS, UH, SL, RA/V | The total linear distance traveled by the D instrument arm as measured from the change in position of the clevis during a task |
| Total linear distance | N-D | S, D, 2-HAR | 2-HS, 1-HS, RS, UH, SL, RA/V | The total linear distance traveled by the non-D instrument arm as measured from the change in position of the clevis during a task |
| Total linear distance | Ret | AR, 2-HAR | UH, SL, RA/V | The total linear distance traveled by the retracting instrument arm as measured from the change in position of the clevis during a task |
| Median movement speed | Cam | CU | 2-HS, 1-HS, RS, UH, SL, RA/V | The median speed of the endoscope arm as measured from the change in clevis position over time |
| Median movement speed | D | S, D, 1-HD | 2-HS, 1-HS, RS, UH, SL, RA/V | The median speed of the D instrument arm as measured from the change in clevis position over time |

*FIG. 17*

| OPI | Arm | Skills | Tasks | Description |
|---|---|---|---|---|
| Median movement speed | N-D | S, D, 2-HAR | 2-HS, 1-HS, RS, UH, SL, RA/V | The median speed of the non-D instrument arm as measured from the change in clevis position over time |
| Median movement speed | Ret | AR, 2-HAR | UH, SL, RA/V | The median speed of the retracting instrument arm as measured from the change in clevis position over time |
| Difference in total linear distance | D, N-D | S, D | 2-HS, 1-HS, RS, SL, RA/V | The difference in total linear travel distances between the D and non-D arm. This is a measure of bimanual dexterity. |
| Difference in total wrist articulation distance | D, N-D | S, D | 2-HS, 1-HS, RS, SL, RA/V | The difference in total wrist articulation travel distances between the D and non-D arm. This is a measure of bimanual dexterity. |
| Ratio of primary arm movements | D, N-D | S, D | 2-HS, 1-HS, RS, SL, RA/V | The ratio of total linear travel distances of the D arm over the non-D arm. This is a measure of bimanual dexterity. |
| Ratio of primary arm wrist articulations | D, N-D | S, D | 2-HS, 1-HS, RS, SL, RA/V | The ratio of total wrist articulation travel distances of the D arm over the non-D arm. This is a measure of bimanual dexterity. |
| Proportion of E activation duration | SCE | E | UH, SL, RA/V | The cumulative duration of E activation events over the total duration of the task |
| Rate of E activation events (events/sec) | SCE | E | UH, SL, RA/V | The number of E activation events over the total duration of the task |
| E activation event count | SCE | E | UH, SL, RA/V | The number of E activation events |
| Average duration of E activation events | SCE | E | UH, SL, RA/V | The average duration that an E activation event lasts |
| Total duration of E activation | SCE | E | UH, SL, RA/V | The cumulative duration of E activation events |
| Camera control event counts | SCE | CU | 2-HS, 1-HS, RS, UH, SL, RA/V | The number of camera control events |

*FIG. 18*

| OPI | Arm | Skills | Tasks | Description |
|---|---|---|---|---|
| Rate of camera control events | SCE | CU | 2-HS, 1-HS, RS, UH, SL, RA/V | The number of camera control events over the total duration of the task |
| Master clutch event counts | SCE | S, D, 1-HD, 2-HAR | 2-HS, 1-HS, RS, UH, SL, RA/V | The number of master clutch control events |
| Rate of master clutch events | SCE | S, D, AR, 1-HD, 2-HAR | 2-HS, 1-HS, RS, UH, SL, RA/V | The number of master clutch control events over the total duration of the task |
| Total wrist articulation distance | D | S, D, 1-HD | 2-HS, 1-HS, RS, UH, SL, RA/V | The combined total of joint angle travel distances in radians for yaw, pitch, and roll of the D instrument arm during a task |
| Total wrist articulation distance | N-D | S, D, 2-HAR | 2-HS, 1-HS, RS, UH, SL, RA/V | The combined total of joint angle travel distances in radians for yaw, pitch, and roll of the non-D instrument arm during a task |
| Total wrist articulation distance | Ret | AR, 2-HAR | UH, SL, RA/V | The combined total of joint angle travel distances in radians for yaw, pitch, and roll of the retracting instrument arm during a task |
| Total wrist articulation distance | Cam | CU | 2-HS, 1-HS, RS, UH, SL, RA/V | The combined total of joint angle travel distances in radians for yaw, pitch, and roll of the endoscope arm during a task |
| Average of median speeds of wrist articulation | D | S, D, 1-HD | 2-HS, 1-HS, RS, UH, SL, RA/V | The average of the three median speeds for each wrist articulation angle (yaw, pitch, roll) of the D instrument arm measured as the change in joint angle position over time. |
| Average of median speeds of wrist articulation | N-D | S, D, 2-HAR | 2-HS, 1-HS, RS, UH, SL, RA/V | The average of the three median speeds for each wrist articulation angle (yaw, pitch, roll) of the non-D instrument arm measured as the change in joint angle position over time. |
| Average of median speeds of wrist articulation | Ret | AR, 2-HAR | UH, SL, RA/V | The average of the three median speeds for each wrist articulation angle (yaw, pitch, roll) of the retracting instrument arm measured as the change in joint angle position over time. |

*FIG. 19*

| OPI | Arm | Skills | Tasks | Description |
|---|---|---|---|---|
| Median speeds of wrist articulation | Cam | CU | 2-HS, 1-HS, RS, UH, SL, RA/V | The median speeds for each wrist articulation angle (roll) of the endoscope arm measured as the change in joint angle position over time. The endoscope arm is not controlled in yaw, pitch angles. |
| Median movement acceleration | D | S, D, 1-HD | 2-HS, 1-HS, RS, UH, SL, RA/V | The median acceleration of the D instrument arm as measured from the change in instrument movement speed over time |
| Median movement acceleration | N-D | S, D, 2-HAR | 2-HS, 1-HS, RS, UH, SL, RA/V | The median acceleration of the non-D instrument arm as measured from the change in instrument movement speed over time |
| Median movement acceleration | Ret | AR, 2-HAR | UH, SL, RA/V | The median acceleration of the retracting instrument arm as measured from the change in instrument movement speed over time |
| Median movement acceleration | Cam | CU | 2-HS, 1-HS, RS, UH, SL, RA/V | The median acceleration of the endoscope arm as measured from the change in endoscope speed over time |
| Median movement jerk | D | S, D, 1-HD | 2-HS, 1-HS, RS, UH, SL, RA/V | The median jerk of the D instrument arm as measured from the change in instrument movement acceleration over time |
| Median movement jerk | N-D | S, D, 2-HAR | 2-HS, 1-HS, RS, UH, SL, RA/V | The median jerk of the non-D instrument arm as measured from the change in instrument movement acceleration over time |
| Median movement jerk | Ret | AR, 2-HAR | UH, SL, RA/V | The median jerk of the retracting instrument arm as measured from the change in instrument movement acceleration over time |
| Median movement jerk | Cam | CU | 2-HS, 1-HS, RS, UH, SL, RA/V | The median jerk of the endoscope arm as measured from the change in endoscope acceleration over time |

*FIG. 20*

SYSTEMS AND METHODS FOR ASSESSING SURGICAL ABILITY

CROSS-REFERENCE TO RELATED APPLICATIONS

This application is a national stage application under 35 U.S.C. § 371 of International Application PCT/US21/60900, filed upon Nov. 26, 2021, and entitled "SYSTEMS AND METHODS FOR ASSESSING SURGICAL ABILITY", which claims the benefit of, and priority to, U.S. Provisional Application No. 63/121,220, filed upon Dec. 3, 2020, entitled "SYSTEMS AND METHODS FOR ASSESSING SURGICAL ABILITY", each of which is incorporated by reference herein in its entirety for all purposes.

TECHNICAL FIELD

Various of the disclosed embodiments relate to computer systems and computer-implemented methods for measuring and monitoring surgical performance.

BACKGROUND

Many challenges complicate surgical skill assessments, making it very difficult to provide surgeons with meaningful feedback regarding their surgical performance. For example, one cannot practically assess a specific surgical skill based solely upon post-operative outcomes, as multiple skills and cumulative factors unrelated to the skill contribute to the final outcome, obscuring the influence of any single skill. While one may instead observe a surgeon's skill directly during a surgical operation or via recorded video, such real-time and video-based review still requires a human expert, such as a senior surgeon, to recognize and assess surgical skills in the theater or as they appear in the video. Unfortunately, such human observer assessments are often subjective, scale poorly (at least for the reason that they require the presence of a human reviewer), and can be difficult to arrange, as there are often far fewer "expert" surgeons for a given type of surgical operation than there are "novice" surgeons generating video. In addition, many expert surgeons are in high demand and are naturally reluctant to devote time to reviewing such videos in lieu of performing surgeries themselves.

While the data gathering capabilities of new surgical tools and of new surgical robotic systems have made available vast amounts of surgical data, this data not only fails to resolve the above challenges, but also introduces its own challenges that must now be overcome. For example, raw data rarely correlates directly with a specific surgical skill and so the reviewer must labor to infer a correlation between a skill they wish to examine and the raw data available for review. Similarly, the considerable asymmetry mentioned above between the populations of "expert" and "novice" surgeons is often reflected in the collected data, complicating efforts to perform any automated data analysis.

Accordingly, there exists a need for scalable, automated surgical skill-assessment systems, which reduce the dependence upon experts for manual review. Similarly, there is a need for systems which can account for the considerable asymmetry in the available data between experts and non-experts. Such systems would, ideally, also render their assessments in a manner suitable for providing surgeons with actionable feedback.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements:

FIG. 2A is a schematic Euler diagram depicting conventional groupings of machine learning models and methodologies;

FIG. 2B is a schematic diagram depicting various operations of an example unsupervised learning method in accordance with the conventional groupings of FIG. 2A;

FIG. 2C is a schematic diagram depicting various operations of an example supervised learning method in accordance with the conventional groupings of FIG. 2A;

FIG. 2D is a schematic diagram depicting various operations of an example semi-supervised learning method in accordance with the conventional groupings of FIG. 2A;

FIG. 2E is a schematic diagram depicting various operations of an example reinforcement learning method in accordance with the conventional division of FIG. 2A;

FIG. 2F is a schematic block diagram depicting relations between machine learning models, machine learning model architectures, machine learning methodologies, machine learning methods, and machine learning implementations;

FIG. 3A is a schematic depiction of the operation of various aspects of an example Support Vector Machine (SVM) machine learning model architecture;

FIG. 3B is a schematic depiction of various aspects of the operation of an example random forest machine learning model architecture;

FIG. 3C is a schematic depiction of various aspects of the operation of an example neural network machine learning model architecture;

FIG. 3D is a schematic depiction of a possible relation between inputs and outputs in a node of the example neural network architecture of FIG. 3C;

FIG. 3E is a schematic depiction of an example input-output relation variation as may occur in a Bayesian neural network;

FIG. 3F is a schematic depiction of various aspects of the operation of an example deep learning architecture;

FIG. 3G is a schematic depiction of various aspects of the operation of an example ensemble architecture;

FIG. 3H is a schematic block diagram depicting various operations of an example machine learning pipeline topology;

FIG. 4A is a schematic flow diagram depicting various operations common to a variety of machine learning model training methods;

FIG. 4B is a schematic flow diagram depicting various operations common to a variety of machine learning model inference methods;

FIG. 4C is a schematic flow diagram depicting various iterative training operations occurring at block 405b in some architectures and training methods;

FIG. 4D is a schematic block diagram depicting various machine learning method operations lacking rigid distinctions between training and inference methods;

FIG. 4E is a schematic block diagram depicting an example relationship between architecture training methods and inference methods;

FIG. 4F is a schematic block diagram depicting an example relationship between machine learning model training methods and inference methods, wherein the training methods comprise various data subset operations;

FIG. 4G is a schematic block diagram depicting an example decomposition of training data into a training subset, a validation subset, and a testing subset;

FIG. 4H is a schematic block diagram depicting various operations in a training method incorporating transfer learning;

FIG. 4I is a schematic block diagram depicting various operations in an example training method incorporating online learning;

FIG. 4J is a schematic block diagram depicting various components in an example generative adversarial network method;

FIG. 5A is a schematic illustration of surgical data as may be received at a processing system in some embodiments;

FIG. 5B is a table of example tasks as may be used in conjunction with various disclosed embodiments;

FIG. 7A is a flow diagram illustrating various operations in a process for generating and applying skill models as may be performed in some embodiments;

FIG. 7B is a schematic diagram illustrating various components employed in an example application of a skill model to determine a surgical score as may be implemented in some embodiments;

FIG. 7C is a schematic diagram illustrating an application of an example windowing score generation process as may be implemented in some embodiments;

FIG. 7D is a plot of an example skill score output over time as may be produced in some embodiments;

FIG. 8A is a schematic diagram illustrating relations between various metrics and data structures as may be used in some embodiments;

FIG. 8B is a schematic depiction of an example raw data input, specifically, a forceps translational movement in three-dimensional space, as may be used to generate one or more objective performance indicators (OPIs) in some embodiments;

FIG. 8C is a schematic depiction of an example raw data input, specifically, a plurality of rotations in three-dimensional space about a plurality of forceps component axes, as may be used to generate one or more OPIs in some embodiments;

FIG. 8D is a pair of tables illustrating example OPI to skill and skill to task mappings as may be applied in some embodiments;

FIG. 10A is a flow diagram illustrating an example process for selecting OPIs by single OPI statistical distribution analysis (SOSDA) or multi-OPI statistical distribution analysis (MOSDA) filtering, as may be implemented in some embodiments;

FIG. 10B is a pair of schematic plots of example similar and dissimilar expert and nonexpert OPI value distributions as may be considered in some embodiments;

FIG. 10C is a flow diagram illustrating an example process for performing OPI selection using a multi-OPI predictive model (MOPM) filter, as may be implemented in some embodiments;

FIG. 14A is a bar plot of the types and amount of data samples available for use in an example reduction to practice of an embodiment;

FIG. 14B is a table illustrating average cross-validation performance metrics, specifically a balanced accuracy and Matthews Correlation Coefficients (MCC), for each of the skill-task and overall task logistic regression models in an example reduction to practice of an embodiment;

FIG. 17 is a table listing an example collection of OPIs, a description of each, and their relation to various skills and tasks;

FIG. 18 is a table listing an example collection of OPIs, a description of each, and their relation to various skills and tasks;

FIG. 19 is a table listing an example collection of OPIs, a description of each, and their relation to various skills and tasks;

FIG. 20 is a table listing an example collection of OPIs, a description of each, and their relation to various skills and tasks.

Figure 1A:
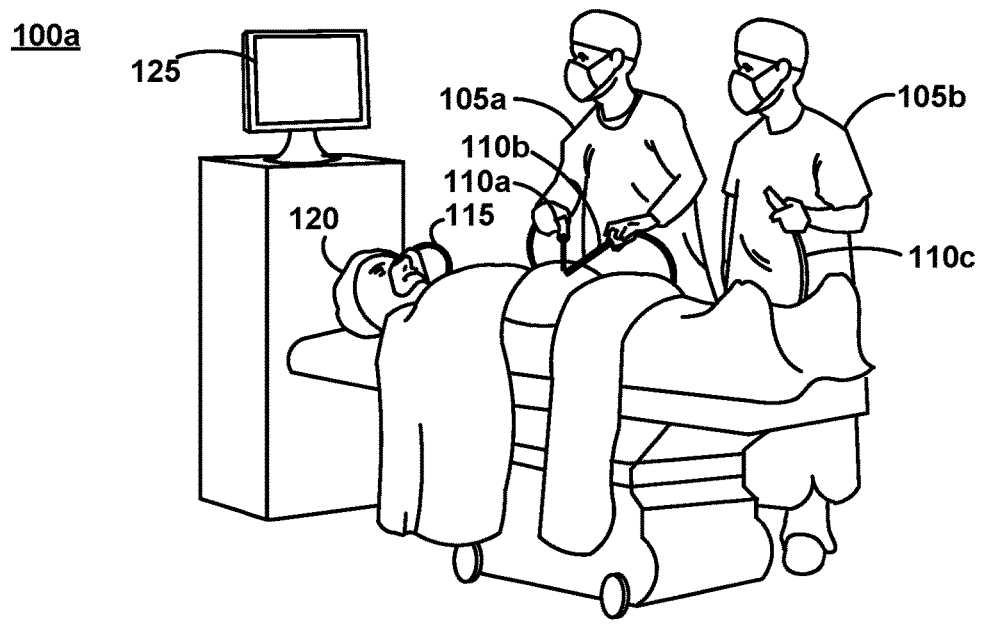
FIG. 1A is a schematic view of various elements appearing in a surgical theater during a surgical operation as may occur in relation to some embodiments.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The embodiments are intended to cover all modifications, equivalents, and alternatives falling within the scope of the disclosed examples, rather than limit the embodiments to the particular examples described or depicted.

DETAILED DESCRIPTION

Example Surgical Theaters Overview

FIG. 1A is a schematic view of various elements appearing in a surgical theater 100a during a surgical operation as may occur in relation to some embodiments. Particularly, FIG. 1A depicts a non-robotic surgical theater 100a, wherein a patient-side surgeon 105a performs an operation upon a patient 120 with the assistance of one or more assisting members 105b, who may themselves be surgeons, physician's assistants, nurses, technicians, etc. The surgeon 105a may perform the operation using a variety of tools, e.g., a visualization tool 110b such as a laparoscopic ultrasound or endoscope, and a mechanical end effector 110a such as scissors, retractors, a dissector, etc.

The visualization tool 110b provides the surgeon 105a with an interior view of the patient 120, e.g., by displaying visualization output from a camera mechanically and electrically coupled with the visualization tool 110b. The surgeon may view the visualization output, e.g., through an eyepiece coupled with visualization tool 110b or upon a display 125 configured to receive the visualization output. For example, where the visualization tool 110b is an endoscope, the visualization output may be a color or grayscale image. Display 125 may allow assisting member 105b to monitor surgeon 105a's progress during the surgery. The visualization output from visualization tool 110b may be recorded and stored for future review, e.g., using hardware or software on the visualization tool 110b itself, capturing the visualization output in parallel as it is provided to display 125, or capturing the output from display 125 once it appears on-screen, etc. While two-dimensional video capture with visualization tool 110b may be discussed extensively herein, as when visualization tool 110b is an endoscope, one will appreciate that, in some embodiments, visualization tool 110b may capture depth data instead of, or in addition to, two-dimensional image data (e.g., with a laser rangefinder, stereoscopy, etc.). Accordingly, one will appreciate that it may be possible to apply the two-dimensional operations discussed herein, mutatis mutandis, to such three-dimensional depth data when such data is available. For example, machine learning model inputs may be expanded or modified to accept features derived from such depth data.

A single surgery may include the performance of several groups of actions, each group of actions forming a discrete unit referred to herein as a task. For example, locating a tumor may constitute a first task, excising the tumor a second task, and closing the surgery site a third task. Each task may include multiple actions, e.g., a tumor excision task may require several cutting actions and several cauterization actions. While some surgeries require that tasks assume a specific order (e.g., excision occurs before closure), the order and presence of some tasks in some surgeries may be allowed to vary (e.g., the elimination of a precautionary task or a reordering of excision tasks where the order has no effect). Transitioning between tasks may require the surgeon 105a to remove tools from the patient, replace tools with different tools, or introduce new tools. Some tasks may require that the visualization tool 110b be removed and repositioned relative to its position in a previous task. While some assisting members 105b may assist with surgery-related tasks, such as administering anesthesia 115 to the patient 120, assisting members 105b may also assist with these task transitions, e.g., anticipating the need for a new tool 110c.

Figure 1B:
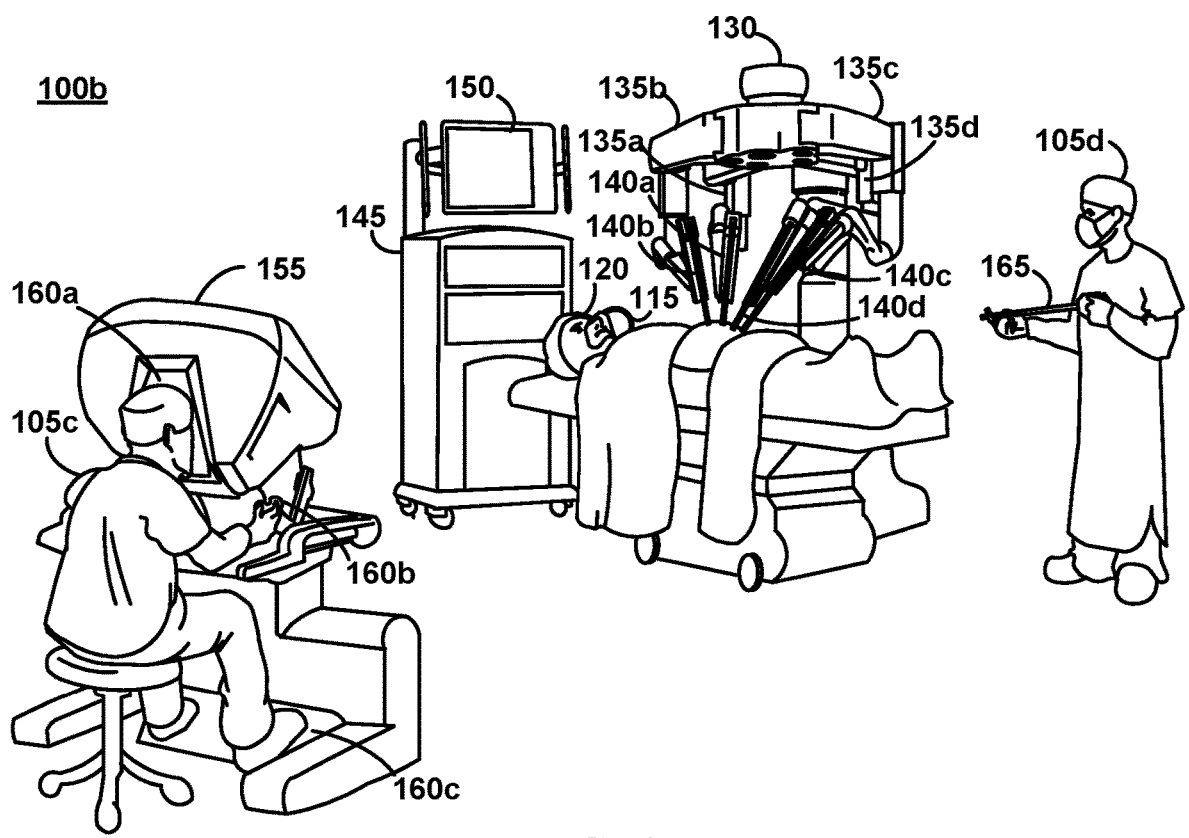
FIG. 1B is a schematic view of various elements appearing in a surgical theater during a surgical operation employing a surgical robot as may occur in relation to some embodiments.

Advances in technology have enabled procedures such as that depicted in FIG. 1A to also be performed with robotic systems, as well as the performance of procedures unable to be performed in non-robotic surgical theater 100a. Specifically, FIG. 1B is a schematic view of various elements appearing in a surgical theater 100b during a surgical operation employing a surgical robot, such as a da Vinci™ surgical system, as may occur in relation to some embodiments. Here, patient side cart 130 having tools 140a, 140b, 140c, and 140d attached to each of a plurality of arms 135a, 135b, 135c, and 135d, respectively, may take the position of patient-side surgeon 105a. As before, the tools 140a, 140b, 140c, and 140d may include a visualization tool 140d, such as an endoscope, laparoscopic ultrasound, etc. An operator 105c, who may be a surgeon, may view the output of visualization tool 140d through a display 160a upon a surgeon console 155. By manipulating a hand-held input mechanism 160b and pedals 160c, the operator 105c may remotely communicate with tools 140a-d on patient side cart 130 so as to perform the surgical procedure on patient 120. Indeed, the operator 105c may or may not be in the same physical location as patient side cart 130 and patient 120 since the communication between surgeon console 155 and patient side cart 130 may occur across a telecommunication network in some embodiments. An electronics/control console 145 may also include a display 150 depicting patient vitals and/or the output of visualization tool 140d.

Similar to the task transitions of non-robotic surgical theater 100a, the surgical operation of theater 100b may require that tools 140a-d, including the visualization tool 140d, be removed or replaced for various tasks as well as new tools, e.g., new tool 165, introduced. As before, one or more assisting members 105d may now anticipate such changes, working with operator 105c to make any necessary adjustments as the surgery progresses.

Also similar to the non-robotic surgical theater 100a, the output from the visualization tool 140d may here be recorded, e.g., at patient side cart 130, surgeon console 155, from display 150, etc. While some tools 110a, 110b, 110c in non-robotic surgical theater 100a may record additional data, such as temperature, motion, conductivity, energy levels, etc. the presence of surgeon console 155 and patient side cart 130 in theater 100b may facilitate the recordation of considerably more data than is only output from the visualization tool 140d. For example, operator 105c's manipulation of hand-held input mechanism 160b, activation of pedals 160c, eye movement within display 160a, etc. may all be recorded. Similarly, patient side cart 130 may record tool activations (e.g., the application of radiative energy, closing of scissors, etc.), movement of end effectors, etc. throughout the surgery.

Machine Learning Foundational Concepts—Overview

This section provides a foundational description of machine learning model architectures and methods as may be relevant to various of the disclosed embodiments. Machine learning comprises a vast, heterogeneous landscape and has experienced many sudden and overlapping developments. Given this complexity, practitioners have not always used terms consistently or with rigorous clarity. Accordingly, this section seeks to provide a common ground to better ensure the reader's comprehension of the disclosed embodiments' substance. One will appreciate that exhaustively addressing all known machine learning models, as well as all known possible variants of the architectures, tasks, methods, and methodologies thereof herein is not feasible. Instead, one will appreciate that the examples discussed herein are merely representative and that various of the disclosed embodiments may employ many other architectures and methods than those which are explicitly discussed.

To orient the reader relative to the existing literature, FIG. 2A depicts conventionally recognized groupings of machine learning models and methodologies, also referred to as techniques, in the form of a schematic Euler diagram. The groupings of FIG. 2A will be described with reference to FIGS. 2B-E in their conventional manner so as to orient the reader, before a more comprehensive description of the machine learning field is provided with respect to FIG. 2F.

The conventional groupings of FIG. 2A typically distinguish between machine learning models and their methodologies based upon the nature of the input the model is expected to receive or that the methodology is expected to operate upon. Unsupervised learning methodologies draw inferences from input datasets which lack output metadata (also referred to as a "unlabeled data") or by ignoring such metadata if it is present. For example, as shown in FIG. 2B, an unsupervised K-Nearest-Neighbor (KNN) model architecture may receive a plurality of unlabeled inputs, represented by circles in a feature space $205a$. A feature space is a mathematical space of inputs which a given model architecture is configured to operate upon. For example, if a 128×128 grayscale pixel image were provided as input to the KNN, it may be treated as a linear array of 16,384 "features" (i.e., the raw pixel values). The feature space would then be a 16,384 dimensional space (a space of only two dimensions is show in FIG. 2B to facilitate understanding). If instead, e.g., a Fourier transform were applied to the pixel data, then the resulting frequency magnitudes and phases may serve as the "features" to be input into the model architecture. Though input values in a feature space may sometimes be referred to as feature "vectors," one will appreciate that not all model architectures expect to receive feature inputs in a linear form (e.g., some deep learning networks expect input features as matrices or tensors). Accordingly, mention of a vector of features, matrix of features, etc. should be seen as exemplary of possible forms that may be input to a model architecture absent context indicating otherwise. Similarly, reference to an "input" will be understood to include any possible feature type or form acceptable to the architecture. Continuing with the example of FIG. 2B, the KNN classifier may output associations between the input vectors and various groupings determined by the KNN classifier as represented by the indicated squares, triangles, and hexagons in the figure. Thus, unsupervised methodologies may include, e.g., determining clusters in data as in this example, reducing or changing the feature dimensions used to represent data inputs, etc.

Supervised learning models receive input datasets accompanied with output metadata (referred to as "labeled data") and modify the model architecture's parameters (such as the biases and weights of a neural network, or the support vectors of an SVM) based upon this input data and metadata so as to better map subsequently received inputs to the desired output. For example, an SVM supervised classifier may operate as shown in FIG. 2C, receiving as training input a plurality of input feature vectors, represented by circles, in a feature space $210a$, where the feature vectors are accompanied by output labels A, B, or C, e.g., as provided by the practitioner. In accordance with a supervised learning methodology, the SVM uses these label inputs to modify its parameters, such that when the SVM receives a new, previously unseen input $210c$ in the feature vector form of the feature space $210a$, the SVM may output the desired classification "C" in its output. Thus, supervised learning methodologies may include, e.g., performing classification as in this example, performing a regression, etc.

Semi-supervised learning methodologies inform their model's architecture's parameter adjustment based upon both labeled and unlabeled data. For example, a supervised neural network classifier may operate as shown in FIG. 2D, receiving some training input feature vectors in the feature space $215a$ labeled with a classification A, B, or C and some training input feature vectors without such labels (as depicted with circles lacking letters). Absent consideration of the unlabeled inputs, a naïve supervised classifier may distinguish between inputs in the B and C classes based upon a simple planar separation $215d$ in the feature space between the available labeled inputs. However, a semi-supervised classifier, by considering the unlabeled as well as the labeled input feature vectors, may employ a more nuanced separation $215e$. Unlike the simple separation $215d$ the nuanced separation $215e$ may correctly classify a new input $215c$ as being in the C class. Thus, semi-supervised learning methods and architectures may include applications in both supervised and unsupervised learning wherein at least some of the available data is labeled.

Finally, the conventional groupings of FIG. 2A distinguish reinforcement learning methodologies as those wherein an agent, e.g., a robot or digital assistant, takes some action (e.g., moving a manipulator, making a suggestion to a user, etc.) which affects the agent's environmental context (e.g., object locations in the environment, the disposition of the user, etc.), precipitating a new environment state and some associated environment-based reward (e.g., a positive reward if environment objects are now closer to a goal state, a negative reward if the user is displeased, etc.). Thus, reinforcement learning may include, e.g., updating a digital assistant based upon a user's behavior and expressed preferences, an autonomous robot maneuvering through a factory, a computer playing chess, etc.

As mentioned, while many practitioners will recognize the conventional taxonomy of FIG. 2A, the groupings of FIG. 2A obscure machine learning's rich diversity, and may inadequately characterize machine learning architectures and techniques which fall in multiple of its groups or which fall entirely outside of those groups (e.g., random forests and neural networks may be used for supervised or for unsupervised learning tasks; similarly, some generative adversarial networks, while employing supervised classifiers, would not themselves easily fall within any one of the groupings of FIG. 2A). Accordingly, though reference may be made herein to various terms from FIG. 2A to facilitate the reader's understanding, this description should not be limited to the procrustean conventions of FIG. 2A. For example, FIG. 2F offers a more flexible machine learning taxonomy.

In particular, FIG. 1F approaches machine learning as comprising models 220a, model architectures 220b, methodologies 220e, methods 220d, and implementations 220c. At a high level, model architectures 220b may be seen as species of their respective genus models 220a (model A having possible architectures A1, A2, etc.; model B having possible architectures B1, B2, etc.). Models 220a refer to descriptions of mathematical structures amenable to implementation as machine learning architectures. For example, KNN, neural networks, SVMs, Bayesian Classifiers, Principal Component Analysis (PCA), etc., represented by the boxes "A", "B", "C", etc. are examples of models (ellipses in the figures indicate the existence of additional items). While models may specify general computational relations, e.g., that an SVM include a hyperplane, that a neural network have layers or neurons, etc., models may not specify an architecture's particular structure, such as the architecture's choice of hyperparameters and dataflow, for performing a specific task, e.g., that the SVM employ a Radial Basis Function (RBF) kernel, that a neural network be configured to receive inputs of dimension 256×256×3, etc. These structural features may, e.g., be chosen by the practitioner or result from a training or configuration process. Note that the universe of models 220a also includes combinations of its members as, for example, when creating an ensemble model (discussed below in relation to FIG. 3G) or when using a pipeline of models (discussed below in relation to FIG. 3H).

For clarity, one will appreciate that many architectures comprise both parameters and hyperparameters. An architecture's parameters refer to configuration values of the architecture, which may be adjusted based directly upon the receipt of input data (such as the adjustment of weights and biases of a neural network during training). Different architectures may have different choices of parameters and relations therebetween, but changes in the parameter's value, e.g., during training, would not be considered a change in architecture. In contrast, an architecture's hyperparameters refer to configuration values of the architecture which are not adjusted based directly upon the receipt of input data (e.g., the K number of neighbors in a KNN implementation, the learning rate in a neural network training implementation, the kernel type of an SVM, etc.). Accordingly, changing a hyperparameter would typically change an architecture. One will appreciate that some method operations, e.g., validation, discussed below, may adjust hyperparameters, and consequently the architecture type, during training. Consequently, some implementations may contemplate multiple architectures, though only some of them may be configured for use or used at a given moment.

In a similar manner to models and architectures, at a high level, methods 220d may be seen as species of their genus methodologies 220e (methodology I having methods I.1, I.2, etc.; methodology II having methods II.1, II.2, etc.). Methodologies 220e refer to algorithms amenable to adaptation as methods for performing tasks using one or more specific machine learning architectures, such as training the architecture, testing the architecture, validating the architecture, performing inference with the architecture, using multiple architectures in a Generative Adversarial Network (GAN), etc. For example, gradient descent is a methodology describing methods for training a neural network, ensemble learning is a methodology describing methods for training groups of architectures, etc. While methodologies may specify general algorithmic operations, e.g., that gradient descent take iterative steps along a cost or error surface, that ensemble learning consider the intermediate results of its architectures, etc., methods specify how a specific architecture should perform the methodology's algorithm, e.g., that the gradient descent employ iterative backpropagation on a neural network and stochastic optimization via Adam with specific hyperparameters, that the ensemble system comprise a collection of random forests applying AdaBoost with specific configuration values, that training data be organized into a specific number of folds, etc. One will appreciate that architectures and methods may themselves have sub-architecture and sub-methods, as when one augments an existing architecture or method with additional or modified functionality (e.g., a GAN architecture and GAN training method may be seen as comprising deep learning architectures and deep learning training methods). One will also appreciate that not all possible methodologies will apply to all possible models (e.g., suggesting that one perform gradient descent upon a PCA architecture, without further explanation, would seem nonsensical). One will appreciate that methods may include some actions by a practitioner or may be entirely automated.

As evidenced by the above examples, as one moves from models to architectures and from methodologies to methods, aspects of the architecture may appear in the method and aspects of the method in the architecture as some methods may only apply to certain architectures and certain architectures may only be amenable to certain methods. Appreciating this interplay, an implementation 220c is a combination of one or more architectures with one or more methods to form a machine learning system configured to perform one or more specified tasks, such as training, inference, generating new data with a GAN, etc. For clarity, an implementation's architecture need not be actively performing its method, but may simply be configured to perform a method (e.g., as when accompanying training control software is configured to pass an input through the architecture). Applying the method will result in performance of the task, such as training or inference. Thus, a hypothetical Implementation A (indicated by "Imp. A") depicted in FIG. 2F comprises a single architecture with a single method. This may correspond, e.g., to an SVM architecture configured to recognize objects in a 128×128 grayscale pixel image by using a hyperplane support vector separation method employing an RBF kernel in a space of 16,384 dimensions. The usage of an RBF kernel and the choice of feature vector input structure reflect both aspects of the choice of architecture and the choice of training and inference methods. Accordingly, one will appreciate that some descriptions of architecture structure may imply aspects of a corresponding method and vice versa. Hypothetical Implementation B (indicated by "Imp. B") may correspond, e.g., to a training method II.1 which may switch between architectures B1 and C1 based upon validation results, before an inference method III.3 is applied.

The close relationship between architectures and methods within implementations precipitates much of the ambiguity in FIG. 2A as the groups do not easily capture the close relation between methods and architectures in a given implementation. For example, very minor changes in a method or architecture may move a model implementation between the groups of FIG. 2A as when a practitioner trains a random forest with a first method incorporating labels (supervised) and then applies a second method with the trained architecture to detect clusters in unlabeled data (unsupervised) rather than perform inference on the data. Similarly, the groups of FIG. 2A may make it difficult to classify aggregate methods and architectures, e.g., as discussed below in relation to FIGS. 3F and 3G, which may apply techniques found in some, none, or all of the groups of FIG. 2A. Thus, the next sections discuss relations between various example model architectures and example methods with reference to FIGS. 3A-G and FIGS. 4A-J to facilitate clarity and reader recognition of the relations between architectures, methods, and implementations. One will appreciate that the discussed tasks are exemplary and reference therefore, e.g., to classification operations so as to facilitate understanding, should not be construed as suggesting that the implementation must be exclusively used for that purpose.

For clarity, one will appreciate that the above explanation with respect to FIG. 2F is provided merely to facilitate reader comprehension and should accordingly not be construed in a limiting manner absent explicit language indicating as much. For example, naturally, one will appreciate that "methods" 220d are computer-implemented methods, but not all computer-implemented methods are methods in the sense of "methods" 220d. Computer-implemented methods may be logic without any machine learning functionality. Similarly, the term "methodologies" is not always used in the sense of "methodologies" 220e, but may refer to approaches without machine learning functionality. Similarly, while the terms "model" and "architecture" and "implementation" have been used above at 220a, 220b and 220c, the terms are not restricted to their distinctions here in FIG. 2F, absent language to that effect, and may be used to refer to the topology of machine learning components generally.

Machine Learning Foundational Concepts—Example Implementations

FIG. 3A is a schematic depiction of the operation of an example SVM machine learning model architecture. At a high level, given data from two classes (e.g. images of dogs and images of cats) as input features, represented by circles and triangles in the schematic of FIG. 3A, SVMs seek to determine a hyperplane separator 305a which maximizes the minimum distance from members of each class to the separator 305a. Here, the training feature vector 305f has the minimum distance 305e of all its peers to the separator 305a. Conversely, training feature vector 305g has the minimum distance 305h among all its peers to the separator 305a. The margin 305d formed between these two training feature vectors is thus the combination of distances 305h and 305e (reference lines 305b and 305c are provided for clarity) and, being the maximum minimum separation, identifies training feature vectors 305f and 305g as support vectors. While this example depicts a linear hyperplane separation, different SVM architectures accommodate different kernels (e.g., an RBF kernel), which may facilitate nonlinear hyperplane separation. The separator may be found during training and subsequent inference may be achieved by considering where a new input in the feature space falls relative to the separator. Similarly, while this example depicts feature vectors of two dimensions for clarity (in the two-dimensional plane of the paper), one will appreciate that may architectures will accept many more dimensions of features (e.g., a 128×128 pixel image may be input as 16,384 dimensions). While the hyperplane in this example only separates two classes, multi-class separation may be achieved in a variety of manners, e.g., using an ensemble architecture of SVM hyperplane separations in one-against-one, one-against-all, etc. configurations. Practitioners often use the LIBSVM™ and Scikit-Learn™ libraries when implementing SVMs.

One will appreciate that many different machine learning models, e.g., logistic regression classifiers, seek to identify separating hyperplanes.

In the above example SVM implementation, the practitioner determined the feature format as part of the architecture and method of the implementation. For some tasks, architectures and methods which process inputs to determine new or different feature forms themselves may be desirable. Some random forests implementations may, in effect, adjust the feature space representation in this manner. For example, FIG. 3B depicts at a high level, an example random forest model architecture comprising a plurality of decision trees 310b, each of which may receive all, or a portion, of input feature vector 310a at their root node. Though three trees are shown in this example architecture with maximum depths of three levels, one will appreciate that forest architectures with fewer or more trees and different levels (even between trees of the same forest) are possible. As each tree considers its portion of the input, it refers all or a portion of the input to a subsequent node, e.g., path 310f based upon whether the input portion does or does not satisfy the conditions associated with various nodes. For example, when considering an image, a single node in a tree may query whether a pixel value at position in the feature vector is above or below a certain threshold value. In addition to the threshold parameter some trees may include additional parameters and their leaves may include probabilities of correct classification. Each leaf of the tree may be associated with a tentative output value 310c for consideration by a voting mechanism 310d to produce a final output 310e, e.g., by taking a majority vote among the trees or by the probability weighted average of each tree's predictions. This architecture may lend itself to a variety of training methods, e.g., as different data subsets are trained on different trees.

Tree depth in a random forest, as well as different trees, may facilitate the random forest model's consideration of feature relations beyond direct comparisons of those in the initial input. For example, if the original features were pixel values, the trees may recognize relationships between groups of pixel values relevant to the task, such as relations between "nose" and "ear" pixels for cat/dog classification. Binary decision tree relations, however, may impose limits upon the ability to discern these "higher order" features.

Neural networks, as in the example architecture of FIG. 3C may also be able to infer higher order features and relations between the initial input vector. However, each node in the network may be associated with a variety of parameters and connections to other nodes, facilitating more complex decisions and intermediate feature generations than the conventional random forest tree's binary relations. As shown in FIG. 3C, a neural network architecture may comprise an input layer, at least one hidden layer, and an output layer. Each layer comprises a collection of neurons which may receive a number of inputs and provide an output value, also referred to as an activation value, the output values 315b of the final output layer serving as the network's final result. Similarly, the inputs 315a for the input layer may be received form the input data, rather than a previous neuron layer.

FIG. 3D depicts the input and output relations at the node 315c of FIG. 3C. Specifically, the output $n_{out}$ of node 315c may relate to its three (zero-base indexed) inputs as follows:

$$n_{out} = A\left(\sum_{i=0}^{2} w_i n_i + b\right) \qquad (1)$$

where $w_i$ is the weight parameter on the output of $i^{th}$ node in the input layer, $n_i$ is the output value from the activation function of the $i^{th}$ node in the input layer, b is a bias value associated with node 315c, and A is the activation function associated with node 315c. Note that in this example the sum is over each of the three input layer node outputs and weight pairs and only a single bias value b is added. The activation function A may determine the node's output based upon the values of the weights, biases, and previous layer's nodes' values. During training, each of the weight and bias parameters may be adjusted depending upon the training method used. For example, many neural networks employ a methodology known as backward propagation, wherein, in some method forms, the weight and bias parameters are randomly initialized, a training input vector is passed through the network, and the difference between the network's output values and the desirable output values for that vector's metadata determined. The difference can then be used as the metric by which the network's parameters are adjusted, "propagating" the error as a correction throughout the network so that the network is more likely to produce the proper output for the input vector in a future encounter. While three nodes are shown in the input layer of the implementation of FIG. 3C for clarity, one will appreciate that there may be more or less nodes in different architectures (e.g., there may be 16,384 such nodes to receive pixel values in the above 128×128 grayscale image examples). Similarly, while each of the layers in this example architecture are shown as being fully connected with the next layer, one will appreciate that other architectures may not connect each of the nodes between layers in this manner. Neither will all the neural network architectures process data exclusively from left to right or consider only a single feature vector at a time. For example, Recurrent Neural Networks (RNNs) include classes of neural network methods and architectures which consider previous input instances when considering a current instance. Architectures may be further distinguished based upon the activation functions used at the various nodes, e.g.: logistic functions, rectified linear unit functions (ReLU), softplus functions, etc. Accordingly, there is considerable diversity between architectures.

One will recognize that many of the example machine learning implementations so far discussed in this overview are "discriminative" machine learning models and methodologies (SVMs, logistic regression classifiers, neural networks with nodes as in FIG. 3D, etc.). Generally, discriminative approaches assume a form which seeks to find the following probability of Equation 2:

$$P(\text{output}|\text{input}) \tag{2}$$

That is, these models and methodologies seek structures distinguishing classes (e.g., the SVM hyperplane) and estimate parameters associated with that structure (e.g., the support vectors determining the separating hyperplane) based upon the training data. One will appreciate, however, that not all models and methodologies discussed herein may assume this discriminative form, but may instead be one of multiple "generative" machine learning models and corresponding methodologies (e.g., a Naïve Bayes Classifier, a Hidden Markov Model, a Bayesian Network, etc.). These generative models instead assume a form which seeks to find the following probabilities of Equation 3:

$$P(\text{output}), P(\text{input}|\text{output}) \tag{3}$$

That is, these models and methodologies seek structures (e.g., a Bayesian Neural Network, with its initial parameters and prior) reflecting characteristic relations between inputs and outputs, estimate these parameters from the training data and then use Bayes rule to calculate the value of Equation 2. One will appreciate that performing these calculations directly is not always feasible, and so methods of numerical approximation may be employed in some of these generative models and methodologies.

One will appreciate that such generative approaches may be used mutatis mutandis herein to achieve results presented with discriminative implementations and vice versa. For example, FIG. 3E illustrates an example node 315d as may appear in a Bayesian Neural Network. Unlike the node 315c, which receives numerical values simply, one will appreciate that a node in a Bayesian Neural network, such as node 315d, may receive weighted probability distributions 315f, 315g, 315h (e.g., the parameters of such distributions) and may itself output a distribution 315e. Thus, one will recognize that while one may, e.g., determine a classification uncertainty in a discriminative model via various post-processing techniques (e.g., comparing outputs with iterative applications of dropout to a discriminative neural network), one may achieve similar uncertainty measures by employing a generative model outputting a probability distribution, e.g., by considering the variance of distribution 315e. Thus, just as reference to one specific machine learning implementation herein is not intended to exclude substitution with any similarly functioning implementation, neither is reference to a discriminative implementation herein to be construed as excluding substitution with a generative counterpart where applicable, or vice versa.

Returning to a general discussion of machine learning approaches, while FIG. 3C depicts an example neural network architecture with a single hidden layer, many neural network architectures may have more than one hidden layer. Some networks with many hidden layers have produced surprisingly effective results and the term "deep" learning has been applied to these models to reflect the large number of hidden layers. Herein, deep learning refers to architectures and methods employing at least one neural network architecture having more than one hidden layer.

FIG. 3F is a schematic depiction of the operation of an example deep learning model architecture. In this example, the architecture is configured to receive a two-dimensional input 320a, such as a grayscale image of a cat. When used for classification, as in this example, the architecture may generally be broken into two portions: a feature extraction portion comprising a succession of layer operations and a classification portion, which determines output values based upon relations between the extracted features.

Many different feature extraction layers are possible, e.g., convolutional layers, max-pooling layers, dropout layers, cropping layers, etc. and many of these layers are themselves susceptible to variation, e.g., two-dimensional convolutional layers, three-dimensional convolutional layers, convolutional layers with different activation functions, etc. as well as different methods and methodologies for the network's training, inference, etc. As illustrated, these layers may produce multiple intermediate values 320b-j of differing dimensions and these intermediate values may be processed along multiple pathways. For example, the original grayscale image 320a may be represented as a feature input tensor of dimensions 128×128×1 (e.g., a grayscale image of 128 pixel width and 128 pixel height) or as a feature input tensor of dimensions 128×128×3 (e.g., an RGB image of 128 pixel width and 128 pixel height). Multiple convolutions with different kernel functions at a first layer may precipitate multiple intermediate values 320b from this input. These intermediate values 320b may themselves be considered by two different layers to form two new intermediate values 320*c* and 320*d* along separate paths (though two paths are shown in this example, one will appreciate that many more paths, or a single path, are possible in different architectures). Additionally, data may be provided in multiple "channels" as when an image has red, green, and blue values for each pixel as, for example, with the "×3" dimension in the 128×128×3 feature tensor (for clarity, this input has three "tensor" dimensions, but 49,152 individual "feature" dimensions). Various architectures may operate on the channels individually or collectively in various layers. The ellipses in the figure indicate the presence of additional layers (e.g., some networks have hundreds of layers). As shown, the intermediate values may change in size and dimensions, e.g., following pooling, as in values 320*e*. In some networks, intermediate values may be considered at layers between paths as shown between intermediate values 320*e*, 320*f*, 320*g*, 320*h*. Eventually, a final set of feature values appear at intermediate collection 320*i* and 320*j* and are fed to a collection of one or more classification layers 320*k* and 320*l*, e.g., via flattened layers, a SoftMax layer, fully connected layers, etc. to produce output values 320*m* at output nodes of layer 320*l*. For example, if N classes are to be recognized, there may be N output nodes to reflect the probability of each class being the correct class (e.g., here the network is identifying one of three classes and indicates the class "cat" as being the most likely for the given input), though some architectures many have fewer or have many more outputs. Similarly, some architectures may accept additional inputs (e.g., some flood fill architectures utilize an evolving mask structure, which may be both received as an input in addition to the input feature data and produced in modified form as an output in addition to the classification output values; similarly, some recurrent neural networks may store values from one iteration to be inputted into a subsequent iteration alongside the other inputs), may include feedback loops, etc.

TensorFlow™, Caffe™, and Torch™, are examples of common software library frameworks for implementing deep neural networks, though many architectures may be created "from scratch" simply representing layers as operations upon matrices or tensors of values and data as values within such matrices or tensors. Examples of deep learning network architectures include VGG-19, ResNet, Inception, DenseNet, etc.

While example paradigmatic machine learning architectures have been discussed with respect to FIGS. 3A through 3F, there are many machine learning models and corresponding architectures formed by combining, modifying, or appending operations and structures to other architectures and techniques. For example, FIG. 3G is a schematic depiction of an ensemble machine learning architecture. Ensemble models include a wide variety of architectures, including, e.g., "meta-algorithm" models, which use a plurality of weak learning models to collectively form a stronger model, as in, e.g., AdaBoost. The random forest of FIG. 3A may be seen as another example of such an ensemble model, though a random forest may itself be an intermediate classifier in an ensemble model.

In the example of FIG. 3G, an initial input feature vector 325*a* may be input, in whole or in part, to a variety of model implementations 325*b*, which may be from the same or different models (e.g., SVMs, neural networks, random forests, etc.). The outputs from these models 325*b* may then be received by a "fusion" model architecture 325*d* to generate a final output 325*e*. The fusion model implementation 325*d* may itself be the same or different model type as one of implementations 325*b*. For example, in some systems fusion model implementation 325*d* may be a logistic regression classifier and models 325*b* may be neural networks.

Just as one will appreciate that ensemble model architectures may facilitate greater flexibility over the paradigmatic architectures of FIGS. 3A through 3F, one should appreciate that modifications, sometimes relatively slight, to an architecture or its method may facilitate novel behavior not readily lending itself to the conventional grouping of FIG. 2A. For example, PCA is generally described as an unsupervised learning method and corresponding architecture, as it discerns dimensionality-reduced feature representations of input data which lack labels. However, PCA has often been used with labeled inputs to facilitate classification in a supervised manner, as in the EigenFaces application described in M. Turk and A. Pentland, "Eigenfaces for Recognition", J. Cognitive Neuroscience, vol. 3, no. 1, 1991. FIG. 3H depicts an machine learning pipeline topology exemplary of such modifications. As in EigenFaces, one may determine a feature presentation using an unsupervised method at block 330*a* (e.g., determining the principal components using PCA for each group of facial images associated with one of several individuals). As an unsupervised method, the conventional grouping of FIG. 2A may not typically construe this PCA operation as "training." However, by converting the input data (e.g., facial images) to the new representation (the principal component feature space) at block 330*b* one may create a data structure suitable for the application of subsequent inference methods.

For example, at block 330*c* a new incoming feature vector (a new facial image) may be converted to the unsupervised form (e.g., the principal component feature space) and then a metric (e.g., the distance between each individual's facial image group principal components and the new vector's principal component representation) or other subsequent classifier (e.g., an SVM, etc.) applied at block 330*d* to classify the new input. Thus, a model architecture (e.g., PCA) not amenable to the methods of certain methodologies (e.g., metric based training and inference) may be made so amenable via method or architecture modifications, such as pipelining. Again, one will appreciate that this pipeline is but one example—the KNN unsupervised architecture and method of FIG. 2B may similarly be used for supervised classification by assigning a new inference input to the class of the group with the closest first moment in the feature space to the inference input. Thus, these pipelining approaches may be considered machine learning models herein, though they may not be conventionally referred to as such.

Some architectures may be used with training methods and some of these trained architectures may then be used with inference methods. However, one will appreciate that not all inference methods perform classification and not all trained models may be used for inference. Similarly, one will appreciate that not all inference methods require that a training method be previously applied to the architecture to process a new input for a given task (e.g., as when KNN produces classes from direct consideration of the input data). With regard to training methods, FIG. 4A is a schematic flow diagram depicting common operations in various training methods. Specifically, at block 405*a*, either the practitioner directly or the architecture may assemble the training data into one or more training input feature vectors. For example, the user may collect images of dogs and cats with metadata labels for a supervised learning method or unlabeled stock prices over time for unsupervised clustering. As discussed, the raw data may be converted to a feature vector via preprocessing or may be taken directly as features in its raw form.

At block 405*b*, the training method may adjust the architecture's parameters based upon the training data. For example, the weights and biases of a neural network may be updated via backpropagation, an SVM may select support vectors based on hyperplane calculations, etc. One will appreciate, as was discussed with respect to pipeline architectures in FIG. 3G, however, that not all model architectures may update parameters within the architecture itself during "training." For example, in Eigenfaces the determination of principal components for facial identity groups may be construed as the creation of a new parameter (a principal component feature space), rather than as the adjustment of an existing parameter (e.g., adjusting the weights and biases of a neural network architecture). Accordingly, herein, the Eigenfaces determination of principal components from the training images would still be construed as a training method.

FIG. 4B is a schematic flow diagram depicting various operations common to a variety of machine learning model inference methods. As mentioned not all architectures nor all methods may include inference functionality. Where an inference method is applicable, at block 410*a* the practitioner or the architecture may assemble the raw inference data, e.g., a new image to be classified, into an inference input feature vector, tensor, etc. (e.g., in the same feature input form as the training data). At block 410*b*, the system may apply the trained architecture to the input inference feature vector to determine an output, e.g., a classification, a regression result, etc.

When "training," some methods and some architectures may consider the input training feature data in whole, in a single pass, or iteratively. For example, decomposition via PCA may be implemented as a non-iterative matrix operation in some implementations. An SVM, depending upon its implementation, may be trained by a single iteration through the inputs. Finally, some neural network implementations may be trained by multiple iterations over the input vectors during gradient descent.

As regards iterative training methods, FIG. 4C is a schematic flow diagram depicting iterative training operations, e.g., as may occur in block 405*b* in some architectures and methods. A single iteration may apply the method in the flow diagram once, whereas an implementation performing multiple iterations may apply the method in the diagram multiple times. At block 415*a*, the architecture's parameters may be initialized to default values. For example, in some neural networks, the weights and biases may be initialized to random values. In some SVM architectures, e.g., in contrast, the operation of block 415*a* may not apply. As each of the training input feature vectors are considered at block 415*b*, the system may update the model's parameters at 415*c*. For example, an SVM training method may or may not select a new hyperplane as new input feature vectors are considered and determined to affect or not to affect support vector selection. Similarly, a neural network method may, e.g., update its weights and biases in accordance with backpropagation and gradient descent. When all the input feature vectors are considered, the model may be considered "trained" if the training method called for only a single iteration to be performed. Methods calling for multiple iterations may apply the operations of FIG. 4C again (naturally, eschewing again initializing at block 415*a* in favor of the parameter values determined in the previous iteration) and complete training when a condition has been met, e.g., an error rate between predicted labels and metadata labels is reduced below a threshold.

As mentioned, the wide variety of machine learning architectures and methods include those with explicit training and inference steps, as shown in FIG. 4E, and those without, as generalized in FIG. 4D. FIG. 4E depicts, e.g., a method training 425*a* a neural network architecture to recognize a newly received image at inference 425*b*, while FIG. 4D depicts, e.g., an implementation reducing data dimensions via PCA or performing KNN clustering, wherein the implementation 420*b* receives an input 420*a* and produces an output 420*c*. For clarity, one will appreciate that while some implementations may receive a data input and produce an output (e.g., an SVM architecture with an inference method), some implementations may only receive a data input (e.g., an SVM architecture with a training method), and some implementations may only produce an output without receiving a data input (e.g., a trained GAN architecture with a random generator method for producing new data instances).

The operations of FIGS. 4D and 4E may be further expanded in some methods. For example, some methods expand training as depicted in the schematic block diagram of FIG. 4F, wherein the training method further comprises various data subset operations. As shown in FIG. 4G, some training methods may divide the training data into a training data subset, 435*a*, a validation data subset 435*b*, and a test data subset 435*c*. When training the network at block 430*a* as shown in FIG. 4F, the training method may first iteratively adjust the network's parameters using, e.g., backpropagation based upon all or a portion of the training data subset 435*a*. However, at block 430*b*, the subset portion of the data reserved for validation 435*b*, may be used to assess the effectiveness of the training. Not all training methods and architectures are guaranteed to find optimal architecture parameter or configurations for a given task, e.g., they may become stuck in local minima, may employ inefficient learning step size hyperparameter, etc. Methods may validate a current hyperparameter configuration at block 430*b* with training data 435*b* different from the training data subset 435*a* anticipating such defects and adjust the architecture hyperparameters or parameters accordingly. In some methods, the method may iterate between training and validation as shown by the arrow 430*f*, using the validation feedback to continue training on the remainder of training data subset 435*a*, restarting training on all or portion of training data subset 435*a*, adjusting the architecture's hyperparameters or the architecture's topology (as when additional hidden layers may be added to a neural network in meta-learning), etc. Once the architecture has been trained, the method may assess the architecture's effectiveness by applying the architecture to all or a portion of the test data subsets 435*c*. The use of different data subsets for validation and testing may also help avoid overfitting, wherein the training method tailors the architecture's parameters too closely to the training data, mitigating more optimal generalization once the architecture encounters new inference inputs. If the test results are undesirable, the method may start training again with a different parameter configuration, an architecture with a different hyperparameter configuration, etc., as indicated by arrow 430*e*. Testing at block 430*c* may be used to confirm the effectiveness of the trained architecture. Once the model is trained, inference 430*d* may be performed on a newly received inference input. One will appreciate the existence of variations to this validation method, as when, e.g., a method performs a grid search of a space of possible hyperparameters to determine a most suitable architecture for a task.

Many architectures and methods may be modified to integrate with other architectures and methods. For example, some architectures successfully trained for one task may be more effectively trained for a similar task rather than beginning with, e.g., randomly initialized parameters. Methods and architecture employing parameters from a first architecture in a second architecture (in some instances, the architectures may be the same) are referred to as "transfer learning" methods and architectures. Given a pre-trained architecture 440a (e.g., a deep learning architecture trained to recognize birds in images), transfer learning methods may perform additional training with data from a new task domain (e.g., providing labeled data of images of cars to recognize cars in images) so that inference 440e may be performed in this new task domain. The transfer learning training method may or may not distinguish training 440b, validation 440c, and test 440d sub-methods and data subsets as described above, as well as the iterative operations 440f and 440g. One will appreciate that the pre-trained model 440a may be received as an entire trained architecture, or, e.g., as a list of the trained parameter values to be applied to a parallel instance of the same or similar architecture. In some transfer learning applications, some parameters of the pre-trained architecture may be "frozen" to prevent their adjustment during training, while other parameters are allowed to vary during training with data from the new domain. This approach may retain the general benefits of the architecture's original training, while tailoring the architecture to the new domain.

Combinations of architectures and methods may also be extended in time. For example, "online learning" methods anticipate application of an initial training method 445a to an architecture, the subsequent application of an inference method with that trained architecture 445b, as well as periodic updates 445c by applying another training method 445d, possibly the same method as method 445a, but typically to new training data inputs. Online learning methods may be useful, e.g., where a robot is deployed to a remote environment following the initial training method 445a where it may encounter additional data that may improve application of the inference method at 445b. For example, where several robots are deployed in this manner, as one robot encounters "true positive" recognition (e.g., new core samples with classifications validated by a geologist; new patient characteristics during a surgery validated by the operating surgeon), the robot may transmit that data and result as new training data inputs to its peer robots for use with the method 445d. A neural network may perform a backpropagation adjustment using the true positive data at training method 445d. Similarly, an SVM may consider whether the new data affects its support vector selection, precipitating adjustment of its hyperplane, at training method 445d. While online learning is frequently part of reinforcement learning, online learning may also appear in other methods, such as classification, regression, clustering, etc. Initial training methods may or may not include training 445e, validation 445f, and testing 445g sub-methods, and iterative adjustments 445k, 445l at training method 445a. Similarly, online training may or may not include training 445h, validation 445i, and testing sub-methods, 445j and iterative adjustments 445m and 445n, and if included, may be different from the sub-methods 445e, 445f, 445g and iterative adjustments 445k, 445l. Indeed, the subsets and ratios of the training data allocated for validation and testing may be different at each training method 445a and 445d.

As discussed above, many machine learning architectures and methods need not be used exclusively for any one task, such as training, clustering, inference, etc. FIG. 4J depicts one such example GAN architecture and method. In GAN architectures, a generator sub-architecture 450b may interact competitively with a discriminator sub-architecture 450e. For example, the generator sub-architecture 450b may be trained to produce, synthetic "fake" challenges 450c, such as synthetic portraits of non-existent individuals, in parallel with a discriminator sub-architecture 450e being trained to distinguish the "fake" challenge from real, true positive data 450d, e.g., genuine portraits of real people. Such methods can be used to generate, e.g., synthetic assets resembling real-world data, for use, e.g., as additional training data. Initially, the generator sub-architecture 450b may be initialized with random data 450a and parameter values, precipitating very unconvincing challenges 450c. The discriminator sub-architecture 450e may be initially trained with true positive data 450d and so may initially easily distinguish fake challenges 450c. With each training cycle, however, the generator's loss 450g may be used to improve the generator sub-architecture's 450b training and the discriminator's loss 450f may be used to improve the discriminator sub-architecture's 450e training. Such competitive training may ultimately produce synthetic challenges 450c very difficult to distinguish from true positive data 450d. For clarity, one will appreciate that an "adversarial" network in the context of a GAN refers to the competition of generators and discriminators described above, whereas an "adversarial" input instead refers an input specifically designed to effect a particular output in an implementation, possibly an output unintended by the implementation's designer.

Data Overview

FIG. 5A is a schematic illustration of surgical data as may be received at a processing system in some embodiments. Specifically, a processing system may receive raw data 510, such as video from a visualization tool 110b or 140d comprising a succession of individual frames over time 505. In some embodiments, the raw data 510 may include video and system data from multiple surgical operations 510a, 510b, 510c, or only a single surgical operation.

As mentioned, each surgical operation may include groups of actions, each group forming a discrete unit referred to herein as a task. For example, surgical operation 510b may include tasks 515a, 515b, 515c, and 515e (ellipses 515d indicating that there may be more intervening tasks). Note that some tasks may be repeated in an operation or their order may change. For example, task 515a may involve locating a segment of fascia, task 515b involves dissecting a first portion of the fascia, task 515c involves dissecting a second portion of the fascia, and task 515e involves cleaning and cauterizing regions of the fascia prior to closure.

Each of the tasks 515 may be associated with a corresponding set of frames 520a, 520b, 520c, and 520d and device datasets including operator kinematics data 525a, 525b, 525c, 525d, patient-side device data 530a, 530b, 530c, 530d, and system events data 535a, 535b, 535c, 535d. For example, for video acquired from visualization tool 140d in theater 100b, operator-side kinematics data 525 may include translation and rotation values for one or more hand-held input mechanisms 160b at surgeon console 155. Similarly, patient-side kinematics data 530 may include data from patient side cart 130, from sensors located on one or more tools 140a-d, 110a, rotation and translation data from arms 135a, 135b, 135c, and 135d, etc. System events data 535 may include data for parameters taking on discrete values, such as activation of one or more of pedals 160c, activation of a tool, activation of a system alarm, energy applications, button presses, camera movement, etc. In some situations, task data may include one or more of frame sets 520, operator-side kinematics 525, patient-side kinematics 530, and system events 535, rather than all four.

One will appreciate that while, for clarity and to facilitate comprehension, kinematics data is shown herein as a waveform and system data as successive state vectors, one will appreciate that some kinematics data may assume discrete values over time (e.g., an encoder measuring a continuous component position may be sampled at fixed intervals) and, conversely, some system values may assume continuous values over time (e.g., values may be interpolated, as when a parametric function may be fitted to individually sampled values of a temperature sensor).

In addition, while surgeries 510a, 510b, 510c and tasks 515a, 515b, 515c are shown here as being immediately adjacent so as to facilitate understanding, one will appreciate that there may be gaps between surgeries and tasks in real-world surgical video. Accordingly, some video and data may be unaffiliated with a task or affiliated with a task not the subject of a current analysis. In some embodiments, these "non-task"/"irrelevant-task" regions of data may themselves be denoted as tasks during annotation, e.g., "gap" tasks, wherein no "genuine" task occurs.

The discrete set of frames associated with a task may be determined by the tasks' start point and end point. Each start point and each endpoint may be itself determined by either a tool action or a tool-effected change of state in the body. Thus, data acquired between these two events may be associated with the task. For example, start and end point actions for task 515b may occur at timestamps associated with locations 550a and 550b respectively.

FIG. 5B is a table depicting example tasks with their corresponding start point and end points as may be used in conjunction with various disclosed embodiments. Specifically, data associated with the task "Mobilize Colon" is the data acquired between the time when a tool first interacts with the colon or surrounding tissue and the time when a tool last interacts with the colon or surrounding tissue. Thus any of frame sets 520, operator-side kinematics 525, patient-side kinematics 530, and system events 535 with timestamps between this start and end point are data associated with the task "Mobilize Colon". Similarly, data associated the task "Endopelvic Fascia Dissection" is the data acquired between the time when a tool first interacts with the endopelvic fascia (EPF) and the timestamp of the last interaction with the EPF after the prostate is defatted and separated. Data associated with the task "Apical Dissection" corresponds to the data acquired between the time when a tool first interacts with tissue at the prostate and ends when the prostate has been freed from all attachments to the patient's body. One will appreciate that task start and end times may be chosen to allow temporal overlap between tasks, or may be chosen to avoid such temporal overlaps. For example, in some embodiments, tasks may be "paused" as when a surgeon engaged in a first task transitions to a second task before completing the first task, completes the second task, then returns to and completes the first task. Accordingly, while start and end points may define task boundaries, one will appreciate that data may be annotated to reflect timestamps affiliated with more than one task.

Additional examples of tasks include a "2-Hand Suture", which involves completing 4 horizontal interrupted sutures using a two-handed technique (i.e., the start time is when the suturing needle first pierces tissue and the stop time is when the suturing needle exits tissue with only two-hand, e.g., no one-hand suturing actions, occurring in-between). A "Uterine Horn" task includes dissecting a broad ligament from the left and right uterine horns, as well as amputation of the uterine body (one will appreciate that some tasks have more than one condition or event determining their start or end time, as here, when the task starts when the dissection tool contacts either the uterine horns or uterine body and ends when both the uterine horns and body are disconnected from the patient). A "1-Hand Suture" task includes completing four vertical interrupted sutures using a one-handed technique (i.e., the start time is when the suturing needle first pierces tissue and the stop time is when the suturing needle exits tissue with only one-hand, e.g., no two-hand suturing actions occurring in-between). The task "Suspensory Ligaments" includes dissecting lateral leaflets of each suspensory ligament so as to expose ureter (i.e., the start time is when dissection of the first leaflet begins and the stop time is when dissection of the last leaflet completes). The task "Running Suture" includes executing a running suture with four bites (i.e., the start time is when the suturing needle first pierces tissue and the stop time is when the needle exits tissue after completing all four bites). As a final example, the task "Rectal ArteryNein" includes dissecting and ligating a superior rectal artery and vein (i.e. the start time is when dissection begins upon either the artery or the vein and the stop time is when the surgeon ceases contact with the ligature following ligation).

Example Operator Assessment Processing Topology

A surgeon's technical skills are an important factor in delivering optimal patient care. Unfortunately, many existing methods for ascertaining an operator's skill remain subjective, qualitative, or resource intensive. Various embodiments disclosed herein contemplate more effective surgical skill assessments by analyzing operator skills using objective performance indicators (OPIs), quantitative metrics generated from surgical data, which are suitable for examining the operator's individual skill performance, task-level performance, as well as performance for the surgical operation as a whole. One will appreciate that OPIs may also be generated from other OPIs (e.g., the ratio of two OPIs may be considered an OPI), rather than taken directly from the data values. Skills are an action or a group of actions performed during a surgery recognized as influencing the efficiency or outcome of the surgery. Initially, for purposes of automated operation, skills may be "defined" or represented by an initial assignment of OPIs (e.g., as suggested by an expert), though such initial assignments may be adjusted using various of the systems and methods described herein.

Figure 6:
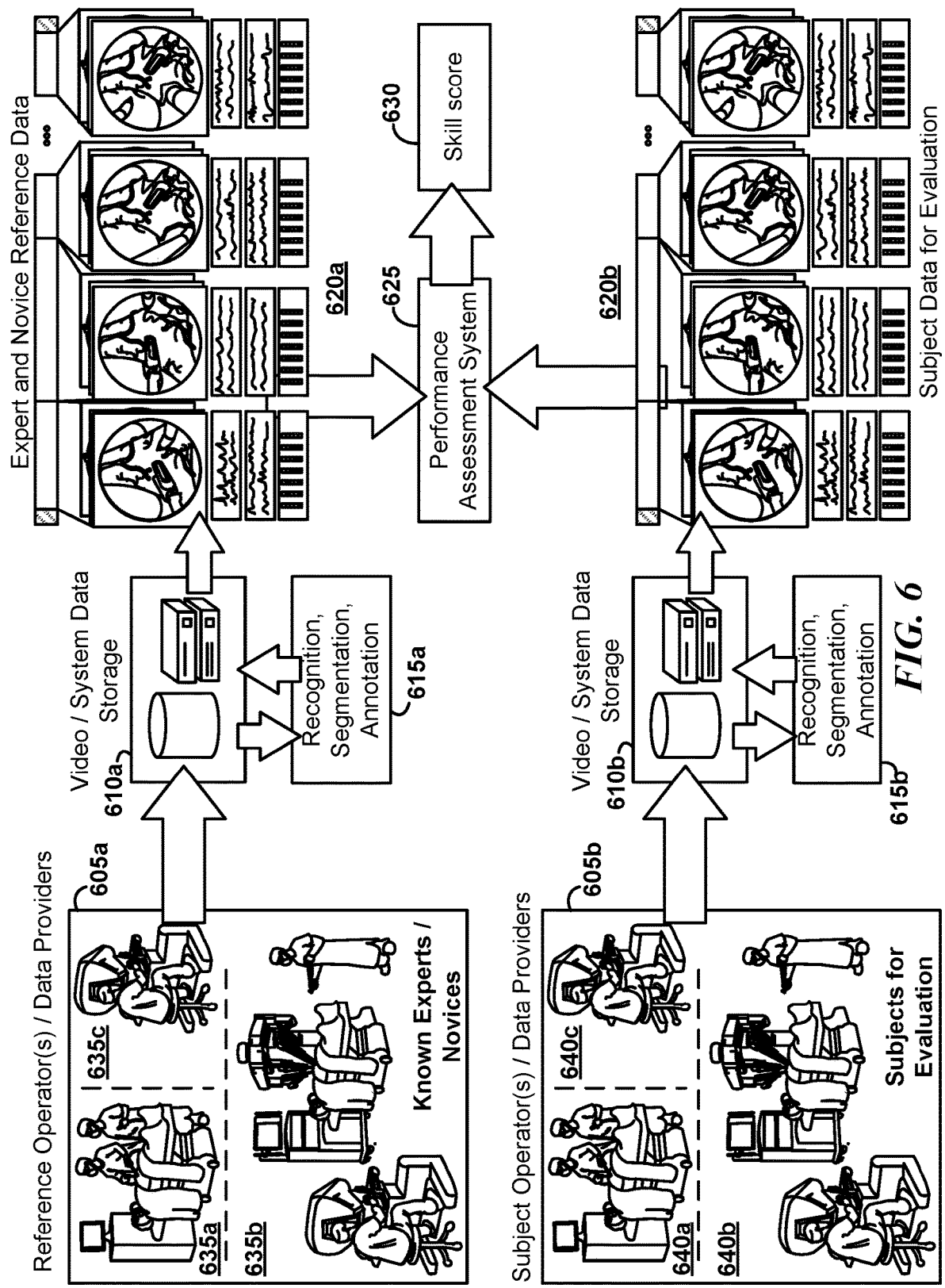
FIG. 6 is a schematic diagram illustrating information flow for performing a surgical skills (or task) assessment as may occur in some embodiments.

FIG. 6 is a schematic topology diagram illustrating information flow for performing a surgical skills assessment as may occur in some embodiments. Specifically, "reference" data 605a may be data acquired from real-world non-robotic surgery theaters 635a, real-world robotic surgery theaters 635b, and simulated operations 635c (though a robotic simulator is shown, one will appreciate that non-robotic surgeries may also be simulated, e.g. with appropriate dummy patient materials). Reference datasets 605a may include data for both "experienced" (e.g., operators with more than 100 hours of experience performing a skill or task) and "novice" users (e.g., operators with less than 100 hours of experience performing a skill or task). Reference datasets 605a may be used to train a machine learning model classifier (e.g., one or more skill or task models as discussed herein) as part of performance assessment system 625.

At a later time, "subject" datasets 605b may be acquired and may also include data provided by real-world non-robotic surgery theaters 640a, real-world robotic surgery theaters 640*b*, and simulated operations 640*c* (again, though a robotic simulator is shown, one will appreciate that non-robotic surgeries may also be simulated, e.g. with appropriate dummy patient materials). Subject datasets 605*b* may likewise be provided to the classifier in performance assessment system 625 trained with "reference" data 605*a* to produce performance metrics 630 (e.g., skill scores, task scores, etc.) for the subject datasets 605*b*. Selecting the "Capture Case" button 640 may have the same effect as selecting the Submit button 635 in some embodiments.

In some embodiments, reference dataset 605*a* and subject dataset 605*b* may be stored in data storages 610*a* and 610*b*, respectively, prior to consumption by performance assessment system 625. In some embodiments data storages 610*a* and 610*b*, may be the same data storage. In some embodiments, the data storages 610*a* and 610*b* may be offsite from the locations at which the data was acquired, e.g., in a cloud-based network server. Processing systems 615*a* and 615*b* may process the stored data in data storages 610*a* and 610*b* (e.g., recognizing distinct surgeries captured in the data stream, separating the surgeries recognized in the stream into distinct datasets, providing metadata annotations for the datasets, merely ensuring proper data storage without further action, etc.). In some embodiments, human annotators may assist, correct, or verify the results of processing systems 615*a* and 615*b*. In some embodiments processing systems 615*a* and 615*b* may be the same processing system.

Processed reference data 620*a* and subject data 620*b* in the data storages 610*a* and 610*b* may then be used by performance assessment system 625 to determine performance metrics 630 as mentioned above, specifically, processed data 620*a* may be used to train a classifier in performance assessment system 625 and then the classifier may be used to generate performance metrics 630 for processed data 620*b*.

Example Processing Overview

FIG. 7A is a flow diagram illustrating various operations in a process 700 for generating and applying skill (or task) models as may be performed in some embodiments. Generally, operations comprise either a training 705*a* of the skill models with annotated training data or inference 705*b* of new, unannotated data using such models. Specifically, at block 705*c* a processing system (e.g., performance assessment system 625) may receive raw data, e.g., visualization tool data 520, operator-side kinematics data 525, patient-side kinematics data 530, and system events data 525 appearing in dataset 605*a*, though as mentioned, less than all these types of data may be available in some embodiments. As this data is used for training skill (or task) models, which will be used to determine the surgeon's skill score, the data may be annotated to indicate whether the data was generated by an "expert" or "nonexpert" surgeon. As will be discussed herein, the training data may contain asymmetries, as when there are many more nonexpert than expert data values. Consequently, a resampling method, such as Synthetic Minority Oversampling Technique (SMOTE) (e.g., using the Imblearn™ library function imblearn.over_sampling.SMOTE), may be applied to the raw training data at block 705*c* or to the generated metrics at block 705*d*. One will appreciate that variants of SMOTE may likewise be employed, e.g., SMOTE with Edited Nearest Neighbors cleaning (SMOTEENN), SMOTE using Tomek links (SMOTETomek), etc.

At block 705*d*, the system may covert the raw data to metrics, e.g., OPIs, as will be described in greater detail herein. Naively, one might use all the metrics when assessing all contemplated surgeon skills, and indeed, some embodiments may take this approach. However, at block 705*e*, various embodiments will select specific types of metrics for each model to use when assessing their corresponding skill (or task). In addition to reducing future computational overhead, this may better fine tune the models, ensuring that the models operate on more suitable feature vectors for their respective skills. At block 705*f*, the system may train each skill or task model using those metric feature vectors generated at block 705*d* selected for each of the skill or task models at block 705*e*. For clarity, a skill model is a machine learning model trained to distinguish expert from non-expert OPI values associated with a skill, while a task model is a machine learning model trained to distinguish expert from non-expert OPI values associated with a task (though, as discussed herein, e.g., with respect to FIG. 13A, score results from skill models may also be used to infer score results for tasks). One will appreciate that as both task and skill models operate upon collections of OPI data to produce a score, descriptions herein for OPI-selection, training, and application with respect to skill models apply likewise to task models (even though only skill models may be discussed for clarity).

These trained models may then be used for subsequently evaluating other surgeons' performances (e.g., as reflected in subject dataset 605*b*). Specifically, as the system receives additional raw data (which, for inference, will not be annotated as being associated with either an expert or nonexpert) at block 705*g* the system may iterate through such data, converting it to the appropriate metrics for each skill model at block 705*h*, and generating skill scores at block 705*i* (in this example separate tasks are associated with separate skills, though in some embodiments, the same skills may apply throughout the surgery).

FIG. 7B is a schematic diagram illustrating various components employed in an example application of a skill model to determine a surgical score as may be implemented in some embodiments. Specifically, given a skill model 710*d* trained in accordance with blocks 705*c*, 705*d*, 705*e*, and 705*f*, performance assessment system 625 may perform the operations of blocks 705*h* and 705*i*. For example, given new raw data 710*a*, which may include system data, patient-side or console-side kinematics, or video frame data, a conversion component 710*b* (e.g., logic in software, hardware, or firmware) may convert the raw data to a variety of metric values 710*c*. In this example, the OPIs (e.g., those chosen for this specific skill model 710*d* at block 705*e*) are represented as arrays of individual OPI values associated with each frame timestamp value. With these metrics now available, the system may select all or a subset of the OPIs for consideration by a skill model 710*d* (in these embodiments, each skill is associated with its own model, though one will appreciate embodiments where a single model is trained to output on multiple skills). Application of the OPI values to the model 710*d* may generate model output values 710*e*. Since the model was trained to recognize "experts" and "nonexperts" based upon the OPI feature vector input, the output 710*e* may be two values, e.g., the probability that the input OPIs 710*c* were derived from data 710*a* generated by an expert or a nonexpert. Here, for example, the results may indicate a 55% probability the creator of the data was an expert and a 45% probability the creator was a nonexpert. As will be discussed, model 710*d* may be any suitable classifier able to generally distinguish experts and nonexperts for the given OPI data, e.g., a logistic regression classifier, an SVM, a neural network, a random forest, etc. In some embodiments, the model 710*d* may be configured to receive OPI values for a single subset of the raw data available (e.g., data associated with one-second intervals) and may thus be iteratively applied to the raw data. In some embodiments, however, model 710d may be configured to receive all the raw data 710a as a single input and produce output pairs 710e for each timepoint in the data (e.g., at each timestamp of frames in the data).

As will be discussed, the raw model probability outputs 710e may not always be directly suitable for determining a "score" for the surgeon who generated data 710a with respect to the skill in question (i.e., the skill associated with model 710d). Thus, the system may include a post-processing model 710f which may map model output values 710e to a final score value 710g (e.g., by relating the outputs to scores from a reference population as descried herein with reference to FIGS. 12B and 12C).

While one will appreciate from the discussion of FIG. 7B how the system may be applied to generate scores for multiple sets of data (e.g., every frame of a video of a surgery), for clarity, FIG. 7C illustrates one "windowing" approach for generating such data. Specifically, the entirety of the raw data may be organized into data "segments" 750a-e, which may correspond to raw data falling within successive discrete time intervals. For example, data segment 750a may be system and kinematics data during a first 30 seconds of recording, data segment 750b may be systems and kinetics data acquired at the 30 seconds following segment 750a, data segment 750c may likewise follow data segment 750b and so forth.

The model 710d may be configured to receive OPI values generated from three successive segments of data. Accordingly, a three-segment "window" may be temporally applied across the segments 750a-e. For example, segments 750a, 750b, and 750c may be used to generate three OPI values 750f, segments 750b, 750c, and 750d may be used to generate three OPI values 750g, and segments 750c, 750d, and 750e may be used to generate three OPI values 750h. Each of the OPI values 750f, 750g, 750h may serve as feature vectors (i.e., OPIs 710c) supplied to model 710d to produce corresponding prediction outputs 750i, 750j, 750k (i.e., each an instance of output 710e). Each of these outputs may then be processed by post-processing component 710f to produce the final scores 0.73, 0.72, and 0.75 respectively. One will appreciate variations, as when the window considers individual datapoints in lieu of segments of data, the window size is adjusted as processing continues, etc.

In this manner, the final scores may be associated with the corresponding data segment timestamps to plot score evaluations over time. For example, the 0.73 skill score may be associated with the timestamp of segment 750b, the 0.72 skill score may be associated with the timestamp of segment 750c, and the 0.73 skill score may be associated with the timestamp of segment 750d, etc. While this example uses a three-segment window and generates three OPI values based on those three segments, one will readily appreciate that this is merely one possible value selected to facilitate comprehension. Shorter/longer segment windows or more/less segment windows may be used. For very short windows, the prediction outputs 750i, 750j, 750k may be consolidated, e.g., averaged, to facilitate inspection by a human reviewer. Conversely, for long windows, intermediate score values may be produced by interpolation.

Such data may thereby be organized into a plot, such as that shown in FIG. 7D, wherein scores for the retraction skill in the "Uterine Horn" task are shown for each corresponding segment timestamp (one will appreciate that one could analogously organize a task score from a task model over time, rather than a skill score from a skill model). Corresponding scores in this manner to timestamps may facilitate the correlation of score values with specific times in a surgery, e.g., the skill score during each of tasks 515a, 515b, 515c, and 515e. Where the task is known to require proficiency in this skill, the corresponding plot as in in FIG. 7D may be very useful. For example, the portions of the plot corresponding to the task may be highlighted to the surgeon and feedback provided whether their performance was "good" or "bad" relative to their peers. Naturally, one task may require multiple skills and so multiple plots like FIG. 7D may be presented to the surgeon together. Such plots relative to the times when the tasks occur may also help contextualize the score values for human reviewers. For example, when surgeons review videos of their surgeries, such granular results may allow the surgeon to jump to times in the video where their performance is better or worse, so as to quickly identify "highlights" of the performance rather than reviewing the entirety of the video.

Objective Performance Indicators—Application Overview

To facilitate understanding, FIG. 8A is a schematic diagram illustrating relations between various metrics and data structures as may be used in some embodiments. Specifically, a surgical operation 805a may consist of a plurality of tasks e.g., tasks 805b, 805c, and 805d. Each task may itself implicate a number skills. For example, task 805c may depend upon each of skills 805e, 805f, and 805g. In a similar manner, each skill may itself be assessed based upon one or more OPI metric values (though, as mentioned, OPI values may be directly related to tasks, without intervening skills, in some embodiments). For example, the skill 805f may be assessed by the OPI metrics 805h, 805i, and 805j. Each OPI metric may be derived from one or more raw data fields. For example, OPI metric 805i may depend upon raw data values 805k, 805l, and 805m. Thus, care may be taken to divide the surgery into meaningful task divisions, to assess the skills involved in each task, to determine OPIs and relate them to the various skills, and to define the OPIs from the available data.

As an example of raw data (specifically, kinematics data), FIG. 8B depicts a forceps 840's translational movement 845a in three-dimensional space, as may be used to generate one or more OPIs in some embodiments. FIG. 8C is an example raw data input, specifically, a plurality of rotations in three-dimensional space about a plurality of forceps component axes, as may be used to generate one or more OPIs in some embodiments. Forceps 840 may be able to rotate 845b, 845c, 845d various of its components about respective axes 850a, 850b, and 850c. The translations and rotations of FIGS. 8B and 8C may be captured in raw kinematics data over time, forming raw data values 805k, 805l, and 805m. OPI metric 805i may be a "forceps tip movement speed" OPI and may represent the speed of the forceps tip based upon the raw values 805k, 805l, and 805m (e.g., the OPI may infer the tip speed from a Jacobian matrix derived from the raw data of FIGS. 8B and 8C). OPI metric 805i may then be one of several OPI metrics used as part of a feature vector in a model to produce a skill score for skill 805f (or, again, a task score for task 805c). In some embodiments, collections of skill scores may then be used to assess the surgeon's performance of task 805c, and ultimately, by considering all the tasks, the surgeon's performance of the surgery 805a overall.

Again, for clarity, where one wishes to assess a surgeon's performance on one of tasks 805b, 805c, and 805d, some embodiments may score the task by considering the task's constituent skill scores resulting from skill-based models. Alternatively, in some embodiments, one may instead simply assign OPIs to tasks directly and then train task-based (rather than skill-based) models using OPIs and the systems and methods disclosed herein for skills mutatis mutandis (i.e., have experts select OPIs for tasks rather than for skills, perform the OPI filtering upon the OPI set selected for the task rather than an OPI set selected for a skill, etc.).

Example OPI—Skill/Task Mapping

Figure 11A:
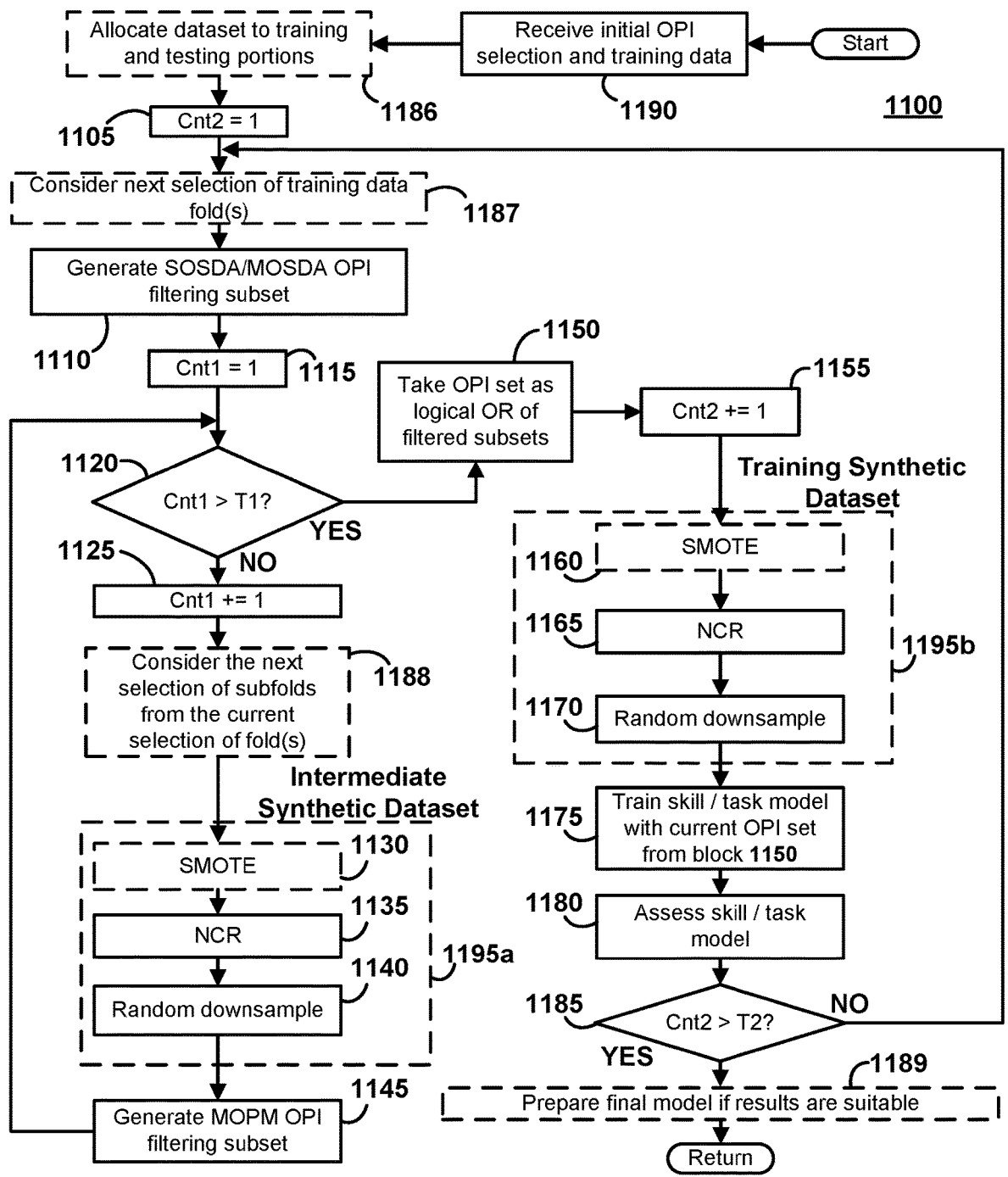
FIG. 11A is a flow diagram illustrating various operations in an example process for evaluating skill (or task) model configurations and OPI selections, e.g., to train an expertise model, as may be implemented in some embodiments.

FIG. 8D is a pair of tables 835a, 835b illustrating example OPI to skill and skill to task mappings as may be applied in some embodiments (e.g., following the OPI selection processes of FIG. 11A or as an initial mapping based upon expert intuition and experience). With a plurality of skills 855c, shaded cells of table 835b indicate corresponding OPIs 855b. Similarly, table 835a indicates via shaded cells how tasks 855a may correspond to skills 855c.

For clarity, in the example correspondence shown in FIG. 8D, e.g., all six of the shown tasks depend upon the "Camera Use" skill, however, only the "Uterine Horn" task depends upon the "2-Hand Arm Retraction" skill. Similarly, the "Dominant Arm Wrist Articulation" OPI relates to the "Suture" skill. From these tables, one can also make transitive inferences, for example, that the "Rate Camera Control" OPI is relevant to the "Uterine Horn" task (as "camera use" is common to both in each of the tables). Thus, tables such as FIG. 8D may be used to select OPIs both for skill models and for task models. One will appreciate that more skills, tasks, and OPIs may apply than those shown in this example. Also note that a single skill may be applicable to multiple tasks. Again, an initial OPI to skill correspondence may be augmented via a data-driven selection described in greater detail herein.

As mentioned, an initial OPI to skill correspondence, OPI to task correspondence, or skill to task correspondence may be determined by inspection or by consulting with an expert. However, as will be discussed herein, selecting appropriate OPIs for a skill or task by manual inspection alone may often be intractable, and so automated systems presented herein may be employed.

Specifically, while it is true that machine learning models trained upon features of all the OPIs may naturally focus their processing upon more salient OPIs (e.g., as when a neural network reduces weights associated with irrelevant features or an SVM generally ignores irrelevant dimensions when selecting a hyperplane separation), such deference to the model may complicate interpretative ability as it may be unclear to the practitioner how exactly the model up or down-selected a given OPI. Instead, efficiently mapping OPIs to skills in the manner of FIG. 8D may render skill scores reported to surgeons more generalizable and interpretable. Thus, rather than crudely over associating many more OPIs with a skill or task than is necessary, selecting a more efficient subset of OPIs may facilitate grouping data into categories surgeons more easily understand, which may itself facilitate more meaningful breakdowns in surgeon feedback. Additionally, including fewer OPIs in the input features may also reduce the computational overhead during training and inference of the respective skill models. Indeed, relying upon fewer OPIs may also allow the system to continue to produce at least some skill scores even when less than all the data types are available (or when less than all the data can be synchronized) to generate the full set of OPI values.

OPI Selection—Example Overview

Figure 9A:
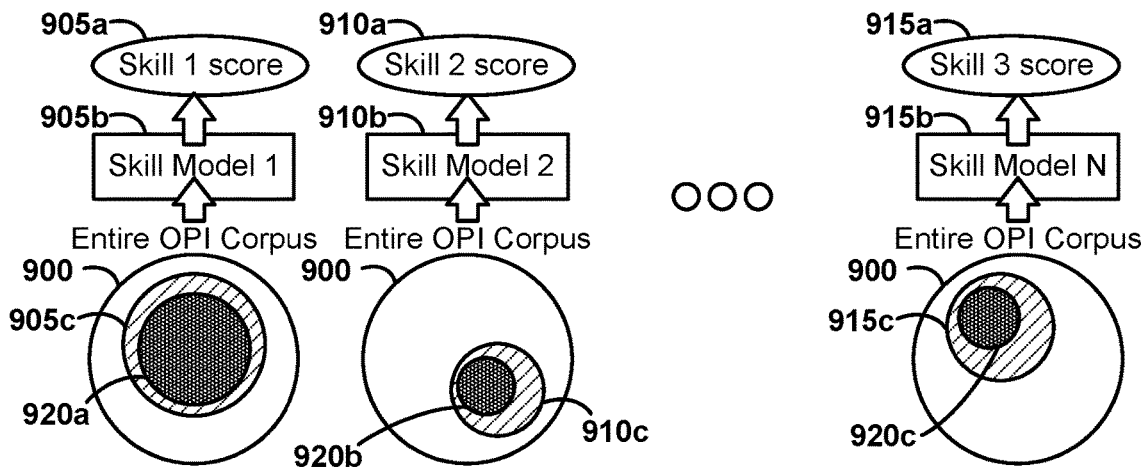
FIG. 9A is a schematic diagram illustrating an example set of relations between skills, skill models, and OPIs as may be implemented in some embodiments.

FIG. 9A is a schematic diagram illustrating an example set of relations between skills, skill models, and OPIs as may be implemented in some embodiments. Here, each skill score 905a, 910a, 915a, etc. may derived from a corresponding machine learning model 905b, 910b, 915b, respectively (though, as mentioned, post-processing upon the model's output may be applied to determine the final skill score value in some embodiments). While some embodiments contemplate providing the entire OPI set to every skill model (indeed a monolithic model providing outputs for all contemplated skills in some embodiments may be used), here, each model 905b, 910b, 915b may instead consider a subset 920a, 920b, 920c from the entire corpus 900 of available OPIs. Specifically, a human annotator (such as an expert surgeon) may select initial subsets 905c, 910c, 915c based upon expertise and intuition as being associated with the respective skills. For example, an expert may consider whether a given OPI has any bearing on the skill in question. The skill "camera management" may involve OPIs relating to camera velocity, but is unlikely to depend upon OPIs related to, say, scissor activation. Consequently, the initial OPI subset selection for a camera-related skill may include all OPIs derived from camera-related data.

Thus, in some embodiments, OPI values for subsets 905c, 910c, 915c may be supplied to models 905b, 910b, 915b and used for determining skill scores. However, as discussed above, there may be benefits to removing redundant or uninformative OPIs. Accordingly, in some embodiments, an automated filtering is applied to 905c, 910c, 915c to determine final sets of OPIs 920a, 920b, 920c. One will appreciate, however, that sometimes the automated filtering will agree with the initial subset selection (e.g., subsets 905c and 920a are the same). Similarly, some embodiments may forego the initial human annotation and rely entirely upon the automated filtering (e.g., set 900 and initial subset 905c are the same).

One will appreciate that each of the subsets 920a, 920b, 920c across different tasks may or may not include one or more of the same OPIs. Indeed, in some cases, two or more of the subsets 920a, 920b, 920c may be the same set of OPIs. In some embodiments, the same skill may be assessed with a different machine learning model when the skill is used in a different task. Alternatively, in some embodiments where the training data is annotated at the task level (i.e., the portions of the data pertaining to a task are identified as such) the models 905b, 910b, 915b may be configured to receive an additional input indicating the task (thereby encouraging them to produce task-specific skill assessments). Thus, one will appreciate that in some embodiments, different per-task skill models may receive different per-task OPI subsets.

Figure 9B:
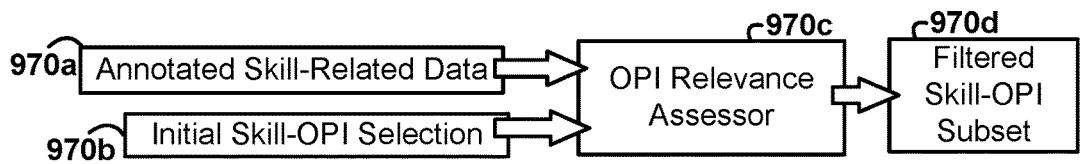
FIG. 9B is a schematic block diagram illustrating the operation of an OPI relevance assessor system to filter an OPI subset for a given skill or task as may be implemented in some embodiments.

To effectively select OPI subsets in a replicable and meaningful manner, various embodiments contemplate applying an OPI Relevance Assessor component 970c (e.g., logic in software, hardware, or firmware) as shown in FIG. 9B. Such a component may receive annotated training data 970a (i.e., surgical data annotated as being either from an expert or a nonexpert with respect to the particular skill or task in question) and the initial OPI selection 970b for a given skill (or task). OPI Relevance Assessor component 970c may apply one or more filtering operations to the initial OPI selection 970b to determine a final filtered selection 970d (e.g., where the initial OPI selection 970b is set 905c, the final set 970d may be the set 920a).

Figure 9C:
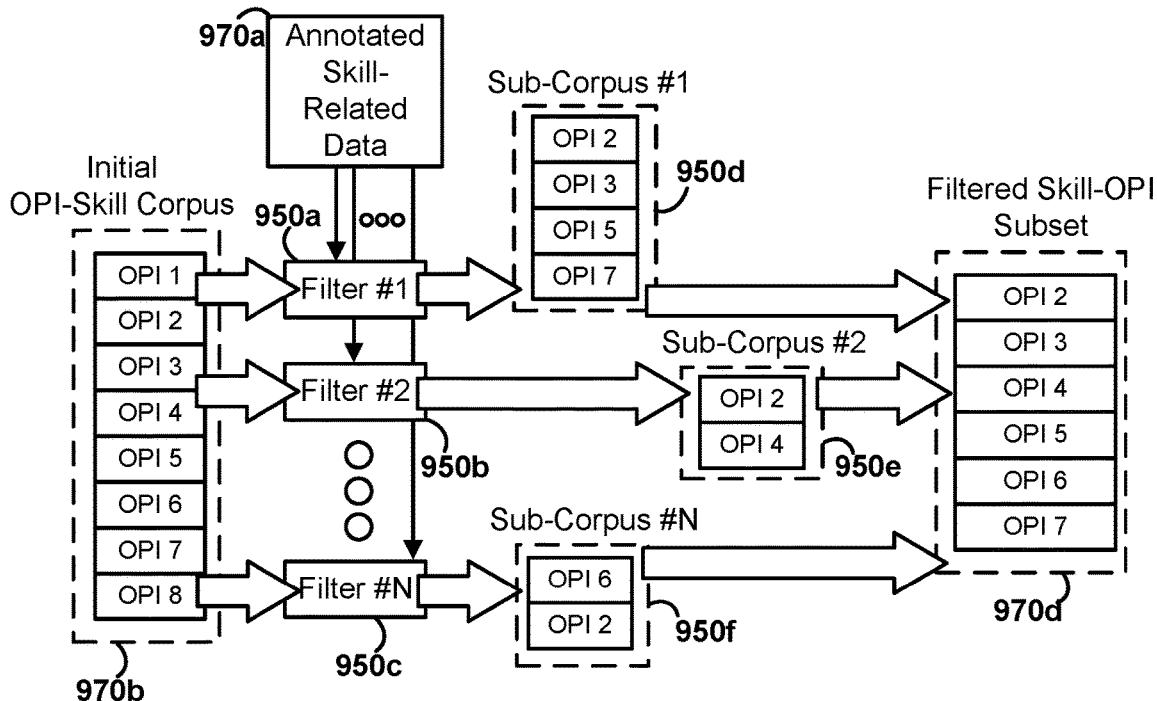
FIG. 9C is a schematic diagram illustrating an example filtering framework as may be implemented in an OPI relevance assessor system in some embodiments.

A high-level visualization of an example operation of an OPI Relevance Assessor component 970d is shown in FIG. 9C. Here, the initial OPI corpus 970b for the skill, e.g., set 905c as selected by a domain expert, may include eight distinct OPIs ("OPI 1", "OPI 2", etc.). OPI Relevance Assessor component 970d may submit the corpus 970b to one or more filters, e.g., to each of a plurality of filters 950a,

950*b*, and 950*c*. Each of these filters may return all, or a subset, of the members of the corpus 970*b* by considering the corresponding data 970*a* for the respective OPIs. Here, for example, the filter 950*a* has removed OPIS 1, 4, 6, and 8 to produce sub-corpus 950*d*. Similarly, filter 950*b* has produced sub-corpus 950*e* and filter 950*c* has produced sub-corpus 950*f*. Again, some of the filters 950*a*, 950*b*, and 950*c* may consider the expert/nonexpert annotated training data 970*a* when performing their filtering (e.g., as described in greater detail herein with respect to the examples of FIGS. 10A and 10C). Example filters 950*a*, 950*b*, and 950*c* include the Mann-Whitney U test, correlation-based filtering, linear discriminant analysis, chi-square test analysis, t-test (and variants, such as Welch's), least absolute shrinkage and selection operator (LASSO) regression, random forests or decision trees, RFE/recursive feature elimination (with logistical regression base estimators, standard ML models as base estimators, etc.), PCA/Sparse PCA/Fourier Methods/ etc. (e.g., by retaining the OPIs with the largest principal components or signal contributions in the training data), t-Distributed Stochastic Neighbor Embedding (t-SNE), Uniform Manifold Approximation and Projection (UMAP) dimension reduction-based techniques, relief feature selection, the Boruta algorithm (e.g., as implemented in the Boruta R™ language package), etc.

After the filters 950*a*, 950*b*, 950*c* produce sub-corpuses 950*d*, 950*e*, and 950*f*, OPI Relevance Assessor component 970*c* may consolidate the sub-corpuses 950*d*, 950*e*, and 950*f* into a final set 970*d*. This consolidation may take different forms in different embodiments. In this example, component 970*c* has taken the logical OR (or, equivalently, the union) of the sub-corpuses 950*d*, 950*e*, and 950*f* to produce the final sub-corpus 970*d* upon which the skill model may be trained (i.e., the model will consume OPI data for training and inference corresponding to the selected OPIs of the set 970*d*). For example, OPI 2 appears in both subsets 950*d* and 950*e* and so appears only once in the final set 970*d*. In contrast, none of the sets 950*d*, 950*e*, or 950*f* contains OPI 8 and so OPI 8 does not appear in final set 970*d*. Here, the filters are treated equally, but in some embodiments, some filter's subsets may be given preference over others and the OPIs appearing in set 970*d* may be selected by, e.g., weighted voting of the sets 950*d*, 950*e*, or 950*f* (e.g., selecting the four most common OPIs in the sets 950*d*, 950*e*, or 950*f*). Similarly, some embodiments may use the logical AND (e.g., the intersection of each corpus) of the sets instead of the logical OR. In this example, a logical AND would produce a final set 970*d* having only OPI 2.

How best to unite the subsets (weighted voting, logical OR, logical AND, etc.) may depend upon the skill model employed, the nature of the OPIs, and the computational constraints imposed. For example, where computational resources are extensive, the skill model is robust (e.g., a deep learning model) and able to discern the relevance of multiple OPIs, or the OPIs do not necessarily capture significant amounts of the data, then the logical OR may be more suitable. In contrast where computational resources are limited, the skill model is less robust, or the OPIs capture significant amounts of the data, then the logical AND may be more suitable. In various experimental reductions to practice, discussed herein, where the model was a logistic regression classifier, the OPIs were as shown in FIGS. 17, 18, 19, and 20, and the logical OR was found to produce favorable results.

In some embodiments, filters may also be selected by performing preliminary verifications upon the data to be processed. For example, the data may be tested for assumptions of normality, equal variances, etc., and if the data source is found to meet various independence requirements, then various filters may be applied alone or in combination accordingly.

As mentioned, filters 950*a*, 950*b*, 950*c* may select OPIs in accordance with a variety of methods. Generally, the filters may assume one of three forms: single OPI statistical distribution analysis (SOSDA) filters, multi-OPI statistical distribution analysis (MOSDA) filters, and multi-OPI predictive model (MOPM) filters. SOSDA and MOSDA filters may be used to determine whether an expert distribution of a set of OPI values and a non-expert distribution of a set of OPI values, for a selection of one or more OPI values, respectively, are sufficiently different that the one or more OPIs may be useful for distinguishing expert from nonexpert data (e.g., in accordance with the method of FIG. 10A described herein). Specifically, "difference" for each of SOSDA and MOSDA filters may be determined in accordance with a statistical test applied to the expert and nonexpert distributions. Examples of statistical tests and analyses used in SOSDA filters include, e.g., hypothesis tests such as Mann Whitney, t-test, Welch's t-test, correlation methods, generalized linear models, chi-square test, etc. Similarly, examples of statistical tests and analyses which may be used in MOSDA filters include, e.g., the Wald test, ANOVA, generalized linear models, PCA, sparse PCA, t-SNE, UMAP/other dimensionality reduction techniques, correlation, etc. MOPM filters may, in contrast, consider an effectiveness of OPI values from a selection of one or more OPIs in distinguishing expert/non-expert data with a predictive model, and accordingly may include, e.g., recursive feature elimination (RFE) with log reg or other base estimators, relief feature selection, linear discriminant analysis, LASSO regression, random forest methods, decision trees, Boruta feature selection, etc. Thus, one will appreciate that filters 950*a*, 950*b*, 950*c* may all be SOSDA filters, may all be MOSDA filters, may all be MOPM filters, that some may be filters of one type while other of the filters are of other types, etc. Similarly, one will recognize that both MOSDA filters and MOPM filters may employ clustering methods, such as K-means, K-Nearest-Neighbors, hierarchical clustering, density-based spatial clustering of applications with noise (DBSCAN), etc., as statistical tests or iterative model predictions may then be used to assess dissimilarity or prediction effectiveness of the identified clusters.

OPI Selection—Example SOSDA/MOSDA OPI Filtering Process

FIG. 10A is a flow diagram illustrating an example process 1010 for SOSDA-style OPI filtering, as may be implemented in some embodiments, though one will appreciate that the steps may be applied for MOSDA filtering by considering multiple OPIs at once rather than one OPI at a time. Here, at blocks 1010*a* and 1010*b* the system may iterate through the OPIs in the set 970*b* (again, during MOSDA-style filtering one will appreciate that collections of OPIs rather than single OPIs may be considered at block 1010*b*). For each of these OPIs the system may consult the corresponding expert/nonexpert annotated (again, "expert" with respect to the skill in question) data 970*a* at block 1010*c*, to determine the respective distributions of the OPI value in each of the expert and nonexpert datasets for the skill. At block 1010*d*, the system may then consider whether the distributions are similar or dissimilar.

For example, where the skill is "camera movement" and the OPI considered at block 1010*b* is "duration of camera movement" the distributions may be very dissimilar, as novice users may take more time to situate the camera, with wider variance, than experts who often quickly and precisely place the camera. Conversely, if the OPI considered at block 1010*b* was "focus" (e.g., as assessed by looking for a widest frequency variety from a Fourier transform of a video image), both experts and nonexperts may be able to quickly achieve proper focus. Thus, the distributions in the data may be very similar. Since dissimilar OPI distributions may be more useful for distinguishing experts from nonexperts, they may be retained at block 1010*e*, while similar distributions may result in the OPI being removed at block 1010*f*. To facilitate clarity for the reader, FIG. 10B depicts example OPI value distributions. If the expert distribution for the OPI (e.g., "focus") was the distribution 1015*a* and the nonexpert distribution was the distribution 1015*b*, the OPI may be a poor vehicle for distinguishing experts and nonexperts and removed from the set. In contrast, if the expert distribution for the OPI (e.g., "duration of camera movement") was the distribution 1015*c* and the nonexpert distribution was the distribution 1015*d*, the OPI may be a good vehicle for distinguishing experts and nonexperts and retained in the set. Once all the OPIs have been considered at block 1010*a*, the final set of retained OPIs (e.g., the sub-corpus 950*d*) may be output at block 1010*g*.

One will appreciate a variety of mechanisms for assessing quantitative determinations of "similarity" between the distributions. For example, some embodiments may compare the mean and variance of the distributions directly, perform a T-test, asses p-values, etc. Non-parametric tests, such as the Mann-Whitney U test, which do not assume a normal distribution, may be especially useful for working with imbalanced data, as may be the case with OPI value distributions considered here. One will appreciate that various libraries exist for performing many of these tests, including the Mann-Whitney U tests. For example, the SciPY™ library provides the scipy.stats.mannwhitneyu function. An example reduction to practice using this function and identifying distributions with U statistic p-values less than 0.05 (e.g., at block 1010*d*) as "dissimilar" was found to produce good results. Some embodiments may also apply a family-wise error correction such as Bonferroni, Bonferroni-Holm, to reduce false conclusions (e.g., Bonferroni may reduce false positives at the cost of potentially increasing false negatives).

OPI Selection—Example MOPM OPI Filtering Process

For clarity, FIG. 10C is a flow diagram illustrating an example process 1005 for performing OPI selection using an MOPM filter, e.g., as may be used in accordance with RFE. Specifically, at block 1005*a*, a processing system may partition the expert/nonexpert annotated data 970*a* for all the initial set of OPI values 970*b* into a training subset and a validation subset. At block 1005*b*, the processing system may train a machine learning model (e.g., a logistic regression classifier model, an SVM model, etc.) upon this training set of OPI data to recognize OPI values associated with expert and nonexpert surgeons. At block 1005*c*, the processing system may validate the model using the validation subset. At block 1005*d*, the processing system may determine the ordering of OPIs based upon their importance in affecting a correct classification during validation. For example, each of the initial OPIs may be selectively removed, the model performance reconsidered, and those OPI removals precipitating greater variance in the output considered as more important. One will appreciate that some machine learning models, e.g. random forests, may provide importance scores as part of their processing (e.g., indicating how much accuracy decreases when an OPI is excluded). After identifying the importance ordering of the OPIs, the system may prune out the less important OPIs at blocks 1005*f* through 1005*m* (though various embodiments may forego these operations to simply select the most important OPIs over a threshold).

Specifically, at block 1005*e*, a subset size counter CNTS may be initialized to 1 (one will appreciate that the usage of a counter here is merely to facilitate understanding, and that equivalent functionality may readily be implemented in a variety of manners). This counter will track how many of the S OPIs from set 970*b* (in order of importance as determined at block 1005*d*) are to be considered. Accordingly, the number of OPIs may be increased at blocks 1005*f* and 1005*g* until all S of the most important OPIs (as determined at block 1005*d*) have been considered at block 1005*f*.

At each iteration, the CNTS most important OPIs at block 1005*g* may be considered and used to train a machine learning model at block 1005*h*. The system may then validate the trained model at block 1005*i* (e.g., where the raw data and divisions are the same as those at block 1005*a*). The effectiveness of this validation may be used as an estimate of the selected set of OPIs' suitability. Accordingly, the results, e.g. the model accuracy at validation, may be recorded at block 1005*j*. CNTS may be incremented at block 1005*k* and additional iterations performed.

Once all the desired sets of OPIs have been assessed via validation at block 1005*i*, the system may determine the performance profile for each set selection at block 1005*l*. The system may then select a final OPI set, e.g., the smallest set achieving acceptable, or the best, validation results, at block 1005*m*.

One will appreciate that many statistical packages may readily facilitate application of SOSDA, MOSDA, or MOPM filters. For example, RFE may be implemented using the "sklearn.feature_selection.RFE" class of the Scikit-learn™ library. The following code line listing C1, used in an example reduction to practice of an embodiment, was found to produce good results for this purpose.

$$rfe = RFE(\text{estimator} = SVC(\text{kernel} = \text{"linear"}), \text{step} = 1) \qquad (C1)$$

Again, while an SVM was used in the example of code listing C1, one will appreciate that RFE may also be used with other models, e.g., random forests, logistic regression classifiers, etc.

Example Skill Model Training Process with OPI Filtering

Figure 11B:
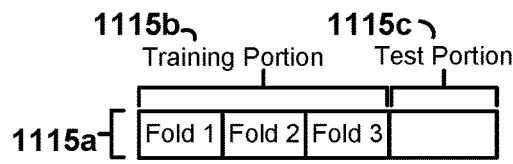
FIG. 11B is an example training dataset breakdown as may be applied when training in accordance with the process of FIG. 11A in some embodiments.

FIG. 11A is a flow diagram illustrating various operations in an example process 1100 for evaluating skill (or task) model configurations and OPI selections and to produce an expertise model (e.g., a skill model or task model), as may be implemented in some embodiments. In general, process 1100 may facilitate parameter selection for an expertise machine learning model classifier by integrating OPI selection with cross-validation operations. One will appreciate that cross validation is a method for iteratively training multiple model configurations so as to achieve a more robust model configuration than may be produced by training upon all or only a portion of the available data. Specifically, for reference and clarity, with reference to the example training data 1115*a* of FIG. 11B, the training data 1115*a* may be in the format of the selected features and annotated as discussed elsewhere herein (e.g., raw data values or OPI values annotated as being associated with an expert or nonexpert). This data may be divided into a training portion 1115*b* and a test portion 1115*c* (in some embodiments, test portion 1115*c* may be omitted and all available training data used as training portion 1115*b*). Training portion 1115*b* may itself be used to determine each of the models' hyperparameters and to validate the models, while the test portion 1115*c* may be withheld to provide final validation assessment of the generated models or a final model derived from the generated models. To this end, training portion 1115*b* may itself be divided into "folds" of roughly equal groupings of data (here three such folds are shown). At each training iteration, a version of the model's hyperparameters may be determined by training the model with some or all of the folds from training portion 1115*b* (e.g., a first trained model may be produced using Fold 2 and Fold 3, and Fold 1 used to validate the model; the second model may be trained on Folds 1 and 3, and Fold 2 used for validation, etc.). Each of the produced models and their validation results may then be analyzed to assess the effectiveness of the selected model parameters (e.g., a choice of layers in a neural network, a choice of kernel in an SVM, etc.). The most preferred parameters may then be applied to a new model and the model trained, e.g., on the entirety of the data 1115*b* and assessed using the distinct, reserved test portion 1115*c*.

Process 1100 may be used to produce multiple such intermediate models with validation results, and if desired, a final model if the parameters produce satisfactory results, in an analogous fashion. As discussed with respect to FIG. 9A, an expert selected subset of the OPI corpus (or the entire OPI corpus) may be received at block 1190. Training data (i.e., expert/nonexpert annotated raw data values or OPI values) may also be provided. This data may be allocated into training (corresponding to portion 1115*b*) and testing portions (corresponding to portion 1115*c*) at block 1186. As mentioned, the training portion may itself be divided into a desired number of folds, from which a desired number T2 of selections may be drawn in each iteration (e.g., T2=5). For example, a first selection may train on Folds 1 and 2, validating on Fold 3, the second selection may train on Folds 2 and 3, validating upon 1, etc. Thus, at block 1105, an outer counter Cnt2 may be initialized to 1 and used to iterate over the fold selections at block 1187 (again, one will appreciate that the usage of a counter here is merely to facilitate understanding and that equivalent functionality may readily be implemented in a variety of manners).

For each considered selection of folds, at block 1110 the system may determine a first OPI subset using a SOSDA or MOSDA OPI filtering method, e.g., filtering with the Mann-Whitney U test. For clarity, one will appreciate that the raw data referenced by the OPI values of the SOSDA or MOSDA OPI filtering of each performance of block 1110 is that of the folds from the current selection from block 1187 (e.g., all of the folds in the selection, though some embodiments may employ less than all the folds). Once a first set of OPIs have been selected via the SOSDA or MOSDA filter at block 1110, the system may seek to generate an additional OPI subset via an MOPM filter at block 1145. As the MOPM filter may employ its own machine learning model, a looping inner cross-validation approach may be desirable here as well. Specifically, the current fold selection from block 1187 (e.g., both the folds allocated for training and those for validation) may itself be divided into subfolds and a T1 desired number of iterative subfold selections considered via an inner counter Cnt1 as indicated by blocks 1120, 1125, 1188. While Cnt1 remains less than a first threshold T1 (e.g., the desired number of subfold selections to be considered) at block 1120, Cnt1 may be incremented at block 1125.

Here, however, rather than refer to the "actual" OPI value distributions from the original data received at block 1190 (as was the case for the SOSDA or MOSDA filter at block 1110), each OPI selection at block 1145 may instead be determined based upon a synthetic dataset created via the operations of blocks 1130, 1135, 1140 (referred to collectively as "Intermediate Synthetic Dataset" generation operations 1195*a*).

Figure 15:
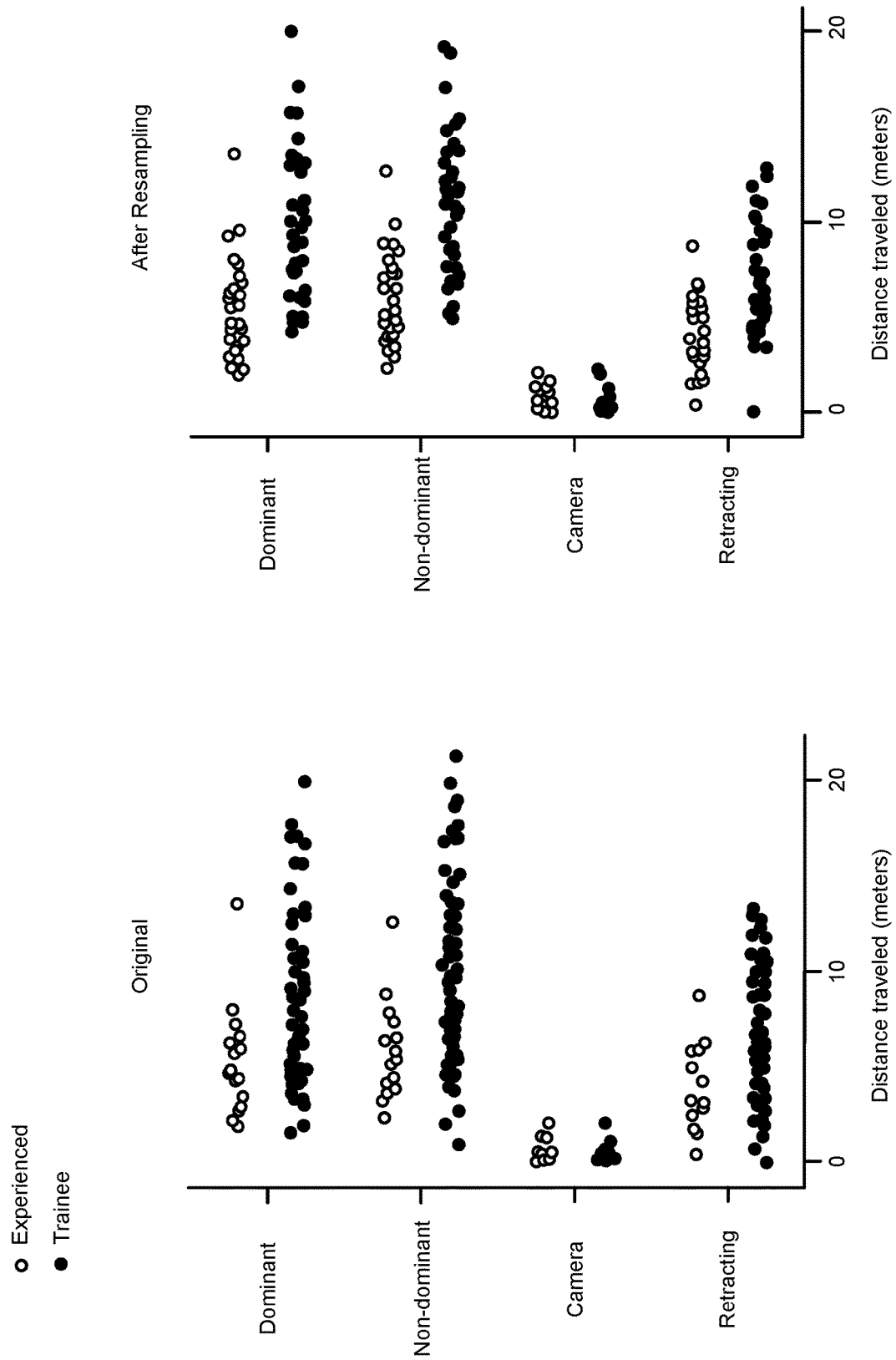
FIG. 15 is a pair of schematic dot-plots indicating economy of motion values for four instruments in a Uterine Horn task before and after application of resampling in an example implementation of an embodiment.

That is, for each of the T1 iterations, up sampling, e.g., via SMOTE, may be applied at block 1130 to the expert annotated portion of the subfold selection, e.g., to up-sample the underrepresented expert data. While the expert data may be up sampled, the nonexpert data may conversely be down sampled. For example, down sampling may proceed in two stages. First, at block 1135, the Neighborhood Cleaning Rule (NCR), a down sampling method, may be used to reduce noisy data of the larger nonexpert group by removing outlier points far from other nonexpert samples (effectively cleaning noisy samples). NCR may be implemented with a library in some embodiments, e.g., the function "imblearn.under_sampling.NeighbourhoodCleaningRule" of the library Imblearn™ Second, at block 1140, the processing system may randomly down sample the remaining nonexpert values not removed by NCR. This may have the effect of balancing the expert and nonexpert groups to an approximate 50/50 ratio. As the NCR method may not down sample to a specific ratio, block 1140 may compensate for NCR's behavior. When the class sizes are small, this combination of blocks 1135 and 1140 may perform better than random down sampling alone, though some embodiments may instead use only block 1140 and remove block 1135, or vice versa. An example of OPI data before and after the down sampling process of blocks 1130, 1135, and 1140 is shown in FIG. 15.

For clarity, one will appreciate that these operations may be consolidated via various libraries, e.g., via Scikit-learn™ and Imblearn™ as shown in the example code line listings C2 through C8:

$sm$=SMOTE(sampling_strategy=upratio,$k$_neighbors=3)     (C2)

$ncr$=NeighbourhoodCleaningRule( )     (C3)

$rdn$=RandomUnderSampler( )     (C4)

scale=StandardScaler( )     (C5)

$clf$=LogisticRegression(max_iter=500, solver='liblinear')     (C6)

pipe=Pipeline([('smote_upsample',$sm$),('$ncr$_downsample',$ncr$),('$rdn$_downsample',$rdn$),('scale', scale),('$clf$',$clf$)])     (C7)

rfecv=RFECV(pipe,step=1,$cv$=StratifiedKFold(5), scoring='accuracy', importance_getter='named_steps.$clf$.coef_')     (C8)

where "upratio" may be, e.g., the ratio for SMOTE expressed as 3× up sample. Again, one will appreciate that these lines are but one example and other embodiments may employ different numbers of folds or models.

As mentioned, at block 1145, an MOPM filter, e.g., RFE as described herein, may be applied to the synthetic dataset produced by the operations 1195*a* to determine a second subset of OPIs. The MOPM filter, such as RFE, may determine a set of OPIs to use for the skill or task which meet both a maximum cross-validation (CV) score criteria and a minimum feature number criteria (accordingly, if two differently sized sets of OPIs are found to perform the same, then the filter may select the smaller of the two sets) at block 1145 (e.g., as discussed with respect to FIG. 10C). For clarity, the SOSDA or MOSDA filter at block 1110 may serve as a check for any OPIs omitted at block 1145 that may be worth including (i.e., by taking the logical OR at block 1150, though as discussed elsewhere herein, the sets may be joined or compared in other manners). Again, while block 1110 is shown here occurring before the inner cross validation loop for clarity, one will appreciate that the order could be reversed in some embodiments, or the two pursued in parallel.

When Cnt1 surpasses the threshold T1 at block 1120 (i.e., all the subfold selections have been considered), then at block 1150, the system may take the logical OR of the subset produced at block 1110 and each of the subsets produced at each iteration of block 1145. For example, where T1=5, block 1150 may combine six OPI corpus sets: the set produced at block 1110 and the five sets produced at the five iterations through block 1145. However, one will appreciate variations, as various embodiments may instead cross validate the results from the inner loop, producing a single most suitable set based upon each of the sets produced by block 1145. In these variations, naturally, only two sets would be combined at block 1150 (the optimal set from the inner cross-validation of the sets generated at block 1145 and the set generated at block 1110). The combined corpus of block 1150 may then be used to train a machine learning model for the current fold selection (selected at block 1187) of the T2 fold selections.

Specifically, at block 1155, the outer counter Cnt2 may be incremented. As models trained upon balanced data are more likely to provide more robust inference results, another "training" synthetic dataset may again be generated, but this time from the entire selection of training data fold(s) from block 1187. This training synthetic dataset may be generated using the operations 1195b, e.g., a sequence of SMOTE, NCR, and random down sampling applied at each of blocks 1160, 1165, and 1170, respectively (e.g., in the same manner as previously discussed with respect to blocks 1130, 1135, and 1140, though upon the selections of folds rather than a selection of subfolds). As discussed above regarding the inner validation loop, here, some embodiments may likewise omit various of blocks 1160, 1165, and 1170. However, retaining the blocks may be beneficial as, again, block 1170 may compensate for NCR's behavior.

At block 1175, the system may train an experience classifier (a task or skill model) with the data from the synthetic training dataset corresponding to the OPI values of the merged corpus from block 1150. Again, for clarity, one will appreciate that these operations may be consolidated via various libraries, e.g., via Scikit-learn™ and Imblearn™ as shown in code line listings C9 through C14:

sm=SMOTE(sampling_strategy=upratio,k_neighbors=3)    (C9)

ncr=NeighbourhoodCleaningRule( )    (C10)

rdn=RandomUnderSampler( )    (C11)

scale=StandardScaler( )    (C12)

fclf=LogisticRegression(penalty='l2', class_weight='balanced',solver='liblinear', max_iter=500)    (C13)

pipe=Pipeline([('smote_upsample',sm),('ncr_downsample',ncr),('rdn_downsample',rdn),('scale',scale),('clf',fclf)]    (C14)

where, again, "upratio" may be, e.g., the ratio for SMOTE expressed as 3× up sample. Again, one will appreciate that these lines are but one example and other embodiments may employ different numbers of folds or models.

The system may then assess the classifier's effectiveness at block 1180. One will appreciate that unlike the training of the model, which employed the training synthetic dataset, validation of the model at block 1180 may use the current fold selection's data in its original, unbalanced form. This may ensure that the model's performance is being assessed relative to its operation upon real-world data (e.g., during inference, the input data will not be synthetically balanced) as synthetically increasing the sample size of experts may produce inaccurate performance metrics.

Again, for clarity, each iteration of blocks 1175 and 1180 may produce a new trained model and a new corresponding assessment of that model. For example, in some embodiments, at block 1175, the training data for the filtered OPIs (from block 1150) is used to train a logistic regression classifier (or other suitable model, e.g., as discussed herein), and so a plurality of such trained classifiers may be produced with each iteration (and a corresponding assessment made at block 1180). From these assessments, one may infer the model configurations and OPI selections which produce favorable results. For example, the "best" model configuration and OPI selection may then be used for inference, or used to guide creation of a new model with similar, or the same, parameters. In some embodiments, performance may be measured at block 1180 using two methods: a balanced accuracy score (average of recall between both groups, e.g., ROC-AUC, F1 score, Jaccard, etc.) to account for the large differences in sample sizes and Matthews Correlation Coefficient (MCC), which is a balanced quality measure of classification, ranging from −1 (poor prediction) to 1 (perfect prediction). At block 1185, the outer loop may be performed again if Cnt2 has not yet surpassed the outer threshold T2.

One may run the process 1100 multiple times, save for block 1189, for multiple choices of parameters (e.g., varying the initial OPI selection at block 1190, varying choice of model and configuration parameters at block 1175, choice of MOPM and SOSDA/MOSDA, etc.) to evaluate the choices' relative merit. Once parameters producing preferred results have been identified, then, as indicated at block 1189, a final model may be trained using the parameters, but using instead, e.g., the entirety of the training portion 1115b to train the model, and reserved portion 1115c to test (or, e.g., the model may be trained on all the available data, without testing).

A smaller number of cross-validation folds (e.g., T1=5, T2=5) may be performed where the sample size is limited. This may prevent overestimating of the model's performance because the same sets of data were reused numerous times. When more expert data is available, more folds (e.g., T1=10, 20, etc.) may be used. Note that down (or up) sampling may be deliberately avoided in some embodiments at block 1110 as doing so may create false positives. Indeed, Mann-Whitney may be able to handle asymmetric datasets well. This test may use conservative multiple-testing corrections for that reason as well in some embodiments, to provide more stringent filtering (e.g., Bonferroni, Bonferroni-Holm, etc.).

Thus, combining SOSDA/MOSDA and MOPM approaches in this manner may provide synergies not achieved with either approach in isolation (though, again, as mentioned, some embodiments may apply one or more SOSDA/MOSDA or one or more MOPM filters alone or together). Rather than simply identifying the minimum effective number of OPIs for distinguishing experts and nonexperts, employing two or more of SOSDA, MOSDA, or MOPM approaches may also help capture OPIs, albeit larger than the minimum, that intuitively distinguish expert/nonexpert groups and also work well for modeling. Such varied OPI capture may itself influence the training of models during cross validation. These combined approaches may be especially effective when employed in conjunction with the resampling techniques disclosed herein (e.g., SMOTE, random down sampling, NCR, etc.).

Example Score Generation

In some embodiments, direct output from the skill model may be used to provide feedback to a surgeon. For example, knowing that the model considers the surgeon's performance to be 80% likely to be that of an expert, may be a meaningful statement. However, the nature of some models, e.g., logistic regression classifiers, support vector machines, etc. may not provide outputs which directly map to a skill level.

Figure 12A:
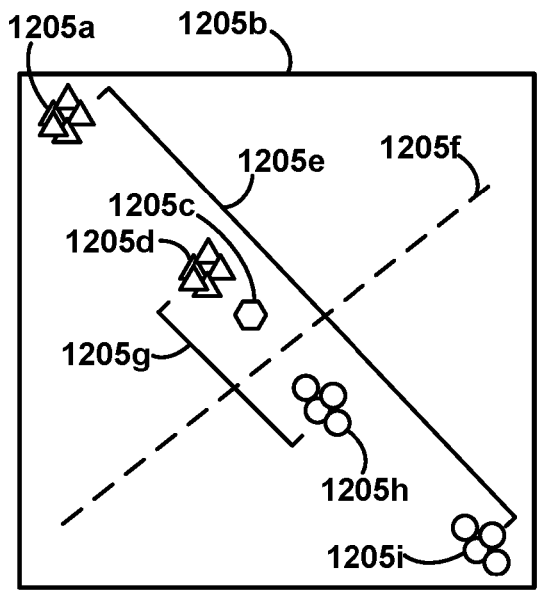
FIG. 12A is a schematic plot of training feature vectors and an inference feature vector in an abstract feature space as may occur in some embodiments.

For example, as shown in the abstract feature space 1205b of FIG. 12A, in a first situation, a group 1205a of expert OPI values may be located a great distance 1205e in the feature space from a group 1205i of nonexpert OPI values. Similarly, in a second situation, a group 1205d of expert OPI values may be located a much shorter distance 1205g in the feature space from a group 1205h of nonexpert OPI values. In both situations, several machine learning models may determine a separator 1205f. Where the model is an SVM, the distance from the hyperplane separator to a new feature point 1205c may be used as a proxy for the probability of the point being in a class (one will appreciate that many binary classifiers, such as some SVMs, may typically only output a predicted class without a percentage prediction). However, distance in feature space is not intuitively analogous to one's performance as a surgeon. Similarly, where separator 1205f is the separating plane of a logistic regression classifier, distance from the separator 1205f may correspond to a value of the sigmoid function and the corresponding output probability. Intuitively, one would expect the new feature 1205c to receive a different probability assignment in the first instance of groups (i.e., 1205a and 1205i) as compared to the second instance of groups (i.e., 1205d and 1205h). However, one can imagine situations where the nature of the sigmoid function precipitates similar or the same probability value for the feature 1205c in each instance. Similarly, the sigmoid function may plateau and provide similar probabilities for new features a great distance from the separator. Accordingly, such a sigmoid mapping may not have an intuitive correspondence to a skill level. While examples have been given here for SVMs and logistic regression classifiers, one can imagine similar discontinuities between scores and prediction probabilities based upon a feature space for other models.

Figure 12B:
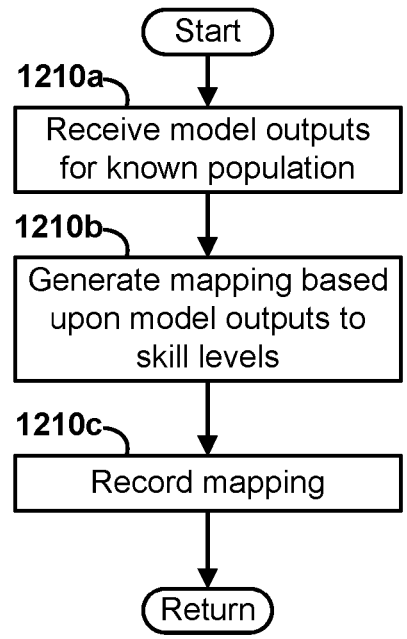
FIG. 12B is an flow diagram illustrating various operations in an example process for determining a score mapping from model outputs based upon a reference population as may be performed in some embodiments.

To compensate for the discontinuity between prediction probabilities from a model output and a score for a skill that may arise, various embodiments contemplate a post-processing step (e.g., at post-processing module 710f) to map model probabilities to surgeon skill levels. For example, FIG. 12B is an flow diagram illustrating a process for determining a score mapping from model outputs based upon a reference population as may be performed in some embodiments. At block 1210a, the component may review outputs from a skill model for a known population of surgeons, e.g., the training data used to train the model, which may be annotated to indicate expert and nonexpert values (though a different, randomized population may be used instead). At block 1210b, the component may generate a mapping between the model outputs and the surgeon skill level. At block 1210c, the system may record the mapping, e.g., for future use when considering new subject data. For example, when future results are produced during inference, post-processing module 710f may index the model outputs, interpolating if necessary, based upon the mappings recorded at block 1210c.

Figure 12C:
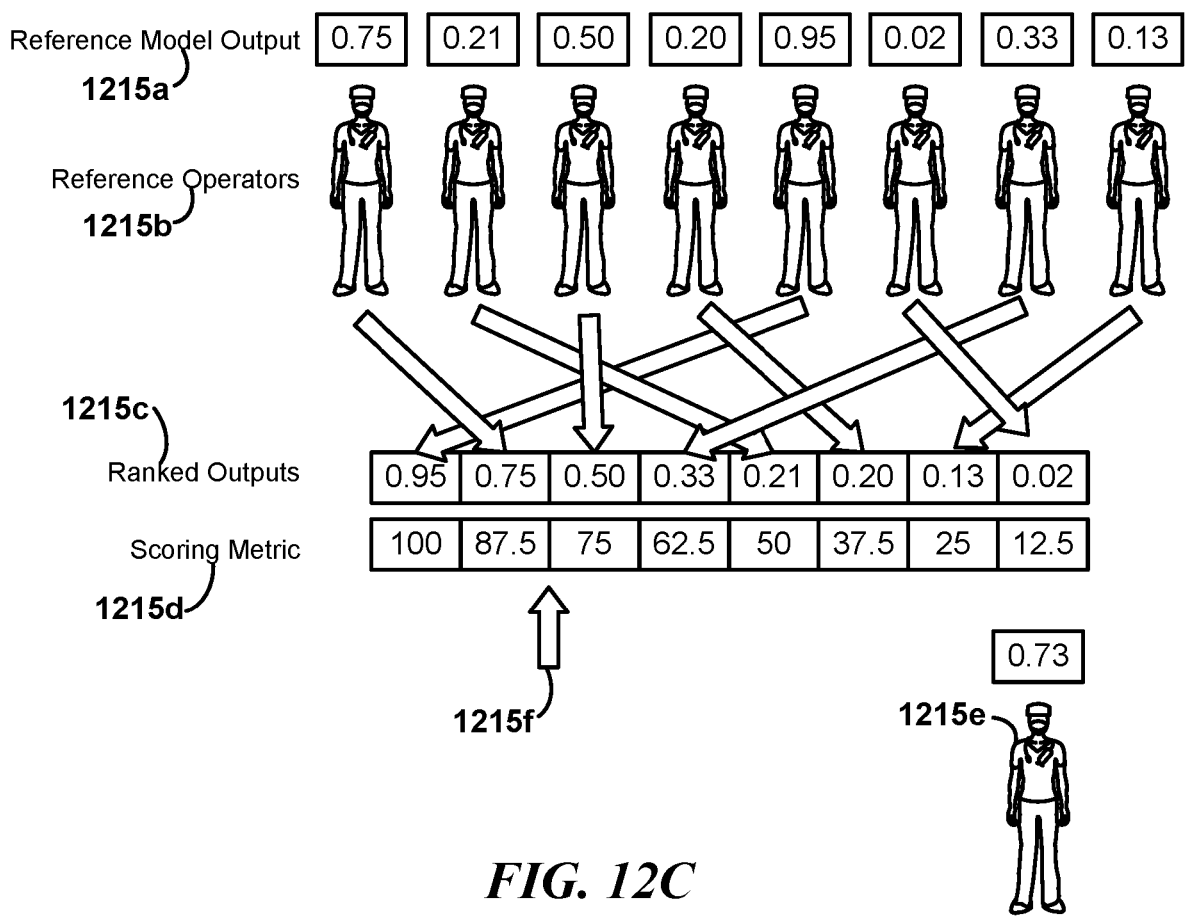
FIG. 12C is a schematic diagram illustrating an example application of a reference population-based score determination as may be performed in some embodiments.

To clarify the process of FIG. 12B, consider a hypothetical example population of reference surgeons 1215b in FIG. 12C. Each of these surgeons may have provided surgical performances captured in raw data, which were used to generate corresponding OPI values, passed through the skill (or task) model, which in turn produced corresponding probabilities of being an expert 1215a. In this example, the mapping at block 1210b may order the model outputs 1215a into an order 1215c of decreasing magnitude, and then map a linear scoring metric 1215d to the values as shown (though a linear metric is used here to facilitate understanding, one will appreciate that a bell curve or mapping corresponding to the proportion of experts and nonexperts in the reference population 1215b may be used instead in some embodiments). Values produced during inference falling between the ranked outputs may generate a corresponding value from the scoring metric. For example, if a new surgeon 1215e's performance was applied to the same skill model, it may produce a probability 0.73 of being an expert. As this probability corresponds to a position 1215f in the ranked order 1215c, the final score for the skill may be output based on the corresponding position in the metric 1215d, e.g., the average of 87.5 and 75 (81.25), the average scaled by the linear position between the model output boundary values (i.e. $(0.73-0.5)/(0.75-0.5)=0.92$ and $0.92*(87.5-75)+75=86.5$), etc.

The above-described approach may be especially effective where the probability distributions of the model outputs are well separated in the ranking data. Where there is a smaller variance in groups of probabilities in the data, some embodiments may employ other approaches. For instance, some embodiments may estimate kernel density to find local maxima for groupings of probabilities and associate those maxima with a rank or set of ranks (e.g., in a single maxima example, the majority of samples may score 50%). Embodiments may estimate the standard deviation of such distributions to determine when a sample has deviated far enough to constitute a significant change in rank. Absent such estimation, a very tiny change in the machine learning output may precipitate an undesirably wide change in the final score.

By estimating the mixture of distributions, embodiments may associate clumps of rankings to one another, rendering scores more robust to variations in the model prediction as well as making more intuitive sense to a human interpreter. Jenk's natural break optimization, analogous to application of a one-dimensional K-means algorithm, may similarly be applied in some embodiments.

Example Score Presentation and Maintenance

Figure 13A:
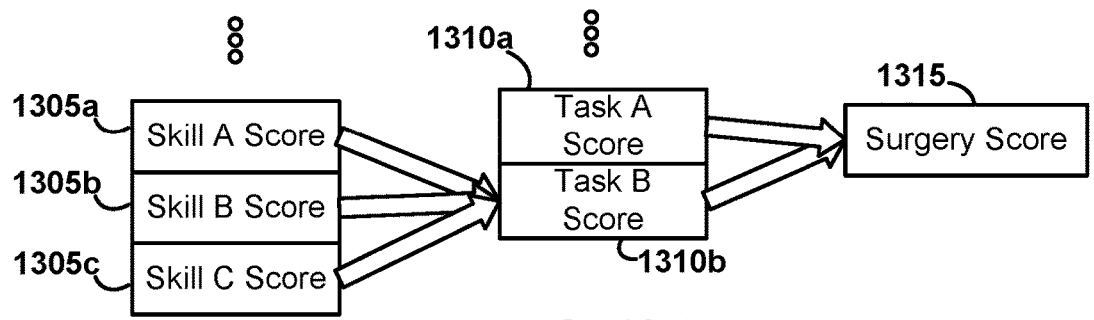
FIG. 13A is a schematic block diagram illustrating a hierarchical input and output topology as may be used for score generation in some embodiments.

One will appreciate a plurality of manners in which the above results may be presented to a surgeon so as to provide feedback regarding the surgeon's performance. FIG. 13A is a schematic block diagram illustrating a general hierarchical input and output topology as may be used for score generation in some embodiments. As discussed, each skill model's output (or where a monolithic model is used, the skill-specific outputs of the model) may be post-processed to generate a skill score. The skill scores may then be associated with the corresponding task from whose raw data the skill scores were derived. For example, a Task B may depend on Skills A, B, C. Thus, data of the surgeon performing a Task B may be used to generate scores 1305a, 1305b, 1305c. These scores may themselves be combined to form a score 1310b for the surgeon's performance of the task (alternatively, or in a complementary fashion, a separately trained task model as discussed herein may be used to produce a score and the final task score may then be, e.g., the average of this task model determined score and the cumulative skill determined score 1310b). For example, the scores may be weighted by their relative importance to the task, summed, and normalized to form the score 1310b. Such scores from all the tasks, e.g., 1310a, 1310b, etc., may likewise be combined to form a score 1315 for the entire surgery. For example, the combined score 1315 may be the average of the task scores, weighted by the task score's relative importance to (and/or duration in) the surgery.

Figure 13B:
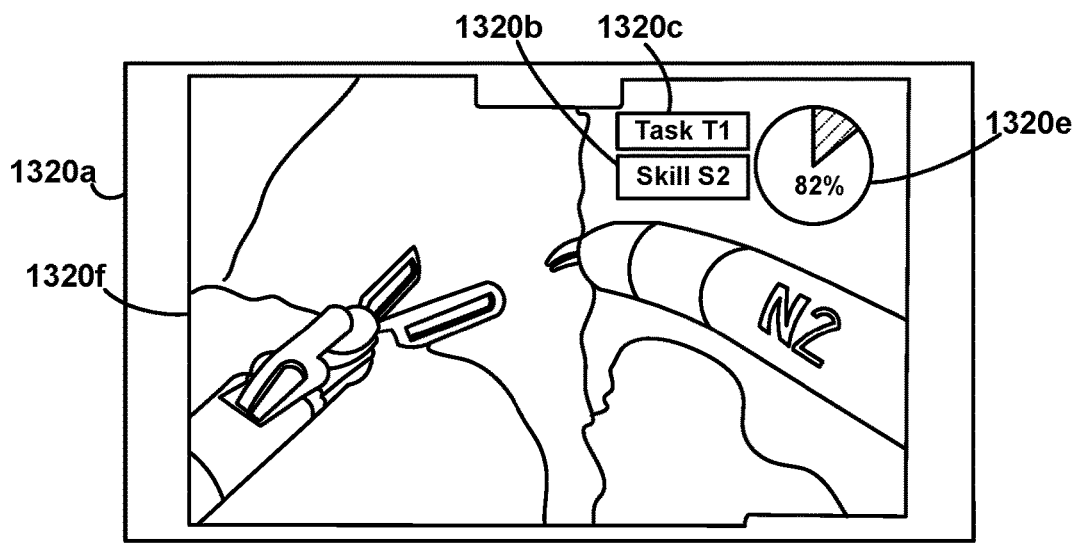
FIG. 13B is a schematic representation of a graphical user interface screenshot depicting a performance metric overlay upon a video of a surgeon's performance as may be implemented in some embodiments.

The scores of FIG. 13A may allow surgeons to receive both granular and holistic feedback and to track their progress at varying levels of detail over time. As one example of providing such feedback, FIG. 13B is a schematic representation of a graphical user interface screenshot 1320a, depicting a performance metric overlay upon a video of a surgeon's performance. Specifically, as the recorded video 1320f plays of the surgeon's performance, an overlay may include an icon, e.g., a pie chart shown in icon 1320e, indicating the surgeon's score for the portion of the surgery depicted (e.g., in accordance with the windowed application of the skill model as described with respect to FIG. 7C). For example, a portion of the pie chart may be shaded in a different color in accordance with the percentage value of the corresponding score. Icons, such as icons 1320b and 1320c, may allow the user to select which of the scores they wish to view. Where segment-by-segment scores are available, as was discussed with respect to FIGS. 7C and 7D, the value of the score shown in icon 1320e may vary over the course of the video's presentation (similarly icons 1320b and 1320c may change as the video depicts new tasks and corresponding skills). Alternatively, in some embodiments, icon 1320e may reflect the final score value determined based on data available up until to the presently depicted moment in the video. In some embodiments, plots such as that shown in FIG. 7D may be overlaid for one or more of the skills and an icon, e.g., an arrow, used to show where the currently shown frame of video 1320f corresponds to the plot. One will appreciate that such scored feedback may extend beyond just surgical scores, including manual review results (e.g., the Global Evaluative Assessment of Robotic Skills as described by Goh, et al. in Global evaluative assessment of robotic skills: validation of a clinical assessment tool to measure robotic surgical skills. The Journal of Urology, 187(1):247-252, 2012), grouping skill score results into other expertise categories (indicating a practitioner's relative performance to other practitioners with a commensurate number of procedures), searching the data for potential skill groupings (e.g., performing unsupervised methods/clustering upon populations of skill or task score results), etc.

Example Ongoing Training and Score Mapping Updates

Figure 13C:
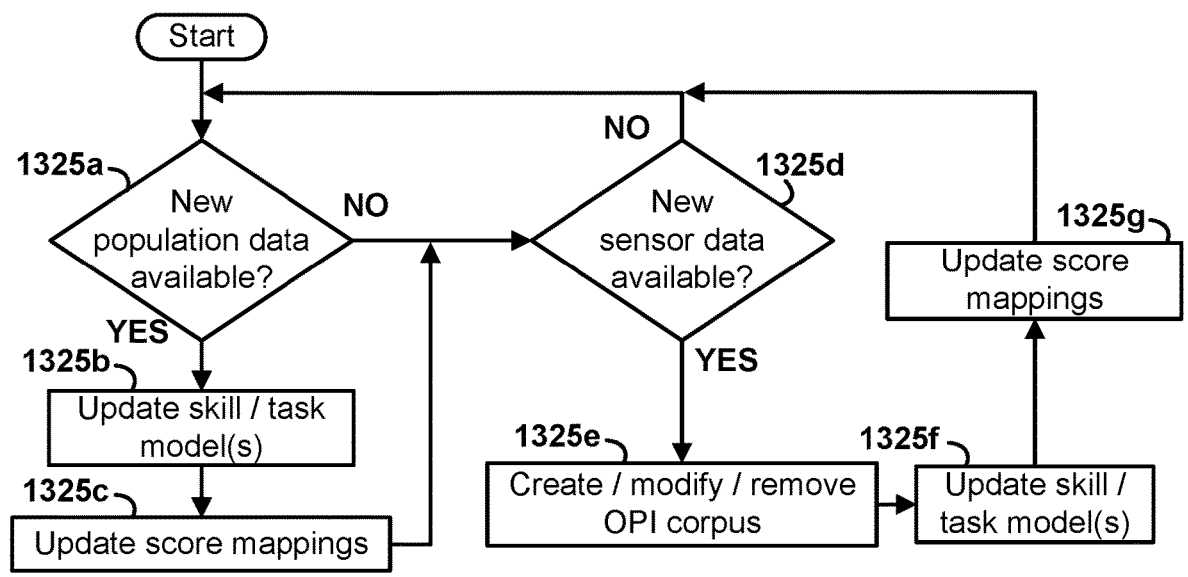
FIG. 13C is a flow diagram illustrating various operations in an example updating process for a skill assessment system as may be implemented in some embodiments.

FIG. 13C is a flow diagram illustrating various operations in an example updating process for a skill assessment system (e.g., performance assessment system 625) as may be implemented in some embodiments. Specifically, as more annotated data becomes available at block 1325a, the system may update the skill (and/or task) models accordingly at block 1325b (e.g., applying online learning methods to neural network skill models, retraining a logistic regression classifier with the new population data included, etc.). The system may also update the score mappings at block 1325c, e.g., as discussed above with respect to FIGS. 12B and 12C.

Similarly, as new sensors become available in the surgical theater at block 1325d, various embodiments may modify the OPI corpus at block 1325e. As this may make available new feature vectors, the skill (and/or task) models may be retrained or updated at block 1325f, as well as update the corresponding score mappings at block 1325g.

Example Reduction to Practice with Results

Implementations of various embodiments have demonstrated the efficacy of the systems and methods discussed herein. FIG. 14A is a bar plot of types and amounts of data samples available for use in an example reduction to practice of an embodiment. As indicated, annotated data was acquired for "experts", "trainees", and "training specialists" for each of the skills associated with various tasks: "2-Hand Suture", "1-Hand Suture", "Running Suture", "Uterine Horn", "Suspensory Ligaments", and "Rectal Artery/Vein 1." Trainees were surgeons that do not have robotic surgery experience and were accordingly grouped as "nonexperts". Expert surgeons performed >1000 da Vinci™ robotic procedures. Training specialists were non-surgeon, expert operators that were experienced in the assessed training task exercises with ~300-600 hours of practice on or use of robotic platforms. Accordingly, training specialists were likewise treated as "experts." There were 7-9 tasks from the expert surgeons and training specialists (the "experts") dataset and 93-122 tasks from the trainee group (the "nonexperts"). Given the large number of trainee participants, 5 trainees were randomly selected per task to be held back from the training process, leaving 88-117 for feature selection. Each skill-task combination of mapped OPIs started with 4-20 OPIs and RFE reduced the OPI set to 1-18 OPIs. RFE for task models displayed high balanced accuracies that typically plateaued early. Mann Whitney testing with Bonferroni correction produced overlapping feature sets and added 0-11 OPIs to the final model.

The data for "trainees" and "training specialists" was grouped together to form "nonexpert" data while the "expert" data formed the "expert" data group. As discussed above and reflected in this real-world example, there was considerably more "nonexpert" than "expert" data. The data set was acquired from recording devices on da Vinci Xi™ and the da Vinci Si™ robotic surgical systems.

Six logistic regression classifiers were trained as task models and eighteen logistic regression classifiers were trained as skill models (the tasks as identified in FIG. 14B with corresponding skills associated with each task) in accordance with FIG. 11A. FIG. 14B is a table illustrating average cross-validation performance metrics, balanced accuracy and MCC for each of the skill-task and overall task logistic regression models (i.e., models trained upon OPIs for entire tasks rather than skills of tasks, as discussed herein) in the example reduction to practice of an embodiment. One will appreciate that accuracy here refers to a balanced accuracy score, e.g., as may be produced using the function sklearn.metrics.balanced_accuracy_score of the Scikit-learn™ library. MCC may similarly be produced using the Scikit-learn™ library function sklearn.metrics.matthews_corrcoef.

Figure 16:
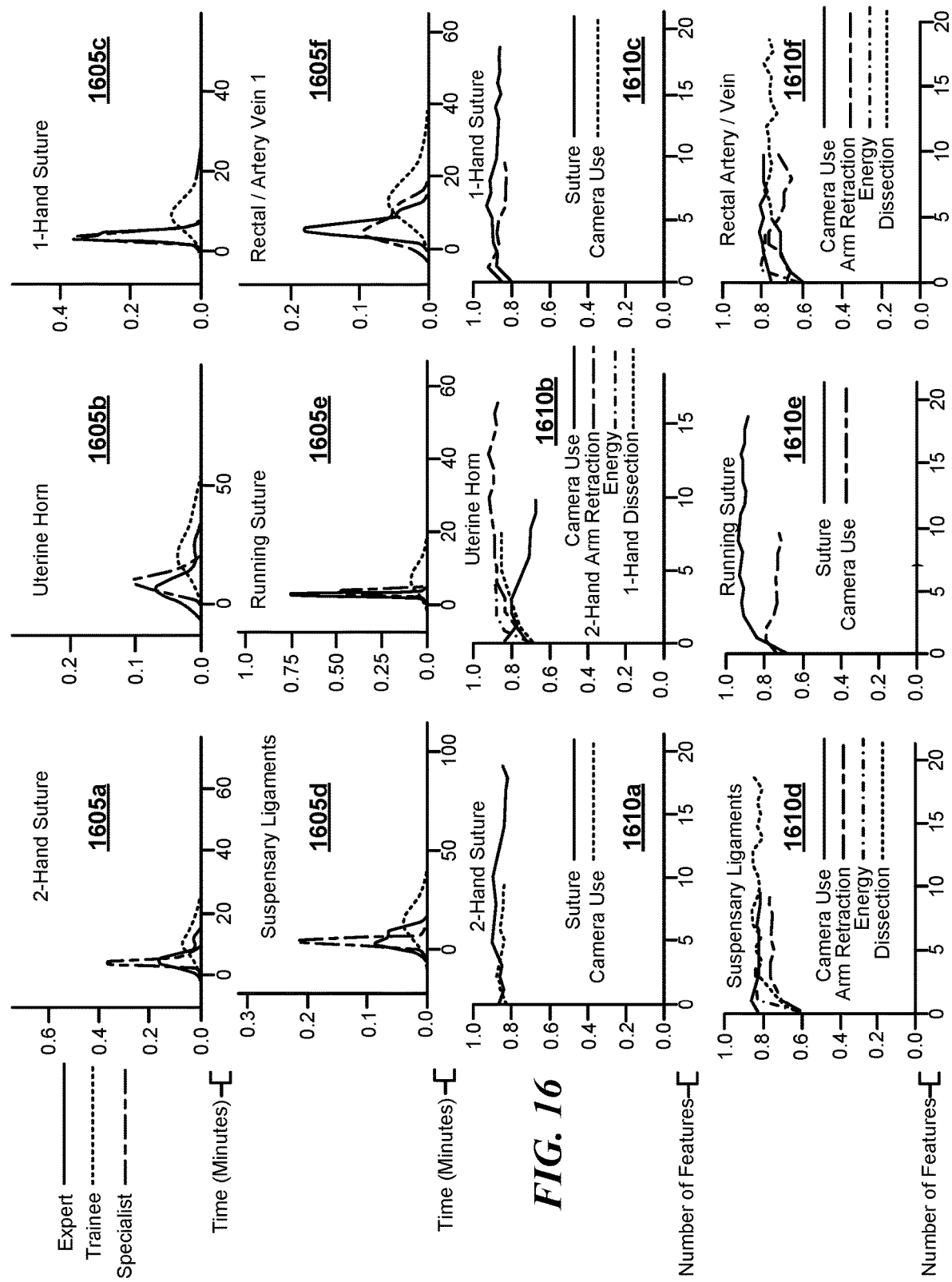
FIG. 16 is a collection of schematic line plots indicating a distribution of task durations by experience level in an example reduction to practice and cross-validated scores of varying number of OPIs per skill using Recursive Feature Elimination (RFE) in the example implementation of an embodiment.

FIG. 15 is a pair of schematic dot-plots indicating economy of motion OPI values for four instruments in a Uterine Horn task before and after application of resampling in an example reduction to practice as was discussed with respect to blocks 1130, 1135, and 1140 or blocks 1160, 1165, and 1170 of FIG. 11A. FIG. 16 is a collection of schematic line plots indicating a distribution of task durations by experience level in the example reduction to practice and cross-validated scores of varying number of OPIs per skill using RFE. Specifically, plots 1605a, 1605b, 1605c, 1605d, 1605e, and 1605f depict task duration of the different groups and plots 1610a, 1610b, 1610c, 1610d, 1610e, and 1610f depict RFE performance. As indicated, the lines in the RFE plots represent different skills. With respect to plots 1610a-f, the vertical axis is cross-validation balanced prediction accuracy for the model while the horizontal axis reflects number of OPIs used in the models for each of the skills indicated in the plot.

FIGS. 17, 18, 19, and 20 are tables listing an example collection of OPIs, some or all of which may be used in various embodiments, a description of each, and their relation to various skills and tasks. As regards robotic arms, "SCE" refers to the "surgeon console", "Cam" to the arm holding the camera, "D" the dominant arm of a robotic system, "N-D" to the non-dominant arm of the robotic system, and "Ret" refers to the retracting arm of the robot. As regards skills, "E" indicates "energy", "S" refers to "suture", "D" refers to "dissection", "CU" refers to "camera use", "AR" refers to "arm retraction", "1-HD" refers to "1-hand dissection", "2-HAR" refers to "2-hand arm retraction". As regards tasks, "SL" indicates the "Suspensory Ligaments" task, "2-HS" indicates the "2-Hand Suture" task, "1-HS" indicates the "1-Hand Suture" task, "RS" refers to the "Running Suture" task, "UH" to the "Uterine Horn" task, and "RAN" to the "Rectal ArteryNein" task.

Based upon this example implementation it became evident based upon the odds-ratio per OPI computed from the coefficients of the logistic regression models that surgeons may improve their energy skill by practicing reducing unnecessary energy activation (reduce total events), while applying energy more frequently in shorter time periods (increase frequency). Similarly, the results indicated that not only increasing the frequency of adjusting the camera to improve the surgeon's field of view, but also doing so at faster speeds, may improve their camera skill.

In this reduction to practice, for many of the skills only a small subset of OPIs (2-10) were required to achieve the highest model accuracies (80-95%) for estimating technical skills. Most of the skill-specific models had accuracies similar to models trained to predict expertise for the task as a whole (80-98%).

Computer System

Figure 21:
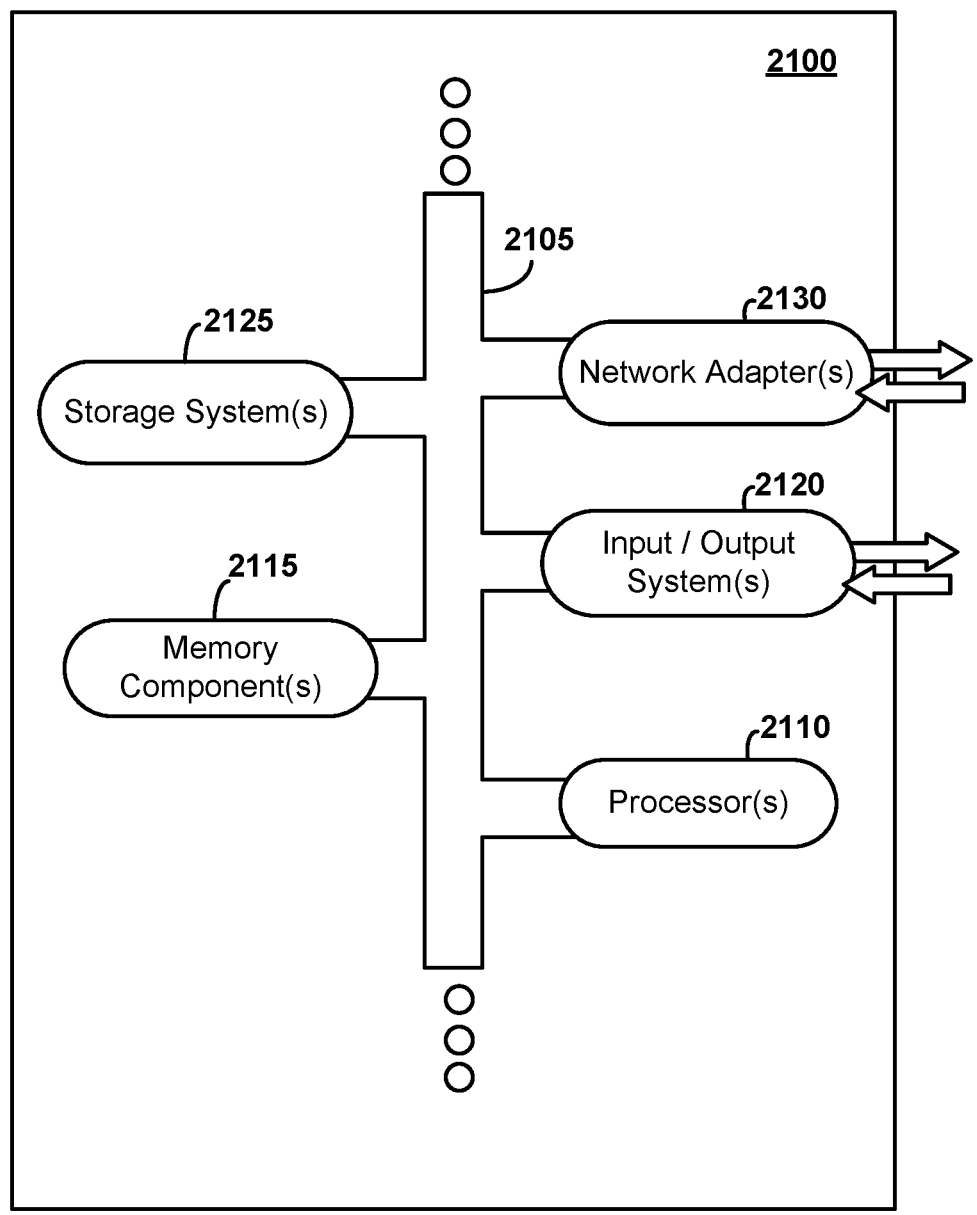
FIG. 21 is a block diagram of an example computer system as may be used in conjunction with some of the embodiments.

FIG. 21 is a block diagram of an example computer system as may be used in conjunction with some of the embodiments. The computing system 2100 may include an interconnect 2105, connecting several components, such as, e.g., one or more processors 2110, one or more memory components 2115, one or more input/output systems 2120, one or more storage systems 2125, one or more network adaptors 2130, etc. The interconnect 2105 may be, e.g., one or more bridges, traces, busses (e.g., an ISA, SCSI, PCI, I2C, Firewire bus, etc.), wires, adapters, or controllers.

The one or more processors 2110 may include, e.g., an Intel™ processor chip, a math coprocessor, a graphics processor, etc. The one or more memory components 2115 may include, e.g., a volatile memory (RAM, SRAM, DRAM, etc.), a non-volatile memory (EPROM, ROM, Flash memory, etc.), or similar devices. The one or more input/output devices 2120 may include, e.g., display devices, keyboards, pointing devices, touchscreen devices, etc. The one or more storage devices 2125 may include, e.g., cloud based storages, removable USB storage, disk drives, etc. In some systems memory components 2115 and storage devices 2125 may be the same components. Network adapters 2130 may include, e.g., wired network interfaces, wireless interfaces, Bluetooth™ adapters, line-of-sight interfaces, etc.

One will recognize that only some of the components, alternative components, or additional components than those depicted in FIG. 21 may be present in some embodiments. Similarly, the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 2130. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 2115 and one or more storage devices 2125 may be computer-readable storage media. In some embodiments, the one or more memory components 2115 or one or more storage devices 2125 may store instructions, which may perform or cause to be performed various of the operations discussed herein. In some embodiments, the instructions stored in memory 2115 can be implemented as software and/or firmware. These instructions may be used to perform operations on the one or more processors 2110 to carry out processes described herein. In some embodiments, such instructions may be provided to the one or more processors 2110 by downloading the instructions from another system, e.g., via network adapter 2130.

Remarks

The drawings and description herein are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only, and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner, may contain more or less information than shown, may be compressed and/or encrypted, etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference herein to "an embodiment" or "one embodiment" means that at least one embodiment of the disclosure includes a particular feature, structure, or characteristic described in connection with the embodiment. Thus, the phrase "in one embodiment" in various places herein is not necessarily referring to the same embodiment in each of those various places. Separate or alternative embodiments may not be mutually exclusive of other embodiments. One will recognize that various modifications may be made without deviating from the scope of the embodiments.

We claim:

1. A computer-implemented method for generating a score based upon surgical data, the method comprising:
    determining generating one or more metric values of a plurality of operational performance indicators (OPIs) from based at least upon surgical data;
    establishing identifying a data structure comprising a mapping of each of the plurality of OPIs to at least one skill of a plurality of skills;
    selecting, from the data structure comprising the mapping, one or more OPIs of the plurality of OPIs based at least on a skill from the plurality of skills;
    identifying one or more metric values of the selected one or more OPIs for the user; and
    generating a score for the skill of the user at least in part, by providing the one or more metric values for the selected one or more OPIs of the user as input to a machine learning model trained for the skill.

2. The computer-implemented method of claim 1, wherein generating the score comprises:
    providing the one or more metric values based upon the surgical data to the machine learning model implementation to generate a prediction; and
    mapping the prediction to the score.

3. The computer-implemented method of claim 2, wherein the prediction indicates whether the surgical data is more closely associated with a first classification or with a second classification.

4. The computer-implemented method of claim 3, wherein,
    the first classification and the second classification are associated with different surgeon skill levels, and wherein,
    the machine learning model implementation is configured to receive metric values corresponding to surgical data associated with a particular surgical task.

5. The computer-implemented method of claim 4, wherein the surgical data comprises patient-side kinematics data, operator-side kinematics data, visualization tool video data, and system events data.

6. The computer-implemented method of claim 2, wherein,
    determining the one or more metric values based upon the surgical data comprises providing the surgical data to a filtered corpus of metrics determined from annotated surgical data, wherein,
    generating the score comprises:
    inputting the metric values to the machine learning model implementation; and
    applying the output of the machine learning model implementation to a mapping of predictions to scores, and wherein,
    the machine learning model implementation is configured to receive metric values corresponding to the filtered corpus of metrics.

7. The computer-implemented method of claim 6, the method further comprising:
    presenting the score as one of several scores generated over the course of at least a portion of a surgeon's surgical performance.

8. A non-transitory computer-readable medium comprising instructions configured to cause a computer system to perform a method for generating a score based upon surgical data, the method comprising:
    determining generating one or more metric values of a plurality of operational performance indicators (OPIs) from based at least upon surgical data;
    establishing identifying a data structure comprising a mapping of each of the plurality of OPIs to at least one skill of a plurality of skills;
    selecting, from the data structure comprising the mapping, one or more OPIs of the plurality of OPIs based at least on a skill from the plurality of skills;
    identifying one or more metric values of the selected one or more OPIs for the user; and
    generating a score for the skill of the user at least in part, by providing the one or more metric values for the selected one or more OPIs of the user as input to a machine learning model trained for the skill.

9. The non-transitory computer-readable medium of claim 8, wherein generating the score comprises:
    providing the one or more metric values based upon the surgical data to the machine learning model implementation to generate a prediction; and
    mapping the prediction to the score.

10. The non-transitory computer-readable medium of claim 9, wherein the prediction indicates whether the surgical data is more closely associated with a first classification or with a second classification.

11. The non-transitory computer-readable medium of claim 10, wherein,
    the first classification and the second classification are associated with different surgeon skill levels, and wherein,
    the machine learning model implementation is configured to receive metric values corresponding to surgical data associated with a particular surgical task.

12. The non-transitory computer-readable medium of claim 11, wherein the surgical data comprises patient-side kinematics data, operator-side kinematics data, visualization tool video data, and system events data.

13. The non-transitory computer-readable medium of claim 9, wherein,
    determining the one or more metric values based upon the surgical data comprises providing the surgical data to a filtered corpus of metrics determined from annotated surgical data, wherein,
    generating the score comprises:
    inputting the metric values to the machine learning model implementation; and
    applying the output of the machine learning model implementation to a mapping of predictions to scores, and wherein, the machine learning model implementation is configured to receive metric values corresponding to the filtered corpus of metrics.

14. The non-transitory computer-readable medium of claim 13, the method further comprising:
presenting the score as one of several scores generated over the course of at least a portion of a surgeon's surgical performance.

15. A computer system comprising:
at least one processor;
at least one memory comprising instructions configured to cause the computer system to perform a method for generating a score based upon surgical data, the method comprising:
determining generating one or more metric values of a plurality of operational performance indicators (OPIs) from based at least upon surgical data;
establishing identifying a data structure comprising a mapping of each of the plurality of OPIs to at least one skill of a plurality of skills;
selecting, from the data structure comprising the mapping, one or more OPIs of the plurality of OPIs based at least on a skill from the plurality of skills;
identifying one or more metric values of the selected one or more OPIs for the user; and
generating a score for the skill of the user at least in part, by providing the one or more metric values for the selected one or more OPIs of the user as input to a machine learning model trained for the skill.

16. The computer system of claim 15, wherein generating the score comprises:
providing the one or more metric values based upon the surgical data to the machine learning model implementation to generate a prediction; and
mapping the prediction to the score.

17. The computer system of claim 16, wherein the prediction indicates whether the surgical data is more closely associated with a first classification or with a second classification.

18. The computer system of claim 17 wherein,
the first classification and the second classification are associated with different surgeon skill levels, and wherein,
the machine learning model implementation is configured to receive metric values corresponding to surgical data associated with a particular surgical task.

19. The computer system of claim 16, wherein,
determining the one or more metric values based upon the surgical data comprises providing the surgical data to a filtered corpus of metrics determined from annotated surgical data, wherein,
generating the score comprises:
inputting the metric values to the machine learning model implementation; and
applying the output of the machine learning model implementation to a mapping of predictions to scores, and wherein,
the machine learning model implementation is configured to receive metric values corresponding to the filtered corpus of metrics.

20. The computer system of claim 19, the method further comprising:
presenting the score as one of several scores generated over the course of at least a portion of a surgeon's surgical performance.

* * * * *

UNITED STATES PATENT AND TRADEMARK OFFICE
CERTIFICATE OF CORRECTION

PATENT NO. : 12,451,239 B2
APPLICATION NO. : 18/037976
DATED : October 21, 2025
INVENTOR(S) : Kristen Brown et al.

Page 1 of 1

It is certified that error appears in the above-identified patent and that said Letters Patent is hereby corrected as shown below:

In the Claims

Column 43, Line 25, Claim 1 delete "determining"
Column 43, Line 27, Claim 1 delete "based at least upon"
Column 43, Line 28, Claim 1 delete "establishing"
Column 43, Line 35, Claim 1 delete "the" and insert --an--
Column 43, Line 39, Claim 1 insert --implementation-- after "machine learning model"
Column 44, Line 19, Claim 1 delete "determining"
Column 44, Line 21, Claim 1 delete "based at least upon"
Column 44, Line 22, Claim 1 delete "establishing"
Column 44, Line 29, Claim 1 delete "the" and insert --an--
Column 44, Line 33, Claim 1 insert --implementation-- after "machine learning model"
Column 45, Line 15, Claim 15 delete "determining"
Column 45, Line 17, Claim 15 delete "based at least upon"
Column 45, Line 18, Claim 15 delete "establishing"
Column 45, Line 25, Claim 15 delete "the" and insert --an--
Column 45, Line 29, Claim 15 insert --implementation-- after "machine learning model"

Signed and Sealed this
Thirteenth Day of January, 2026

John A. Squires
*Director of the United States Patent and Trademark Office*